(12) United States Patent
Caldwell

(10) Patent No.: US 8,169,717 B2
(45) Date of Patent: May 1, 2012

(54) LARGE APERTURE IMAGING OPTICAL SYSTEMS

(75) Inventor: J. Brian Caldwell, Petersburg, VA (US)

(73) Assignee: Caldwell Photographic, Inc., Petersburg, VA (US)

( * ) Notice: Subject to any disclaimer, the term of this patent is extended or adjusted under 35 U.S.C. 154(b) by 131 days.

(21) Appl. No.: 12/802,405

(22) Filed: Jun. 7, 2010

(65) Prior Publication Data

US 2010/0246031 A1    Sep. 30, 2010

Related U.S. Application Data

(63) Continuation-in-part of application No. 12/229,031, filed on Aug. 19, 2008, now Pat. No. 7,733,581.

(60) Provisional application No. 60/966,036, filed on Aug. 24, 2007.

(51) Int. Cl.
| | |
|---|---|
| G02B 13/02 | (2006.01) |
| G02B 9/34 | (2006.01) |
| G02B 15/14 | (2006.01) |
| G02B 23/14 | (2006.01) |

(52) U.S. Cl. ......... 359/749; 359/676; 359/432; 359/781

(58) Field of Classification Search .................. 359/432, 359/676, 683, 749, 751, 752, 753, 771, 781
See application file for complete search history.

(56) References Cited

U.S. PATENT DOCUMENTS

| | | |
|---|---|---|
| 1,975,678 A | 10/1934 | Bertele |
| 2,012,822 A | 8/1935 | Lee |
| 2,310,502 A | 2/1943 | Warmisham |
| 2,649,021 A | 8/1953 | Angenieux |
| 2,978,957 A | 4/1961 | Becker et al. |
| 3,255,664 A | 6/1966 | Smith |
| 3,300,267 A | 1/1967 | Pennig |
| 3,445,154 A | 5/1969 | Schlegel |
| 3,454,326 A | 7/1969 | Schlegel |
| 3,504,961 A | 4/1970 | Hoogland |
| 3,586,420 A | 6/1971 | Walker |
| 3,817,602 A | 6/1974 | Kazamaki et al. |
| 3,992,085 A | 11/1976 | Momiyama |
| 3,994,576 A | 11/1976 | Glatzel et al. |
| 4,025,169 A | 5/1977 | Fischer et al. |
| 4,095,873 A | 6/1978 | Takahiro |
| 4,136,931 A | 1/1979 | Glatzel |
| 4,310,223 A | 1/1982 | Conrad |
| 4,329,024 A | 5/1982 | Rogers |
| 4,395,094 A | 7/1983 | Hamanishi |
| 5,315,441 A | 5/1994 | Hori et al. |
| 5,920,432 A | 7/1999 | Suenaga |
| 7,012,759 B2 * | 3/2006 | Betensky et al. ............. 359/676 |
| 7,224,535 B2 * | 5/2007 | Neil ............................... 359/683 |
| 7,227,682 B2 * | 6/2007 | Caldwell et al. ............. 359/432 |
| 7,733,581 B2 * | 6/2010 | Caldwell ...................... 359/749 |

* cited by examiner

*Primary Examiner* — David N Spector
(74) *Attorney, Agent, or Firm* — Opticus IP Law PLLC

(57) ABSTRACT

Large aperture optical systems that are extremely well corrected over a large flat field and over a large spectral range are disclosed. Breathing and aberration variation during focusing are optionally controlled by moving at least two groups of lens elements independently. Aberration correction in general is aided by allowing the working distance to become short relative to the format diagonal. Field curvature is largely corrected by a steeply curved concave surface relatively close to the image plane. This allows the main collective elements to be made of low-index anomalous dispersion materials in order to correct secondary spectrum. In wide-angle example embodiments, distortion may be controlled with an aspheric surface near the front of the lens.

20 Claims, 52 Drawing Sheets

Variable Soft Focus Type 1: Move Element 3

Variable Soft Focus Type 2: Move Element 4

Variable Soft Focus Type 3: Move Elements 3 and 4

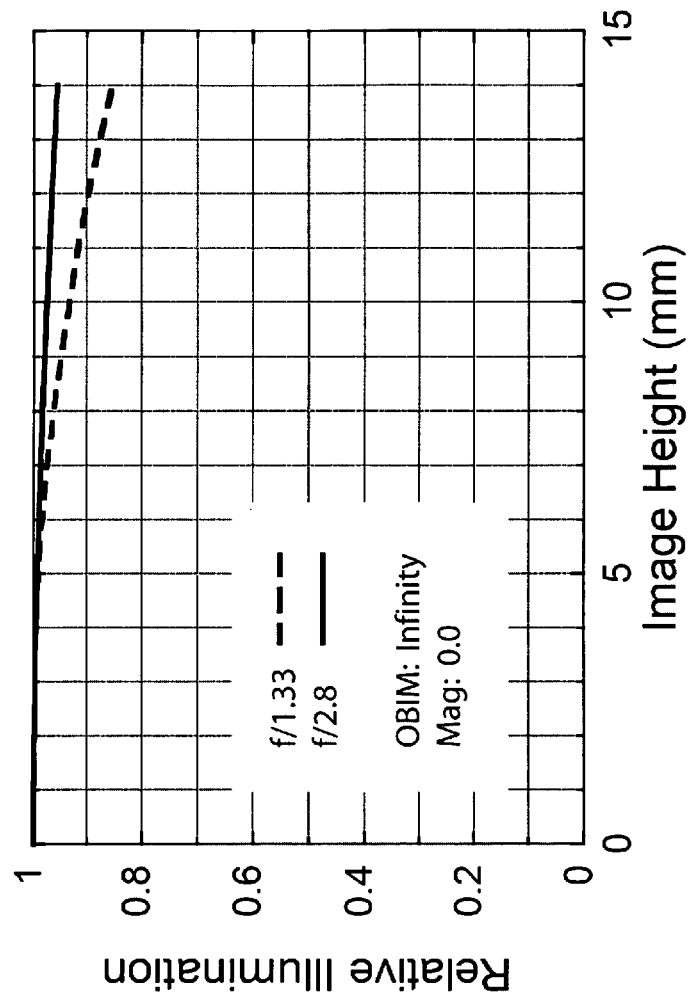

1: 10 cycles/mm  2: 20 cycles/mm  3: 40 cycles/mm

1: 10 cycles/mm  2: 20 cycles/mm  3: 40 cycles/mm

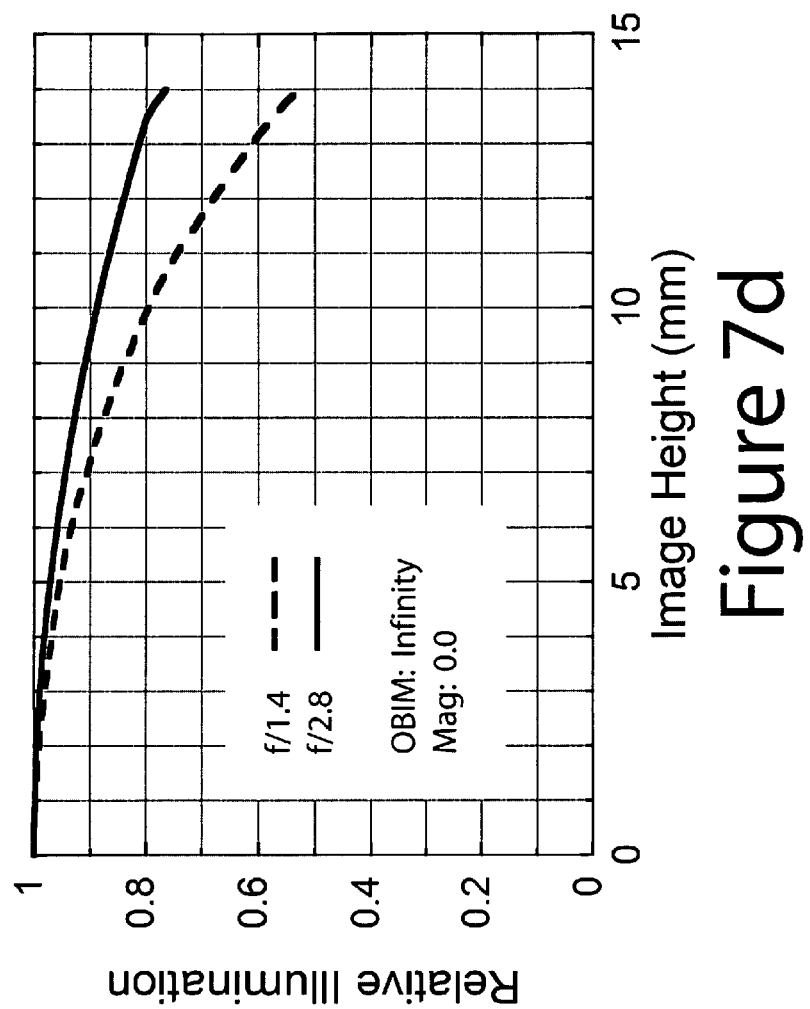

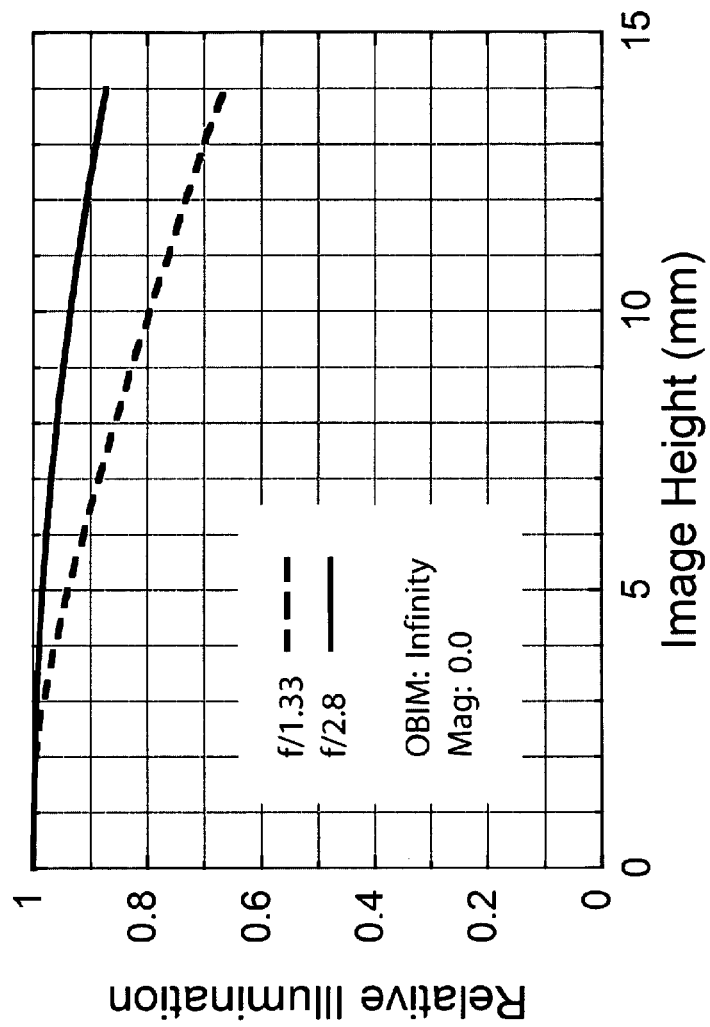

1: 10 cycles/mm  2: 20 cycles/mm  3: 40 cycles/mm

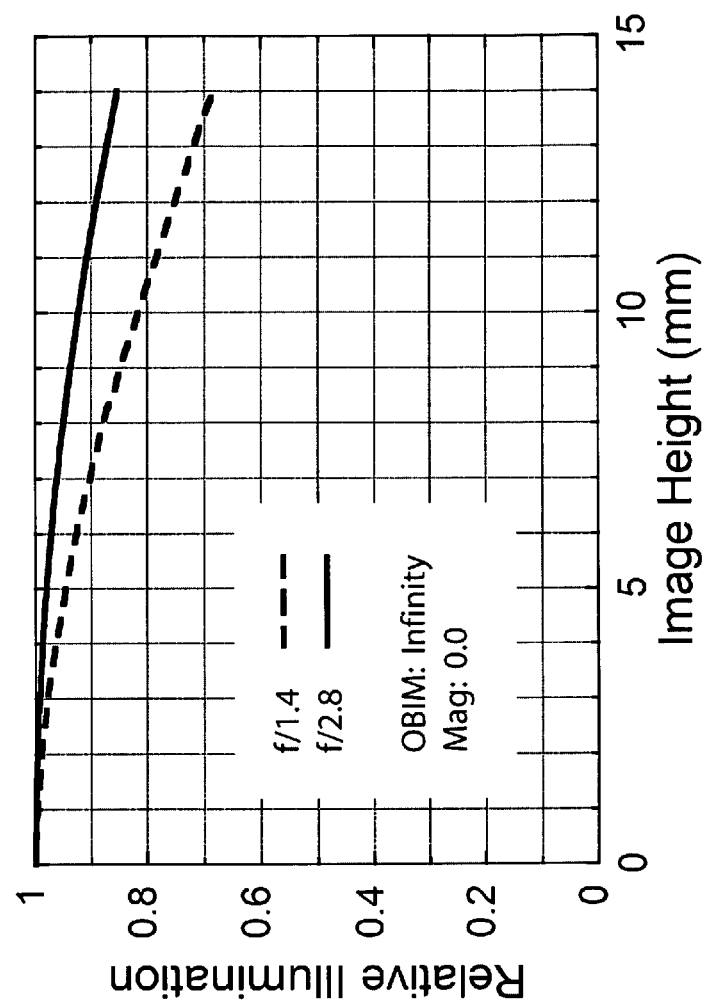

1: 10 cycles/mm  2: 20 cycles/mm  3: 40 cycles/mm

1: 50 cycles/mm  2: 100 cycles/mm  3: 200 cycles/mm

OBIM: Infinity  MAG.: 0.0

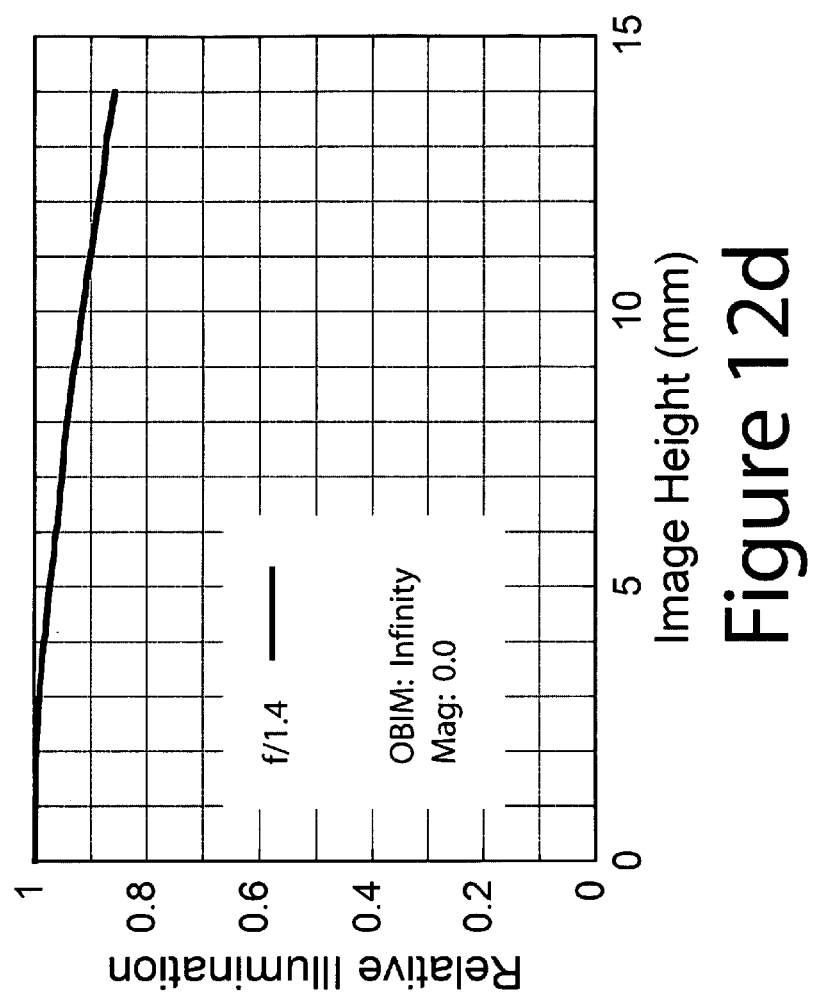

LARGE APERTURE IMAGING OPTICAL SYSTEMS

CLAIM OF PRIORITY

This application is a continuation-in-part of and claims priority from U.S. patent application Ser. No. 12/229,031, filed Aug. 19, 2008 which issued as U.S. Pat. No. 7,733,581 on Jun. 8, 2010, and which claims priority from U.S. Provisional Application Ser. No. 60/966,036, filed on Aug. 24, 2007. U.S. Pat. No. 7,733,581 is incorporated by reference herein.

FIELD OF THE INVENTION

The present invention relates to the field of large aperture imaging optics, and more specifically relates to photographic, cinematographic and reconnaissance optical systems that are extremely well corrected over a wide range of f/numbers and over a large spectral range.

BACKGROUND ART

A long sought-after goal of photographic optical design is to provide a large aperture objective having an f/number of about f/1.5 or smaller that is well corrected for all aberrations over a large flat field and over a large spectral range. In addition, a goal for objectives used in cinematography is that they be corrected for "breathing." Breathing is defined as a change in chief ray angle in object space as the lens is focused, and it causes objects to move radially in the image frame as they go in and out of focus.

The Petzval design form is capable of being well corrected at a large aperture over a small field of view, and has been used for many decades in applications such as cinema projection lenses, heads-up displays, and microscope objectives. Although the Petzval form is too limited for use as a general-purpose photographic or cinematographic lens, it provides important insights about large aperture lens design. In particular, a Petzval lens achieves excellent correction at large apertures by minimizing the power of the negative lens elements located far from the image plane. Petzval objectives often employ a negative field flattener located fairly close to the image plane. As a result, the positive lens elements can be made from low-index fluor crown glass or calcium fluoride crystal if desired in order to reduce or eliminate the secondary spectrum.

Examples of large aperture Petzval lenses include U.S. Pat. Nos. 2,649,021; 3,255,664; and 4,329,024.

The double-Gauss design form is very widely used for high-speed objectives that must cover a relatively wide field of view. However, double-Gauss designs rely on the use of positive elements made of high index crown glass in order to flatten the field, and as a result it is difficult or impossible to correct the secondary spectrum. Double-Gauss designs also have a strong tendency to suffer from oblique spherical aberration that severely limits off-axis performance at wide apertures. Vignetting is normally used to control the aberrated tangential rays, so high-speed double-Gauss designs have a characteristic strong illumination fall off coupled with a large amount of residual sagittal oblique spherical aberration. The oblique spherical aberration can be corrected to a large extent by relaxing the requirement for a large working distance and/or by introducing one or more aspheric surfaces into the design. Examples of high-speed double-Gauss designs include U.S. Pat. Nos. 2,012,822; 3,504,961; and 4,394,095.

Triplet derivatives, including the Sonnar and Ernostar design forms, have also been widely used in the past for high-speed objectives with small to moderate fields of view. These designs tend to have many of the strengths and shortcomings of the double-Gauss type designs, but are generally more suited to narrower fields of view. Examples include U.S. Pat. Nos. 1,975,678; 2,310,502; and 3,994,576. An interesting sub grouping of triplet derivatives designed mainly for television cameras is moderately well corrected for extremely large apertures of about f/0.7 and incorporate a meniscus doublet lens group with a very strong concave surface near the image plane. This meniscus group serves to flatten the field. These designs also have characteristics similar to Petzval lenses, particularly the minimization of negative power in large elements located far from the image plane. Examples of this type include U.S. Pat. Nos. 2,978,957; 3,300,267; 3,445,154; 3,454,326; and 3,586,420.

The reverse telephoto design form is useful for achieving both a large aperture and a wide field of view. However, the image quality for high-speed wide-angle examples is generally mediocre, and these lenses need to be stopped down substantially to achieve good results. An exception is found in microfilm objectives, such as U.S. Pat. Nos. 3,817,602 and 4,310,223; and microscope objectives such as U.S. Pat. No. 5,920,432. However in these cases a high image quality is achieved at the expense of image size. Examples of high-speed wide-angle reverse telephoto designs include U.S. Pat. Nos. 3,992,085; 4,025,169; 4,095,873; 4,136,931; and 5,315,441.

Despite the above efforts, virtually all high-speed photographic lenses designed to date are compromised by the need to balance large aberrations against each other. Most often these designs are notably soft in the outer sub-group of the image field, and must be stopped far down to achieve good performance. Accordingly, there is a need for high-speed optical systems that are both extremely well corrected and reasonably compact when scaled to an image diagonal of about 28 mm. In addition, for cinematographic applications, there is a need for such optical systems to be well corrected for breathing.

SUMMARY OF THE INVENTION

The present invention is directed to optical systems that are extremely well corrected over a wide range of f/numbers and a relatively large spectral range. More specifically, the present invention is directed to cinematographic and photographic objectives that are extremely well corrected over a range of f/numbers between f/0.6 and f/4, and are optionally well corrected for breathing.

The recent rise of electronic image capture in the fields of still photography and cinematography have opened up new challenges and opportunities for the optical systems used in these applications. In cinematography, for example, new high-quality digital cameras often dispense with an optical viewfinder in order to reduce noise and cost. As a result, the optics can take advantage of a shorter working distance to improve speed, optical correction, or both. However, the optical design may need to take into account any plane parallel filters in the optical path near the image plane. These include IR/UV blocking filters, anti-aliasing filters, and sensor cover glasses. The exit pupil of the optical design must also match the characteristics of the sensor as closely as possible.

In the present invention, an extraordinary degree of optical correction is achieved at a very large aperture by allowing the working distance to become relatively short, and also by employing a unique optical construction. The main part of this optical construction is a primary lens group ("primary group"), or PG, that in turn comprises a front negative-powered sub-group P1, followed by a positive-powered sub-group P2, followed by a negative-powered sub-group P3, and optionally followed by a final sub-group P4 that can be either negatively or positively powered. In the discussion below, the focal length of primary group PG is called FG. Also in the discussion below, the focal lengths of sub-groups P1, P2, P3, and P4 are called F1, F2, F3, and F4, respectively.

Sub-group P1 has only a weak negative power, and its function is to help flatten the field as well as to reduce the chief ray angle as it enters the remaining sub-group of PG. Sub-group P1 can also be usefully split into two parts that move separately during focusing to aid in aberration and breathing correction. Elements in sub-group P1 that are near the aperture stop are also good locations for an aspheric surface to correct spherical aberration.

Sub-group P2 has a strong positive power, and its focal length F2 is somewhat less than FG. Sub-group P2 is the main collective group of lenses within primary group PG. Since field curvature is corrected elsewhere within the lens it is not necessary to use high index glass for the positive elements in sub-group P2, so low index glass with anomalous dispersion can be used. This is analogous to the use of low-index anomalous-dispersion glass in the positive-powered elements of a Petzval type lens, where field curvature is typically corrected by the use of a field flattener located near the image plane. The ability to use low-index anomalous-dispersion glasses is critical for achieving the excellent color correction necessary for any fast lens that must be extremely well corrected. By judicious use of these anomalous-dispersion glasses it is possible to achieve good correction over a very broad waveband. Surfaces within sub-group P2 that are near the aperture stop can provide a good location for an asphere to correct spherical aberration.

Sub-group P3 is a moderately high-powered negative group whose primary function is to flatten the field and to correct astigmatism. The rearmost surface of sub-group P3, referred to below as SC, has a very short radius of curvature and is concave toward the image plane. Much of the field flattening correction takes place at surface SC. Rearmost surface SC is readily identified as being the first air-glass interface within primary group PG that is concave toward the image and that has a radius of curvature less than FG and in which the marginal ray height is substantially less than the maximum value of the marginal ray height in the system. The radius of curvature of rearmost surface SC is called $R_{SC}$. The distance along the optical axis from surface SC to the image plane is called $Z_{SC}$.

Rearmost surface SC is also located axially in such a way that the marginal ray height as it intersects this surface is small relative to its largest value. This condition may be expressed as $1.3 < y_{MAX}/y_{SC} < 4.0$, where $y_{MAX}$ is the maximum height of the marginal ray as it passes through the lens and $y_{SC}$ is the height of the marginal ray as it intersects the surface SC. The large negative power of surface SC combined with the fact that the marginal ray height is relatively small at SC is what enables this particular surface to have such an important contribution to field curvature correction.

Sub-group P4 is the remaining group of elements located on the image side of sub-group P3. This sub-group has relatively low power, which can be either positive or negative. The function of sub-group P4 is primarily to help control the exit pupil location, to correct distortion, and to make final adjustments to astigmatism. Sub-group P4 is optional and may be eliminated if requirements for off-axis image quality are not so stringent.

Example embodiments with an image diagonal of about 28 mm and a focal length of about 40 mm or larger may be solely comprised of primary lens group PG. Example embodiments with an image diagonal of about 28 mm and a focal length shorter than about 40 mm are best comprised of primary lens group PG plus a grouping of lens elements in front of PG. These elements in front of PG essentially act as a wide-angle afocal attachment to shorten the focal length and widen the field of view while allowing primary group PG to retain its basic structure. Of course, the added elements in front of PG need not function precisely as an afocal attachment, and can have a net negative or net positive power. Consequently, the object magnification for primary group PG, calculated as the slope of the marginal ray entering the primary group divided by the slope of the marginal ray exiting this group, can be negative, zero, or positive. The object magnification of primary group PG is called $OBMG_{PG}$ Lenses for cinematography must be well corrected for a wide range of object distances, and in addition should be well corrected for breathing. Breathing is a phenomenon in which off-axis image points move radially within the image format as they go in and out of focus. A lens that is focused by simply moving the entire optical structure as a unit along the optical axis will suffer from breathing because the image format will subtend a larger angle for a distant object than it will for a close object. A lens corrected for breathing will have a chief ray angle that is constant for all focus settings. Breathing is defined by the expression:

$B = (100\%)(\text{chief ray angle} - \text{chief ray angle at infinity})/(\text{chief ray angle at infinity})$, where the chief ray angle is measured in object space.

It is also desirable for cinematographic and general photographic objectives to have a variable soft focus feature so that a wide variety of special effects can be achieved. This is especially true of cinematographic objectives with a focal length of about 50 mm and longer, which are frequently used for close-up headshots and the like. The best method of introducing a soft focus is to vary the amount of spherical aberration in a controlled manner by an axial adjustment of one or more lens elements. Ideally a lens with a variable soft focus adjustment will also have a means for adjusting paraxial focus at the same time spherical aberration is changed. This will allow for the best balance of defocus and spherical aberration to achieve the desired soft focus effect.

In addition to cinematographic and general photographic applications, the present invention is well-suited to demanding reconnaissance, surveillance, and inspection applications. These applications generally require a narrower magnification range than cinematography or general photography. For example, lenses used for aerial reconnaissance are typically always used with a very distant object, and need not be optimized for close focusing. Surveillance lenses are also typically used with distant object distances, though perhaps a bit closer than the object distances encountered in aerial photography. Inspection lenses are typically used for close object distances, but only a narrow range of magnifications.

A lens designed according to the present invention for cinematographic or general photographic applications may be applied to applications requiring only a narrow range of magnifications simply because the broad magnification range of the design encompasses the magnification range required for the application at hand. However, it is generally be better to optimize an optical system to work best under the actual conditions in which it is used. So, for example, an aerial reconnaissance lens should be optimized to perform best at infinite or nearly infinite conjugates, and this performance need not be compromised to improve performance for closer object distances.

Surveillance and reconnaissance lenses are also often required to work well over an extended waveband that includes the near-infrared portion of the spectrum. This allows for improved imagery through haze and atmospheric scattering, and it also permits the use of specialized sensors for low-light applications.

Accordingly, an aspect of the invention is a large-aperture imaging optical system for forming an image of an object and having an f/number. The optical system includes a) a primary lens group PG having a focal length FG comprising in order from the object to the image:
  i) a front negative-powered lens sub-group P1 having a focal length F1;
  ii) a positive-powered lens sub-group P2 having a focal length F2; and
  iii) a negative-powered lens sub-group P3 having a focal length F3.

The primary lens group PG contains a surface SC that is concave toward the image, the marginal ray height at surface SC being less than 0.8 times the maximum marginal ray height at any lens surface within PG. The f/number is in the range from f/0.6 to f/4.

Another aspect of the invention is a large-aperture imaging optical system having an f/number and that forms an image of an object. The optical system includes a) a primary lens group PG having a focal length FG comprising in order from the object to the image:
  i) a front negative-powered lens sub-group P1 having a focal length F1;
  ii) a positive-powered lens sub-group P2 having a focal length F2;
  iii) a negative-powered lens sub-group P3 having a focal length F3; and
  iv) a lens sub-group P4 having a focal length F4 that can be either negatively or positively powered.

The primary lens group PG contains a surface SC that is concave toward the image, the marginal ray height at surface SC being less than 0.85 times the maximum marginal ray height at any lens surface within PG. The f/number is in the range from f/0.6 to f/4.

BRIEF DESCRIPTION OF THE DRAWINGS

FIG. 4d is a plot of Relative Illumination vs. Image Height for apertures of f/1.33 and f/2.8 and a magnification of 0.0× according to Example 4 of the present invention.

FIG. 7d is a plot of Relative Illumination vs. Image Height for apertures of f/1.4 and f/2.8 and a magnification of 0.0× according to Example 7 of the present invention.

FIG. 8e is a plot of Relative Illumination vs. Image Height for apertures of f/1.33 and f/2.8 and a magnification of 0.0× according to Example 8 of the present invention.

FIG. 10d is a plot of Relative Illumination vs. Image Height for apertures of f/1.4 and f/2.8 and a magnification of 0.0× according to Example 10 of the present invention.

FIG. 12d is a plot of Relative Illumination vs. Image Height for an aperture of f/1.4 and an object at infinity according to Example 12 of the present invention.

FIG. 13b plots the MTF vs. Image Height at 50, 100 and 200 cycles/mm for an object at infinity for the objective of FIG. 13a.

FIG. 14b plots the MTF vs. Image Height at 10, 20 and 40 cycles/mm for an object at infinity for the objective of FIG. 14a.

DETAILED DESCRIPTION OF THE INVENTION

The present invention relates to the field of large aperture imaging optics. More specifically, the present invention relates to optical systems that are extremely well corrected throughout a large waveband over a large range of f/numbers.

In the Summary of the Invention section above, in the descriptions below and in the claims, the phrases "well-corrected" and "extremely well-corrected" in relation to the optical system of the present invention is understood in the art to mean that the collective effect of aberrations in the optical system are reduced to the point where the optical system is able to satisfactorily perform its particular imaging function. For example, in a photographic objective optical system according to the present invention, the Modulation Transfer Function (MTF) is an excellent and widely accepted means by which to judge the state of optical correction.

In particular, a photographic or cinematographic objective with a focal length greater than about 35 mm intended for a format diagonal of about 28 mm is considered to be well-corrected if the MTF values at 20 cycles/mm is approximately 80% or greater on-axis and is approximately 60% or greater at image heights less than or equal to 14 mm off-axis.

For wide-angle objectives the criteria for "well-corrected" are relaxed slightly in the outer part of the image field. Thus, a photographic or cinematographic objective with a focal length less than about 35 mm intended for a format diagonal of about 28 mm is considered to be well-corrected if the MTF values at 20 cycles/mm is 80% or greater on-axis and is approximately 50% or greater at image heights less than or equal to 14 mm off-axis.

An objective covering a format diagonal of about 28 mm can be considered to be "extremely well-corrected" if it fulfills the above conditions for off-axis field points and the MTF value at 40 cycles/mm is approximately 80% or greater on-axis.

EXAMPLE 1

Figure 1A:
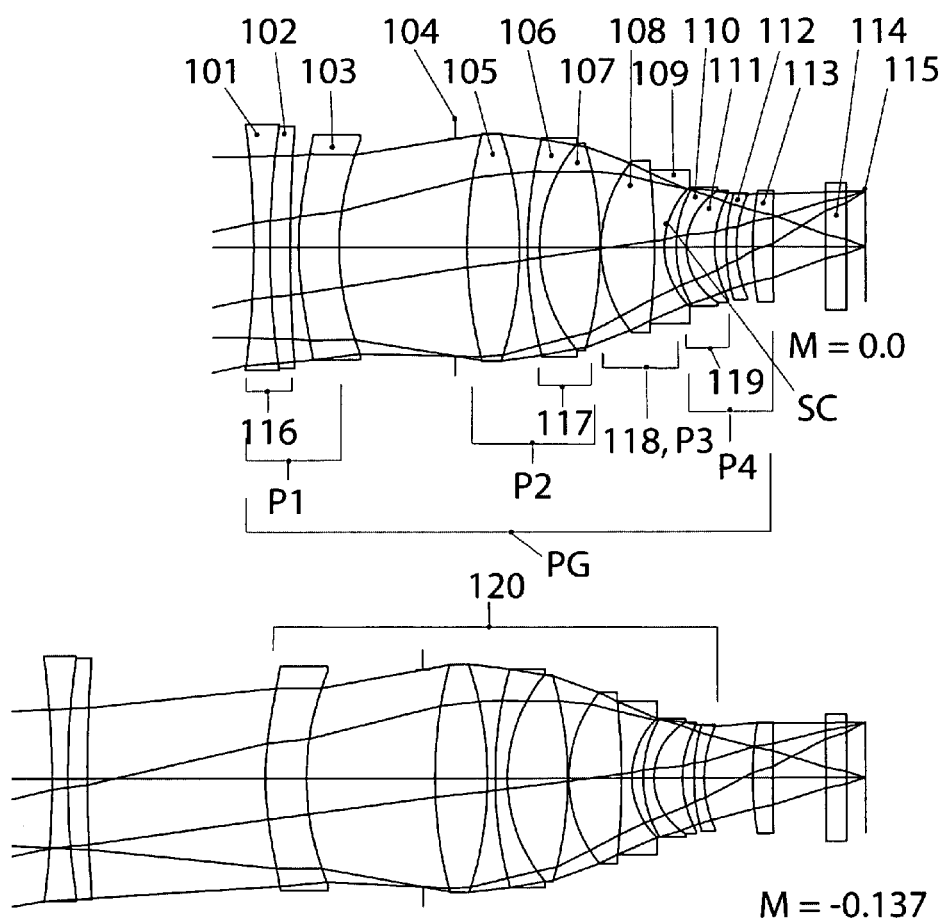
FIG. 1a is a layout drawing of an f/1.33 lens system showing magnification settings of 0.0× and −0.137× according to Example 1 of the present invention.

Example 1, which is a 65 mm focal length objective for 35 mm format cinematography, is illustrated in FIG. 1a, which shows cross-sectional layouts at magnifications of 0 and −0.137×.

All of the element and group designations mentioned below are shown in FIG. 1a. The relative aperture is f/1.33, the image diagonal is 28 mm, and the diagonal field of view (FOV) is 24.3 degrees.

Figure 1B:
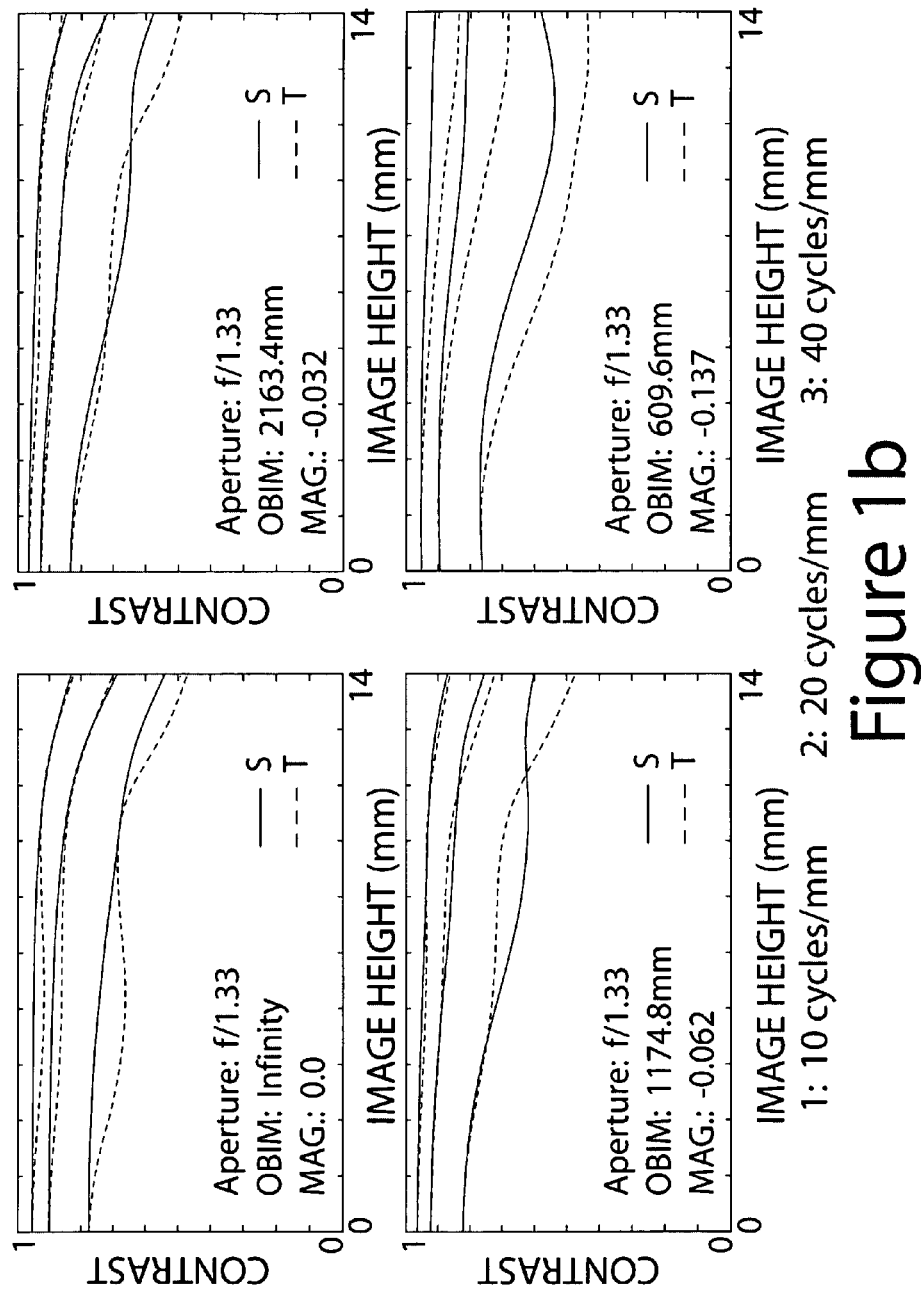
FIG. 1b are plots of MTF vs. Image Height at spatial frequencies of 10 cycles/mm, 20 cycles/mm and 40 cycles/mm for magnification settings of 0.0×, −0.032×, −0.064× and −0.137× over a waveband of 435 nm to 656 nm according to Example 1 of the present invention.
Figure 1C:
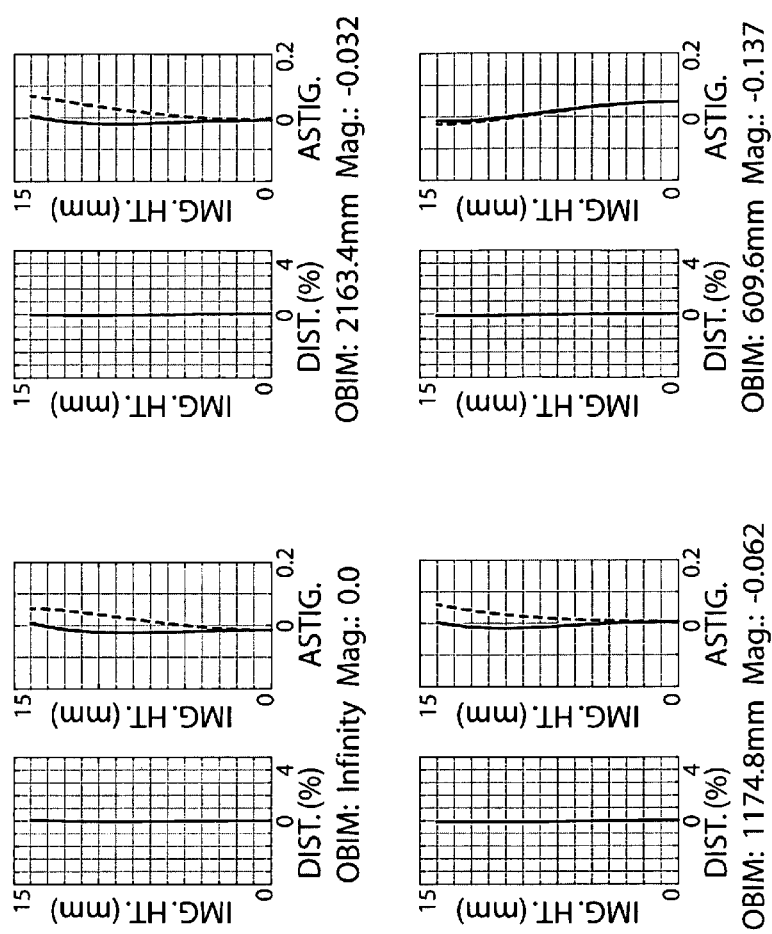
FIG. 1c are plots of Distortion and Astigmatism (S and T) vs. Image Height for magnification settings of 0.0×, −0.032×, −0.064× and −0.137× according to Example 1 of the present invention.
Figure 1D:
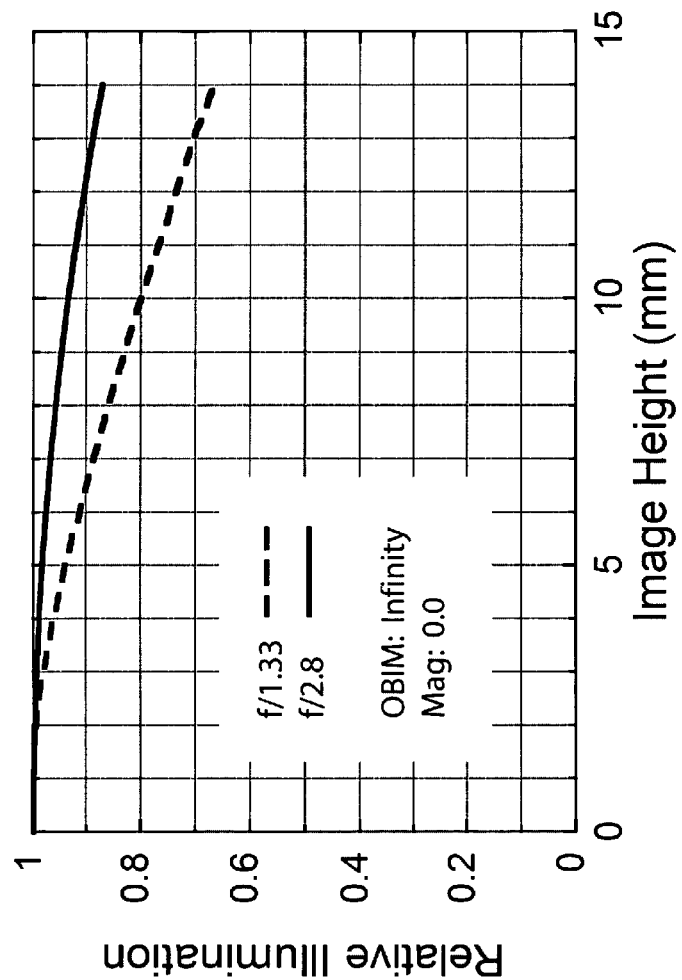
FIG. 1d is a plot of Relative Illumination vs. Image Height for apertures of f/1.33 and f/2.8 and a magnification of 0.0× according to Example 1 of the present invention.

MTF vs. Image Height at 10, 20 and 40 cycles/mm for four different object distances is illustrated in FIG. 1b. These curves indicate that Example 1 is extremely well corrected at f/1.33, with MTF values at 40 cycles/mm greater than 80% near the optical axis in the middle part of the focusing range and very near 80% at the extreme ends of the focusing range. This extraordinary performance falls off very gradually to the corner of the field, and the S and T curves stay close together. FIG. 1c shows distortion and astigmatism (Coddington curves) for the same four object distances used in FIG. 1b. Distortion is virtually zero at all magnifications, and astigmatism is also very well controlled. FIG. 1d is a plot of relative illumination vs. image height at f/1.33 and f/2.8, and it indicates that the Example 1 design has extremely low illumination falloff for such a high-speed lens.

The primary group PG comprises the entire lens except for a plane parallel filter element 114. As discussed above, primary group PG comprises a negative powered front sub-group P1, followed by a positive powered sub-group P2, followed by a negative powered sub-group P3, followed by a sub-group P4 that can be either positively or negatively powered.

In Example 1, sub-group P1 comprises two negative lens groups: a negative doublet 116 and a negative singlet 103. The convex object-facing surface of element 103 is aspherical, and singlet 103 is made of S-BSL7 to ensure that manufacturing this aspherical surface will not be problematic. The doublet 116 uses high-index anomalous dispersion materials N-KZFS4 and S-NPH1 to advantage, and as a result aids in reducing secondary and tertiary chromatic aberrations. The surface of sub-group P1 closest to the object is a concave surface.

Sub-group P2 comprises two positive lens groups: a positive singlet 105 and a positive doublet 117. The positive elements in sub-group P2 are elements 105 and 107. Both are made of low-index anomalous dispersion material S-FPL51. The single negative element 106 is made of a matching anomalous dispersion material N-KZFS4. Since most of the positive optical power for Example 1 resides in sub-group P2, the system as a whole is very well corrected for chromatic aberrations, and is in fact apochromatic over a waveband extending from the deep violet end of the visible spectrum to about 1000 nm in the near infrared.

Sub-group P3 comprises a single negative powered doublet 118. Anomalous dispersion materials S-FPL51y and N-KZFS4 are used for the individual lens elements 108 and 109, respectively, which aids in the correction of secondary spectrum. The outer shape of doublet 118 is meniscus toward the image plane. The concave surface SC is strongly curved and therefore helps a great deal in correcting field curvature and astigmatism.

Sub-group P4 is a fairly weak positive group comprising a positive doublet 119, a negative singlet 112, and a positive singlet 113. Sub-group P4 serves mainly to correct distortion and astigmatism, and to make fine adjustments to the exit pupil location.

Element 114 is a plane parallel plate that serves to model the effect of the anti-aliasing filter, the IR/UV filter, and the sensor cover plate that are commonly found in digital cameras. Element 114 is not intended as a precise model for any particular brand or model of camera, but rather is intended as a viable means for avoiding any filter-induced aberrations. In Example 1, element 114 has been made fairly thick, and in all likelihood would be too thick to accurately model a camera filter pack. However, in this case the thickness of element 114 could be reduced so that when a real filter pack is introduced the aberration balance is not disturbed. This is particularly important in digital photography and cinematography with extremely well corrected high-speed lenses because the filter pack thickness is likely to vary from camera to camera, and it will be a great advantage to be able to customize the lens for an individual camera simply by changing a filter in the rear.

Focusing from a distant to a close object is accomplished by moving sub-group P1 and group 120 independently away from the image plane as illustrated by FIG. 1a. Element 113 is stationary with respect to the image plane. This complex focusing motion ensures that performance remains very high throughout the focusing range, and simultaneously ensures that breathing is almost zero. Breathing reaches a maximum value of only −0.09% at closest focus, which is almost undetectable. In Example 1, sub-group P1 moves a relatively great distance during focusing because it is a relatively weak group. Although this results in a good aberration balance and loose tolerances it does also result in greater bulk as the lens is focused up close.

Soft focus correction is readily accomplished in Example 1 by a number of different methods, of which three are particularly useful. These three methods, which will be called Type 1, Type 2, and Type 3, respectively, all involve axial motions of the third and fourth lens elements 103 and 105. The advantage of these three methods is that the two elements involved are located near the aperture stop, so the induced aberration is almost all spherical aberration, and it is added almost uniformly throughout the image field.

Figure 1E:
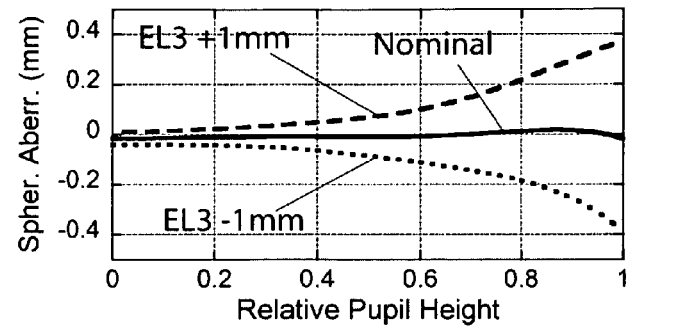
FIG. 1e shows three plots of the amount of spherical aberration (mm) vs. Relative Pupil Height for three different soft-focus corrections (Type 1, Type 2 and Type 3) that each involve axial motions of the third and fourth lens elements.
Figure 1E:
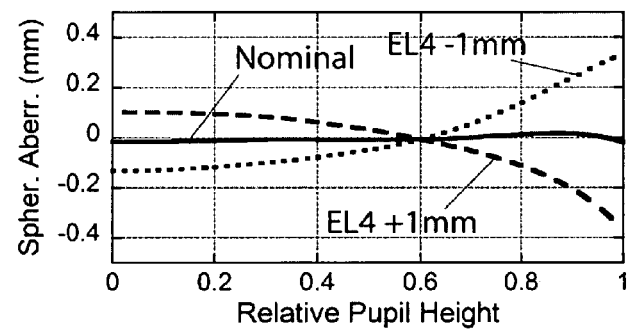
Figure 1E:
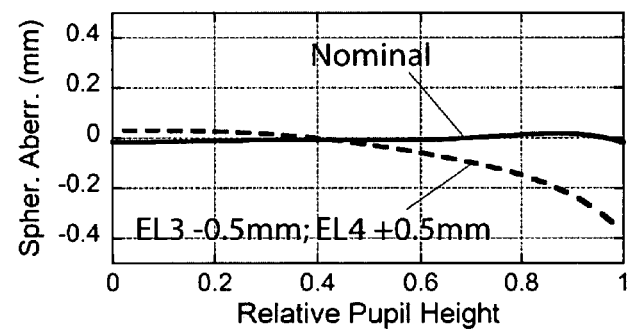

In Type 1, soft-focus element 103 is displaced axially. When the displacement is positive, meaning that element 103 moves toward the image plane, the spherical aberration correction is changed from its nominal well-corrected state to an over-corrected state. Over-corrected spherical aberration is effective in giving defocused foreground highlights a soft edge. When the displacement is negative, meaning that element 103 moves away from the image plane, the spherical aberration is changed from nominal to an under-corrected state. Under-corrected spherical aberration is effective in giving background highlights a soft edge. The top set of curves in FIG. 1e shows the effect of moving element 103 by plus or minus 1 mm. An important feature of Type 1 soft-focus is that the change optical correction involves almost a pure change in spherical aberration with very little induced defocus.

In Type 2 soft-focus, element 105 is displaced axially. The induced spherical aberration is similar in magnitude but opposite in direction compared to Type 1. In other words, when the displacement of element 105 is positive the spherical aberration is changed from nominal to an under-corrected state rather than to an over-corrected state. Another important difference between Type 1 and Type 2 soft-focus is that a substantial amount of defocus is also induced with Type 2. The middle set of curves in FIG. 1e shows the effect of moving element 105 by plus or minus 1 mm.

Type 3 soft-focus is a combination of Type 1 and Type 2 in which both element 103 and 105 are displaced axially. By taking advantage of the different defocus and spherical aberration inducing qualities of Type 1 and Type 2, Type 3 is able to achieve a wide range of spherical aberration states together with a specific amount of defocus. In general, a modest amount of defocus is beneficial when adding spherical aberration to a lens system to achieve a soft focus effect. The bottom set of curves in FIG. 1e shows the effect of moving element 103 by minus 0.5 mm and element 105 by plus 0.5 mm.

EXAMPLE 2

Figure 2A:
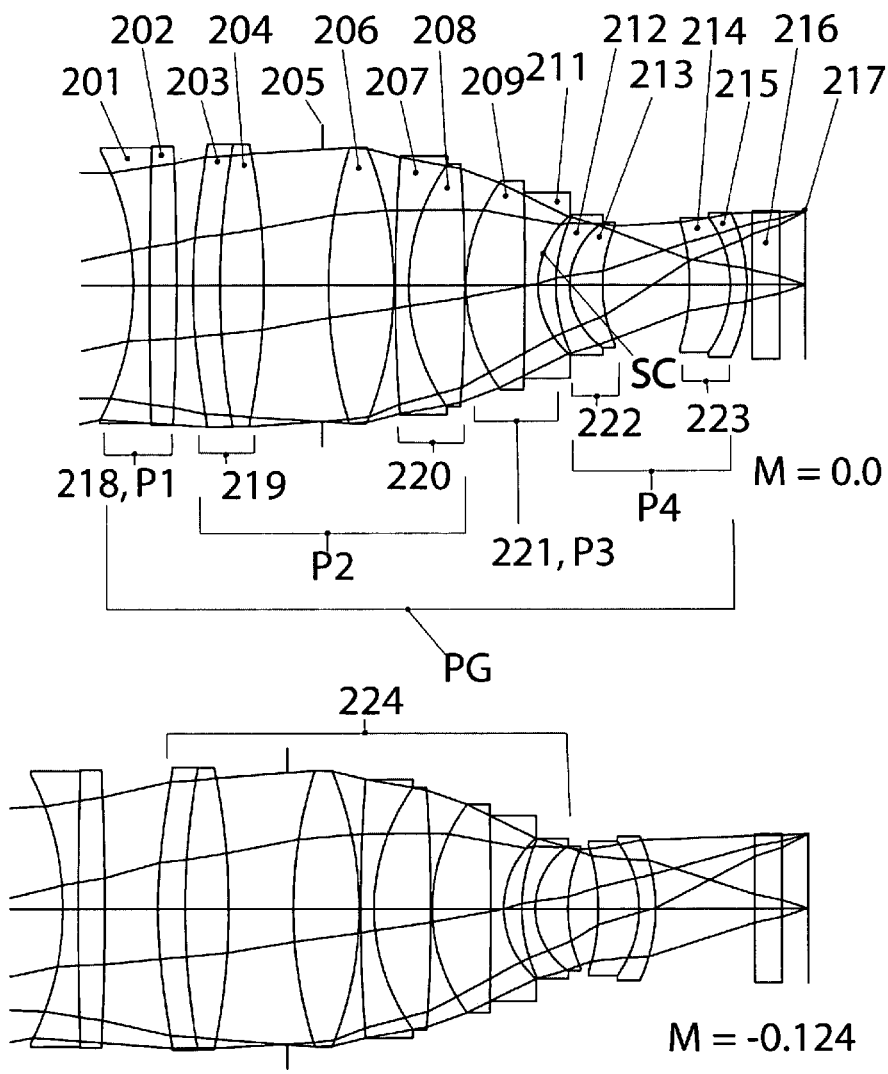
FIG. 2a is a layout drawing of an f/1.4 lens system showing magnification settings of 0.0× and −0.124× according to Example 2 of the present invention.

Example 2, which is a 65 mm focal length objective for 35 mm format cinematography, is illustrated in FIG. 2a, which shows cross-sectional layouts at magnifications of 0 and −0.124×. All of the element and group designations mentioned below are shown in FIG. 1a. The relative aperture is f/1.4, the image diagonal is 28 mm, and the diagonal field of view (FOV) is 24.3 degrees.

Figure 2B:
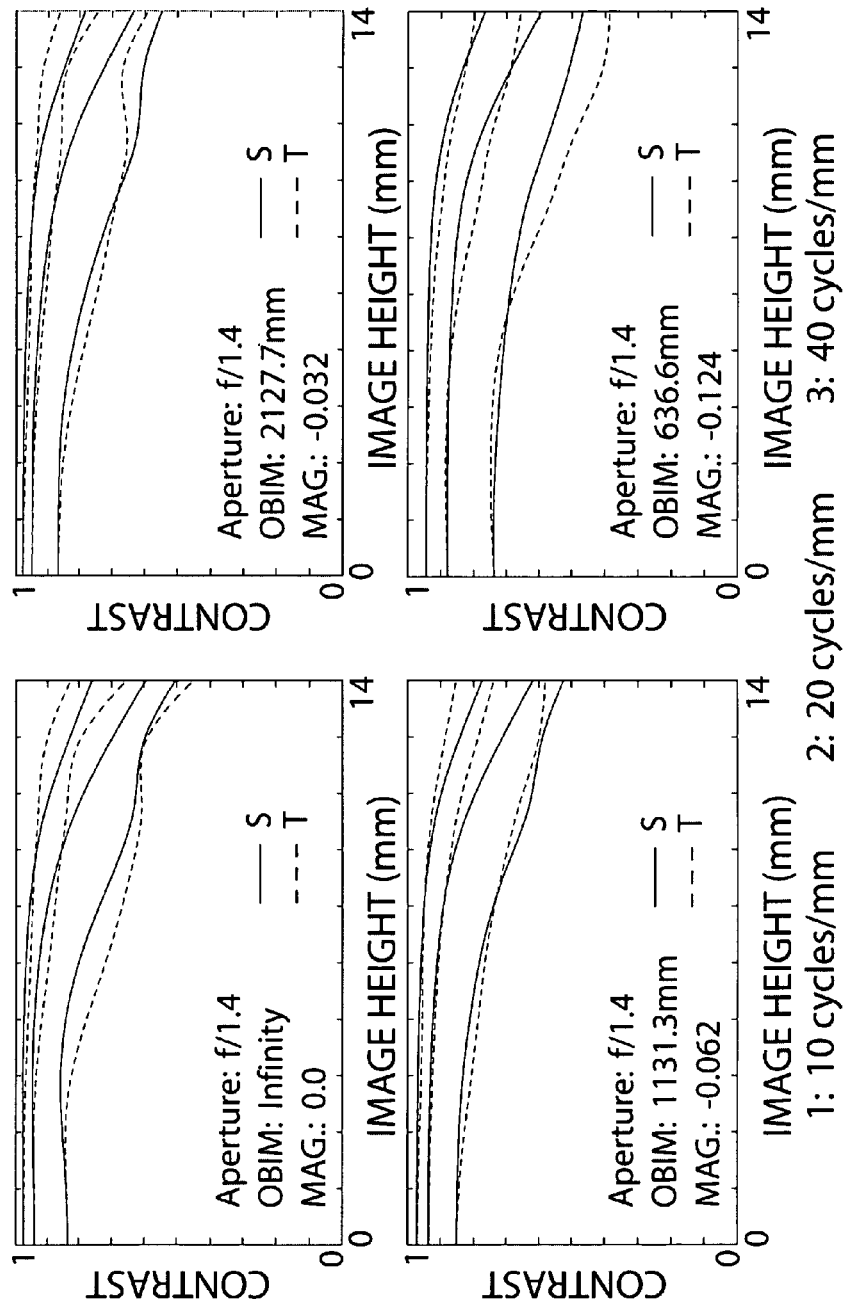
FIG. 2b are plots of MTF vs. Image Height at spatial frequencies of 10 cycles/mm, 20 cycles/mm and 40 cycles/mm for magnification settings of 0.0×, −0.032×, −0.064× and −0.124× over a waveband of 435 nm to 656 nm according to Example 2 of the present invention.
Figure 2C:
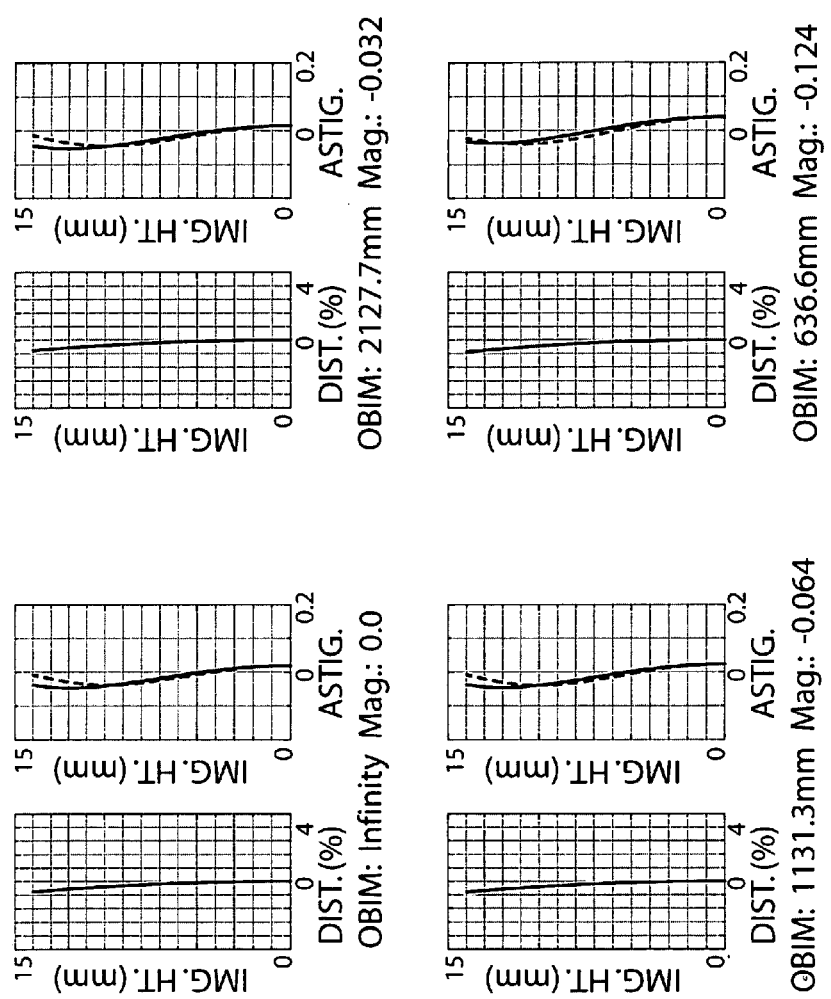
FIG. 2c are plots of Distortion and Astigmatism (S and T) vs. Image Height for magnification settings of 0.0×, −0.032×, −0.064× and −0.124× according to Example 2 of the present invention.
Figure 2D:
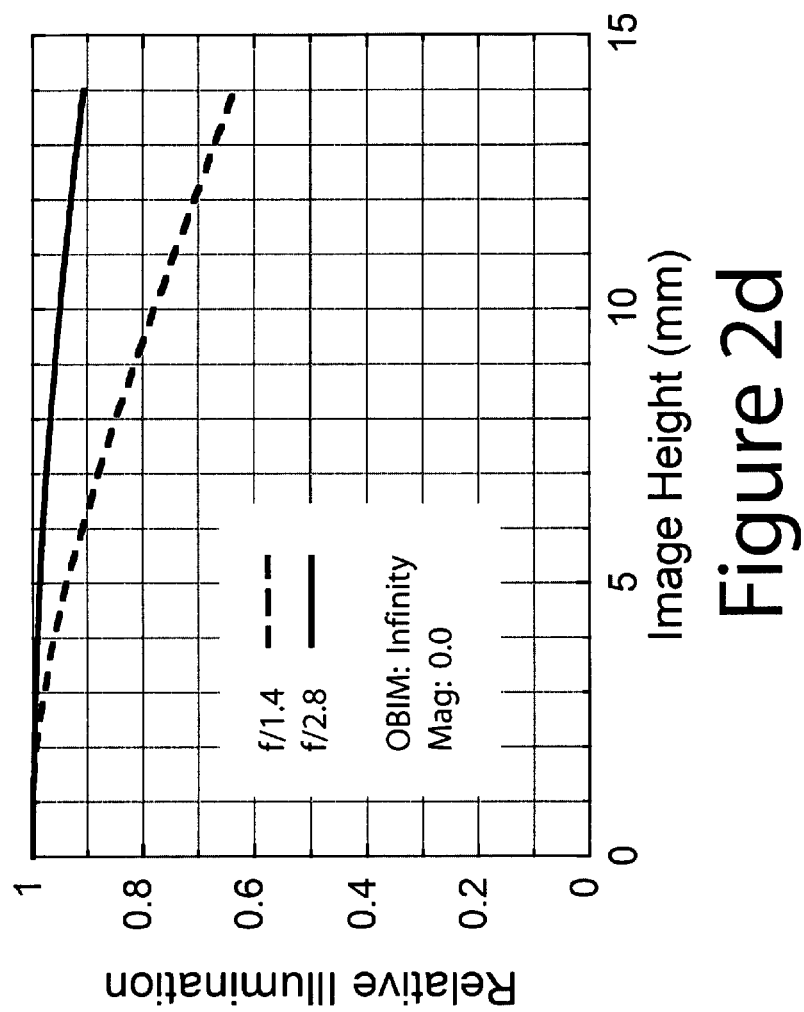
FIG. 2d is a plot of Relative Illumination vs. Image Height for apertures of f/1.4 and f/2.8 and a magnification of 0.0× according to Example 2 of the present invention.

MTF vs. Image Height at 10, 20 and 40 cycles/mm for four different object distances is illustrated in FIG. 2b. These curves indicate that Example 2 is extremely well corrected at f/1.4, with MTF values at 40 cycles/mm greater than 80% near the optical axis in the middle part of the focusing range and very near 80% at closest focus. This extraordinary performance falls off very gradually to the corner of the field, and the S and T curves stay close together. FIG. 2c shows distortion and astigmatism (Coddington curves) for the same four object distances used in FIG. 2b. Distortion is less than 1% at all magnifications, and astigmatism is also very well controlled. FIG. 2d is a plot of relative illumination vs. image height at f/1.4 and f/2.8, and it indicates that the Example 2 design has extremely low illumination falloff for such a high-speed lens.

The primary group PG comprises the entire lens except for a plane parallel filter element 216. As discussed above primary group PG comprises a negative powered front sub-group P1, followed by a positive powered sub-group P2, followed by a negative powered sub-group P3, followed by a sub-group P4 that can be either positively or negatively powered. In Example 2, sub-group P1 comprises a single negative group: a negative doublet 218. Doublet 218 uses high-index anomalous dispersion materials N-KZFS4 and S-NPH1 to advantage, and as a result aids in reducing secondary and tertiary chromatic aberrations. The surface of sub-group P1 closest to the object is a concave surface.

Sub-group P2 comprises three positive groups: a positive doublet 219, a positive singlet 206 and a positive doublet 220. The positive elements 204, 206 and 208 are made of anomalous dispersion materials S-FPL53, S-FPL53 and S-PHM52, respectively. The single negative element 207 is made of a matching anomalous dispersion material N-KZFS4. Since most of the positive optical power for Example 2 resides in sub-group P2, the system as a whole is very well corrected for chromatic aberrations, and is in fact apochromatic over a waveband extending from the deep violet end of the visible spectrum to about 1000 nm in the near infrared. The convex object side surface of doublet 219 is aspherical in order to control spherical aberration.

Sub-group P3 comprises a single negative powered doublet 221. Anomalous dispersion materials S-PHM52 and N-KZFS4 are used for the individual lens elements 209 and 211, respectively, which aids in the correction of secondary spectrum. The outer shape of doublet 221 is meniscus toward the image plane. The concave surface SC is strongly curved and therefore helps a great deal in correcting field curvature and astigmatism.

Sub-group P4 is a positive group comprising two positive doublets 222 and 223. Sub-group P4 serves mainly to correct distortion and astigmatism, and to make fine adjustments to the exit pupil location.

Element 216 is a plane parallel plate that serves to model the effect of the anti-aliasing filter, the IR/UV filter, and the sensor cover plate that are commonly found in digital cameras. As with the corresponding element 114 in Example 1, element 216 is not intended as a precise model for any particular brand or model of camera, but rather is intended as a viable means for avoiding any filter-induced aberrations.

Moving groups P1, 224 and 223 independently away from the image plane as illustrated by FIG. 2a accomplishes focusing from a distant to a close object. This complex focusing motion ensures that performance remains very high throughout the focusing range, and simultaneously ensures that breathing is almost zero. Breathing reaches a maximum value of only −0.01% in the middle portion of the focusing range. Compared with Example 1, sub-group P1 moves a relatively small distance during focusing because it is a relatively weak group. This has advantages for packaging and handling.

EXAMPLE 3

Figure 3A:
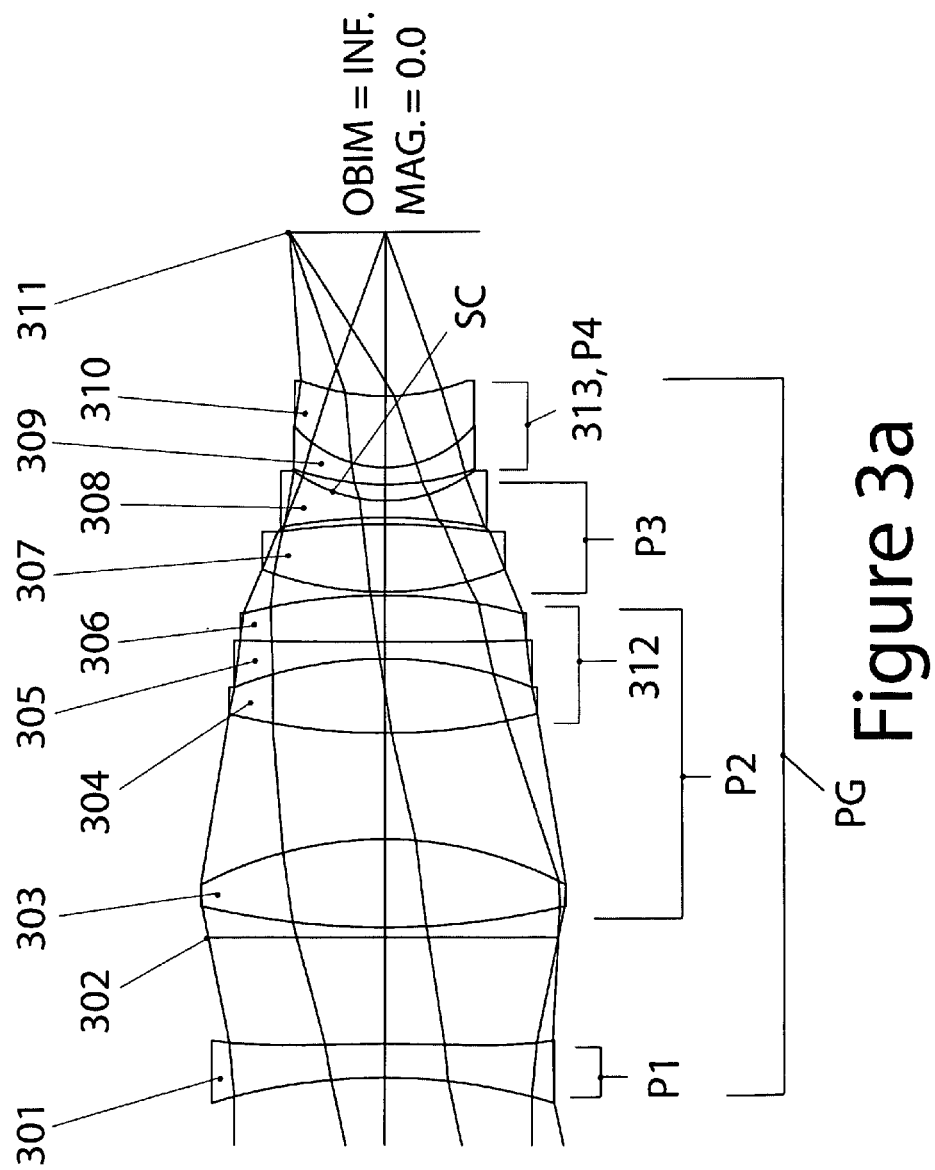
FIG. 3a is a layout drawing of an f/1.4 lens system according to Example 3 of the present invention.

Example 3, which is a 65 mm focal length objective for 35 mm format cinematography, is illustrated in FIG. 3a, which shows cross-sectional layout. All of the element and group designations mentioned below are shown in FIG. 3a. The relative aperture is f/1.4, the image diagonal is 28 mm, and the diagonal field of view (FOV) is 24.3 degrees.

Figure 3B:
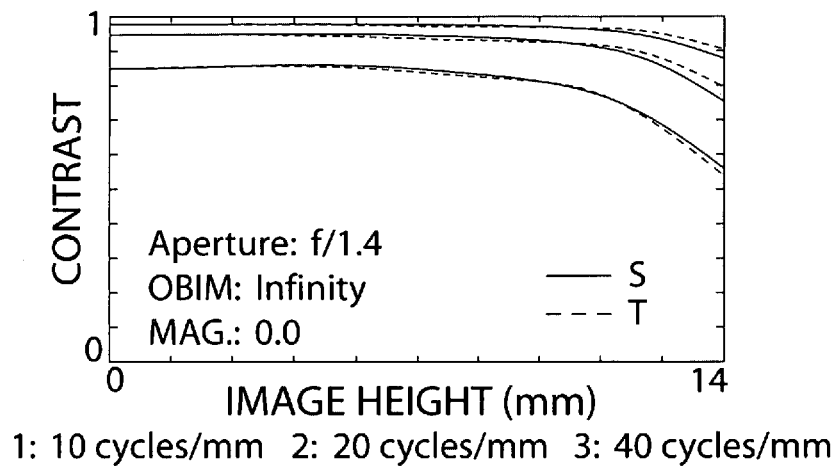
FIG. 3b are plots of MTF vs. Image Height at spatial frequencies of 10 cycles/mm, 20 cycles/mm and 40 cycles/mm for a magnification setting of 0.0× over a waveband of 435 nm to 656 nm according to Example 3 of the present invention.
Figure 3C:
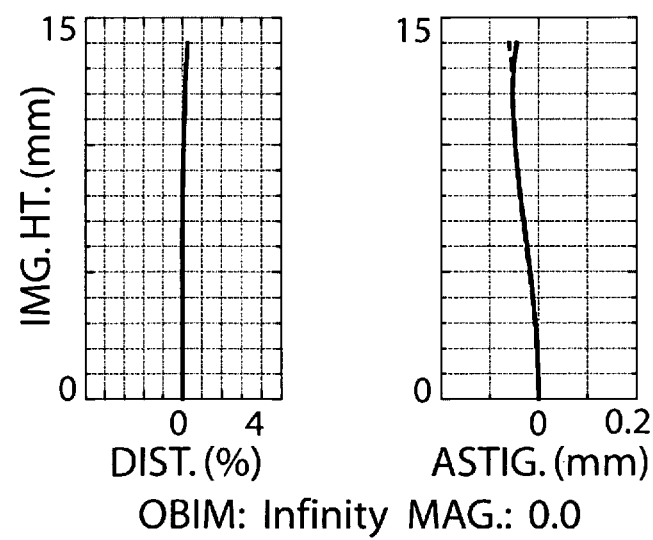
FIG. 3c are plots of Distortion and Astigmatism (S and T) vs. Image Height for a magnification setting of 0.0× according to Example 3 of the present invention.
Figure 3D:
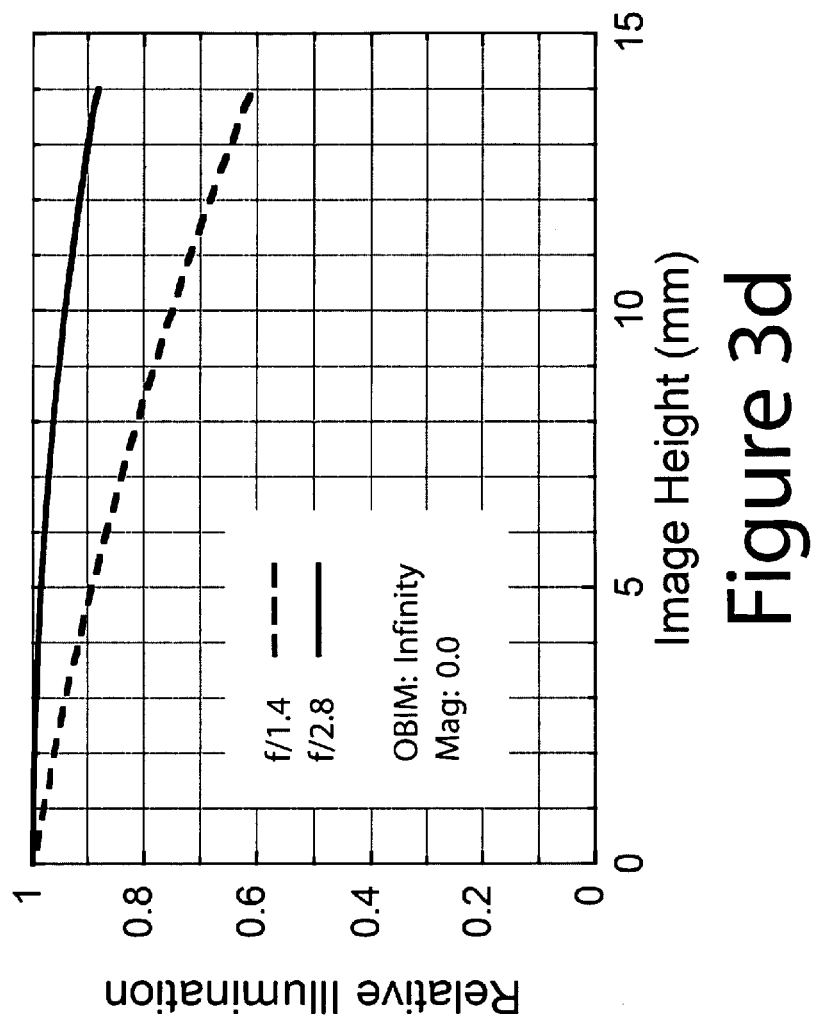
FIG. 3d is a plot of Relative Illumination vs. Image Height for apertures of f/1.4 and f/2.8 and a magnification of 0.0× according to Example 3 of the present invention.

MTF vs. Image Height at 10, 20 and 40 cycles/mm is illustrated in FIG. 3b. These curves indicate that Example 3 is extremely well corrected at f/1.4, with MTF values at 40 cycles/mm well above 80% over the majority of the image circle. This extraordinary performance falls off very gradually to the corner of the field, and the S and T curves stay extremely close together. FIG. 3c shows distortion and astigmatism (Coddington curves). Both Distortion and astigmatism are virtually zero, and there is just a trace of field curvature. FIG. 3d is a plot of relative illumination vs. image height at f/1.4 and f/2.8, and it indicates that the Example 3 design has extremely low illumination falloff.

The primary group PG comprises the entire lens. As discussed above, PG comprises a negative powered front sub-group P1, followed by a positive powered sub-group P2, followed by a negative powered sub-group P3, followed by a sub-group P4 that can be either positively or negatively powered.

In Example 3, sub-group P1 comprises a single negative element 301. The nearly plano image-facing surface of element 301 is aspherical, and 301 is made of S-BSL7 to ensure that manufacturing this aspherical surface will not be problematic. The surface of sub-group P1 closest to the object is a concave surface.

Sub-group P2 comprises two positive groups: a positive singlet 303 and a positive triplet 312. The positive elements in groups 303, 304, and 306, are made of anomalous dispersion S-FPL53, S-FPL53, and S-PHM52. The single negative element 305 is made of a matching anomalous dispersion material N-KZFS4. Since most of the positive optical power for Example 1 resides in sub-group P2, the system as a whole is very well corrected for chromatic aberrations, and is in fact apochromatic over a waveband extending from the deep violet end of the visible spectrum to about 1000 nm in the near infrared.

Sub-group P3 comprises a positive powered singlet 307 and a negative powered singlet 308 to form an air spaced doublet. The combined power of elements 307 and 308 is negative. Ordinarily it would be advantageous to cement elements 307 and 308 together to loosen tolerances and improve transmission. However, the main purpose of Example 3 is to demonstrate that sub-group P3 can comprise an air-spaced doublet instead of the cemented doublet used in other examples. Of course, it would also be possible to formulate sub-group P3 as a cemented or air spaced triplet or quadruplet or even singlet without departing from the spirit of the present invention. Anomalous dispersion materials S-PHM52 and N-KZFS4 are used for the individual lens elements 307 and 308, respectively, which aids in the correction of secondary spectrum. The outer shape of air-spaced doublet P3 is meniscus toward the image plane. The concave surface SC is strongly curved and therefore helps a great deal in correcting field curvature and astigmatism.

Sub-group P4 is a fairly weak positive group comprising a positive doublet 313. Sub-group P4 serves mainly to correct distortion and astigmatism, and to make fine adjustments to the exit pupil location.

EXAMPLE 4

Figure 4A:
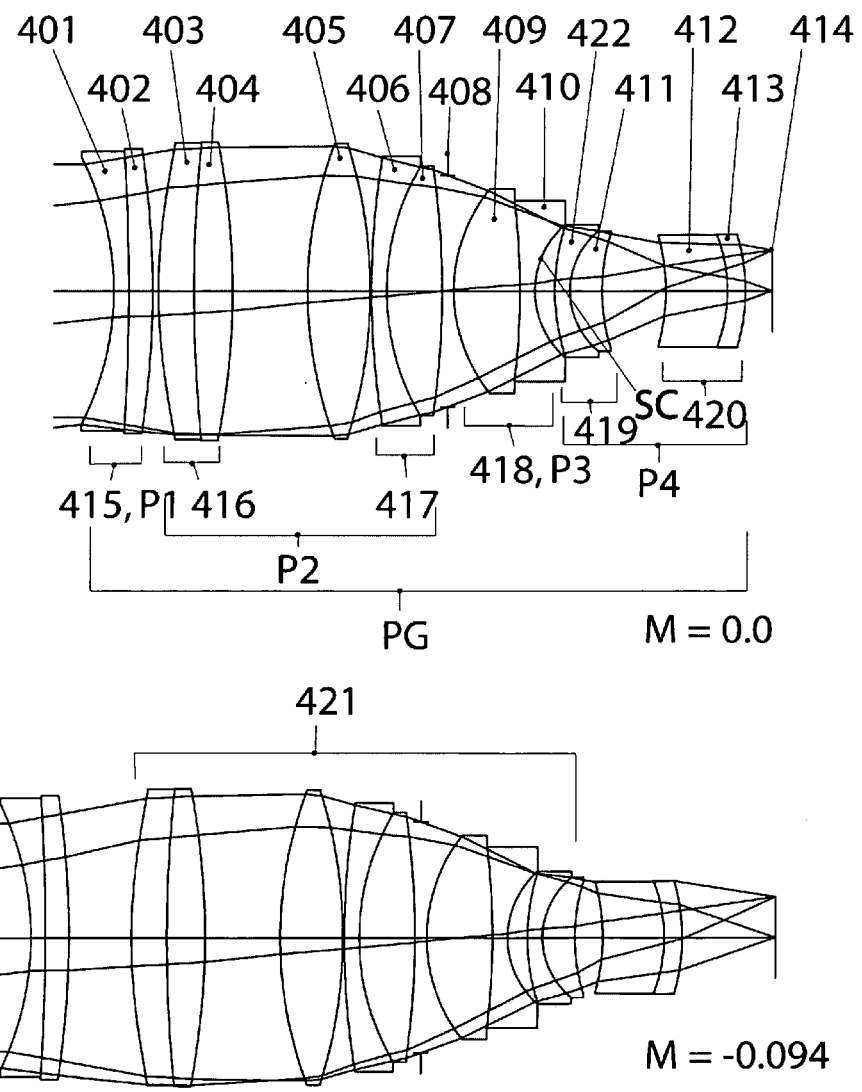
FIG. 4a is a layout drawing of an f/1.33 lens system showing magnification settings of 0.0× and −0.094× according to Example 4 of the present invention.

Example 4 is similar in form to Example 2, but is scaled and optimized for a longer 125 mm focal length. Chromatic aberration correction is also improved, and is now superachromatic in the visible to near infrared range. Example 4 is illustrated in FIG. 4a, which shows cross-sectional layouts at magnifications of 0 and −0.094×. All of the element and group designations mentioned below are shown in FIG. 4a. The relative aperture is f/1.33, the image diagonal is 28 mm, and the diagonal field of view (FOV) is 12.8 degrees.

Figure 4B:
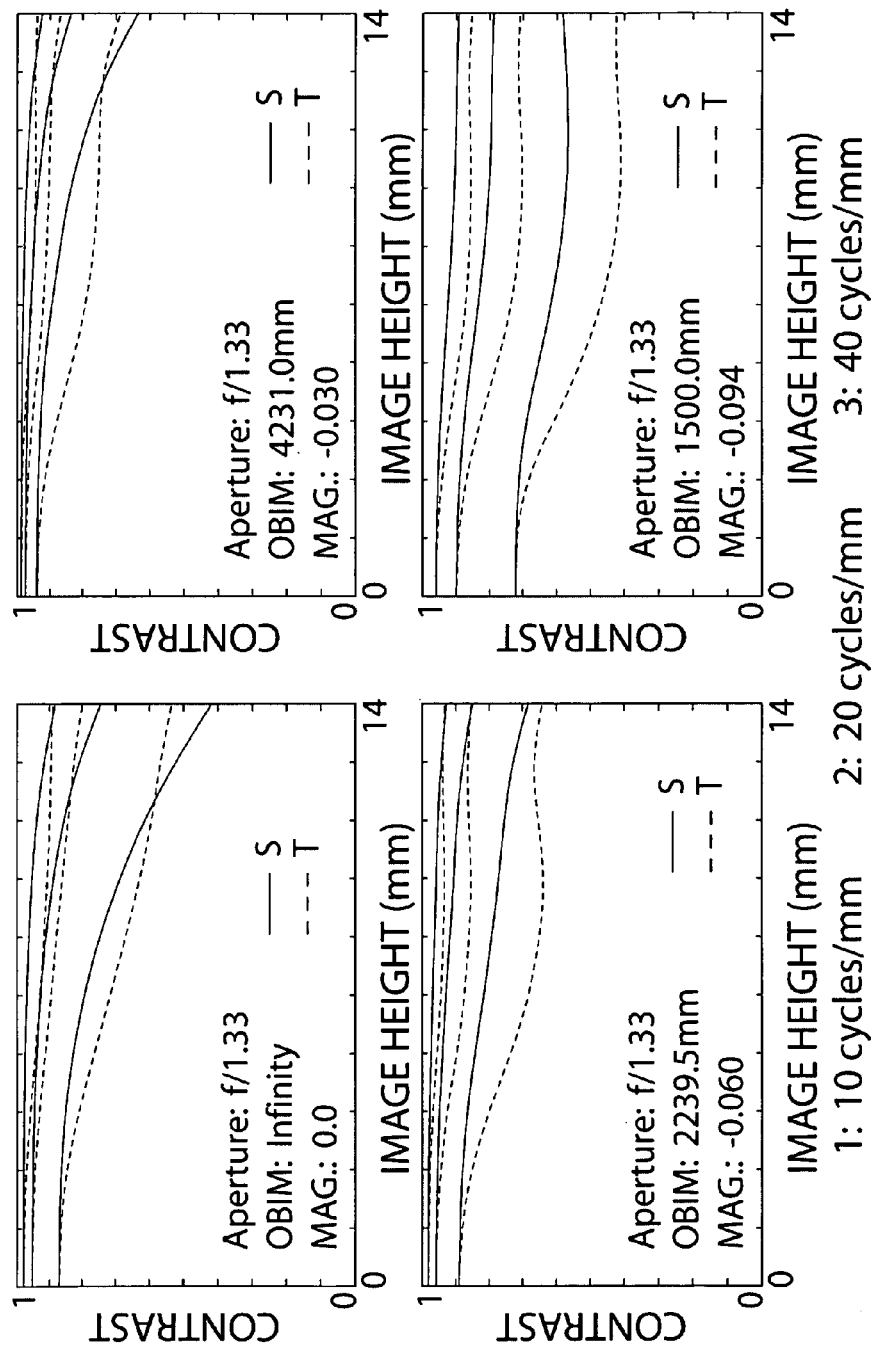
FIG. 4b are plots of MTF vs. Image Height at spatial frequencies of 10 cycles/mm, 20 cycles/mm and 40 cycles/mm for magnification settings of 0.0×, −0.030×, −0.060× and −0.094× over a waveband of 435 nm to 656 nm according to Example 4 of the present invention.
Figure 4C:
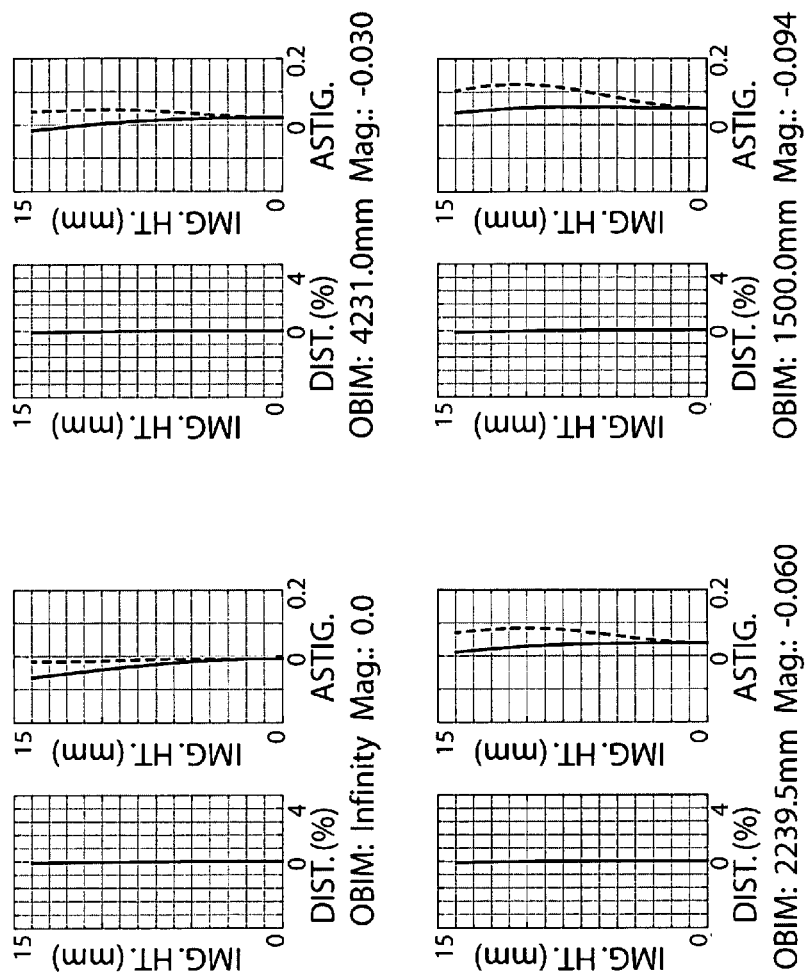
FIG. 4c are plots of Distortion and Astigmatism (S and T) vs. Image Height for magnification settings of 0.0×, −0.030×, −0.060× and −0.094× according to Example 4 of the present invention.

MTF vs. Image Height at 10, 20 and 40 cycles/mm for four different object distances is illustrated in FIG. 4b. These curves indicate that Example 4 is extremely well corrected at f/1.33, with MTF values at 40 cycles/mm greater than 80% near the optical axis except at the closest object distance. At the optimum object distance of about 3 to 4 meters the on-axis MTF at 40 cycles/mm exceeds 90% on-axis. This extraordinary performance falls off very gradually to the corner of the field, and the S and T curves stay reasonably close together. FIG. 4c shows distortion and astigmatism (Coddington curves) for the same four object distances used in FIG. 4b. Distortion is virtually zero at all magnifications, and astigmatism is also very well controlled. FIG. 4d is a plot of relative illumination vs. image height at f/1.33 and f/2.8, and it indicates that the Example 4 design has extremely low illumination falloff even at the widest aperture of f/1.33.

The primary group PG comprises the entire lens. As discussed above primary group PG comprises a negative powered front sub-group P1, followed by a positive powered sub-group P2, followed by a negative powered sub-group P3, followed by a sub-group P4 that can be either positively or negatively powered.

In Example 4, sub-group P1 comprises a single negative doublet 415. This doublet uses high-index anomalous dispersion materials N-KZFS4 and S-NPH1 to advantage, and as a result aids in reducing secondary and tertiary chromatic aberrations. The surface of sub-group P1 closest to the object is a concave surface.

Sub-group P2 comprises three positive groups: a positive doublet 416, a positive singlet 405 and a positive doublet 417. The positive elements 404, 405 and 407 are made of S-FPL53, CaF2, and S-FPL53, respectively. The single negative element 406 is made of a matching anomalous dispersion material N-KZFS4. Since most of the positive optical power for Example 4 resides in sub-group P2, the system as a whole is very well corrected for chromatic aberrations, and is in fact superachromatic over a waveband extending from the near ultraviolet to the near infrared.

Sub-group P3 comprises a single negative powered doublet 418. Anomalous dispersion materials S-PHM52 and N-KZFS4 are used for the individual lens elements 409 and 410, respectively, which aids in the correction of secondary spectrum. The outer shape of doublet 418 is meniscus toward the image plane. The concave surface SC is strongly curved and therefore helps a great deal in correcting field curvature and astigmatism.

Sub-group P4 is a fairly weak positive group comprising positive doublets 419 and 420. Sub-group P4 serves mainly to correct distortion and astigmatism, and to make fine adjustments to the exit pupil location.

Moving groups P1, 421, and 420 independently away from the image plane as illustrated by FIG. 4a accomplishes focusing from a distant to a close object. This complex focusing motion ensures that performance remains very high throughout the focusing range, and simultaneously ensures that breathing is almost zero. Breathing reaches a maximum value of only −0.78% at closest focus, which is very low for a longer focal length lens.

EXAMPLE 5

Figure 5A:
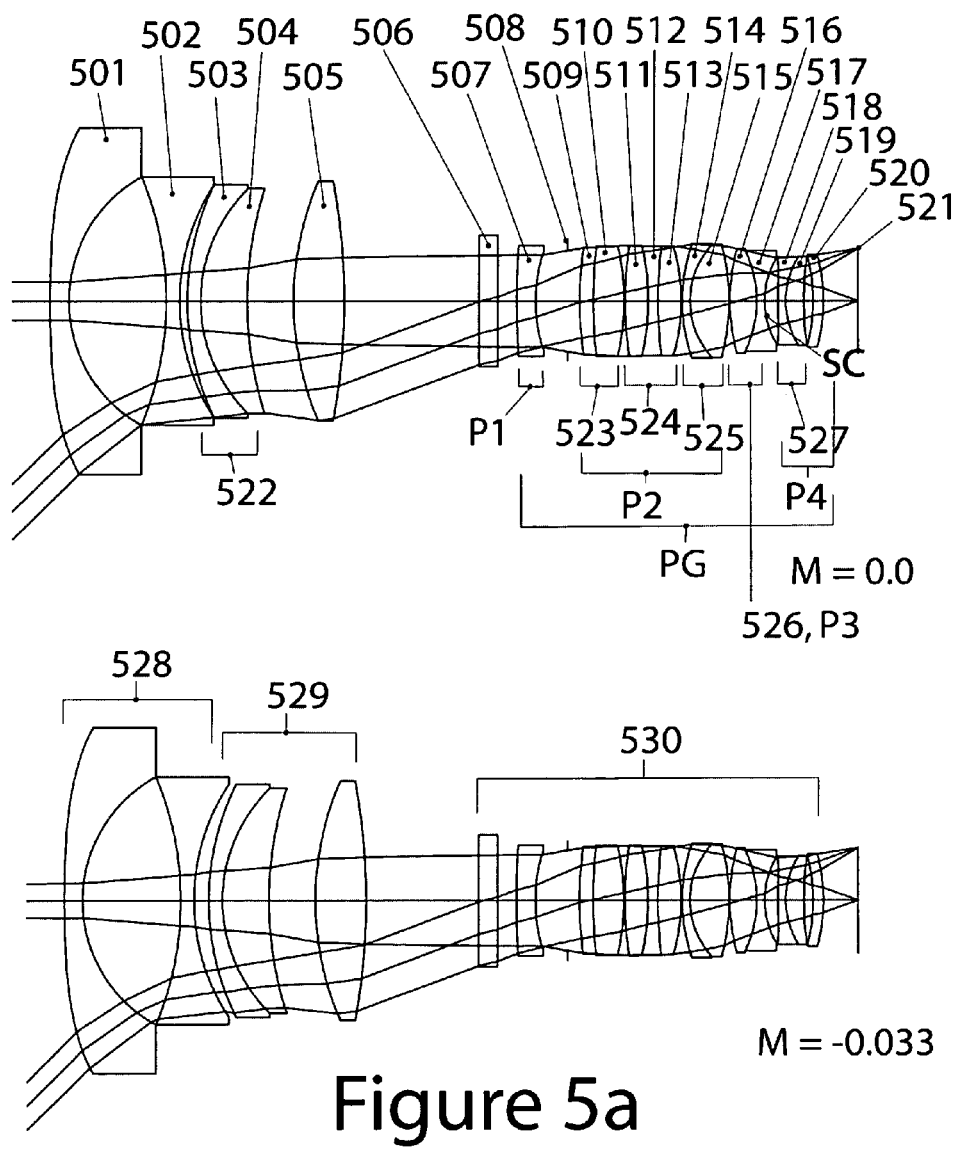
FIG. 5a is a layout drawing of an f/1.4 lens system showing magnification settings of 0.0× and −0.033× according to Example 5 of the present invention.

Example 5, which is a 14.5 mm focal length ultra wide-angle objective for 35 mm format cinematography, is illustrated in FIG. 5a, which shows cross-sectional layouts at magnifications of 0 and −0.033×. All of the element and group designations mentioned below are shown in FIG. 5a. The relative aperture is f/1.4, the image diagonal is 28 mm, and the diagonal field of view (FOV) is 89.12 degrees. Since this objective has a small amount of barrel distortion, it provides a somewhat larger field of view than its paraxial focal length of 14.5 mm would suggest. In this case the effective corrected focal length is equal to the image height of 14 mm divided by the tangent of the half angle of view (HFOV):

$$FC = IH/\tan(HFOV) = 14/\tan(44.56) = 14.2 \text{ mm}$$

Figure 5B:
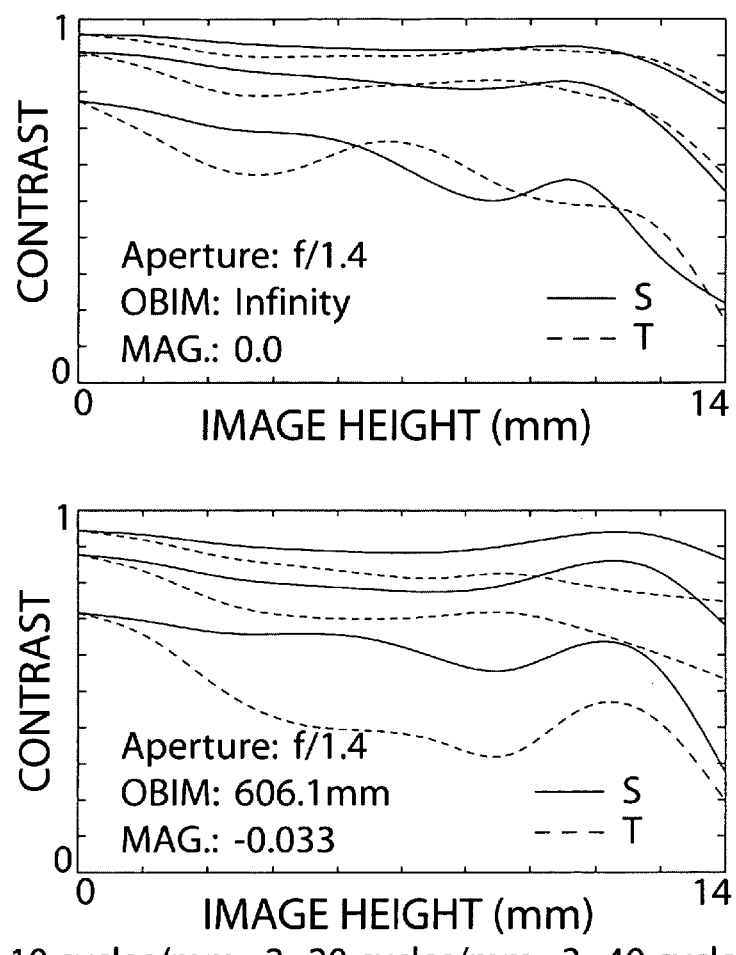
FIG. 5b are plots of MTF vs. Image Height at spatial frequencies of 10 cycles/mm, 20 cycles/mm and 40 cycles/mm for magnification settings of 0.0× and −0.033× over a waveband of 435 nm to 656 nm according to Example 5 of the present invention.
Figure 5C:
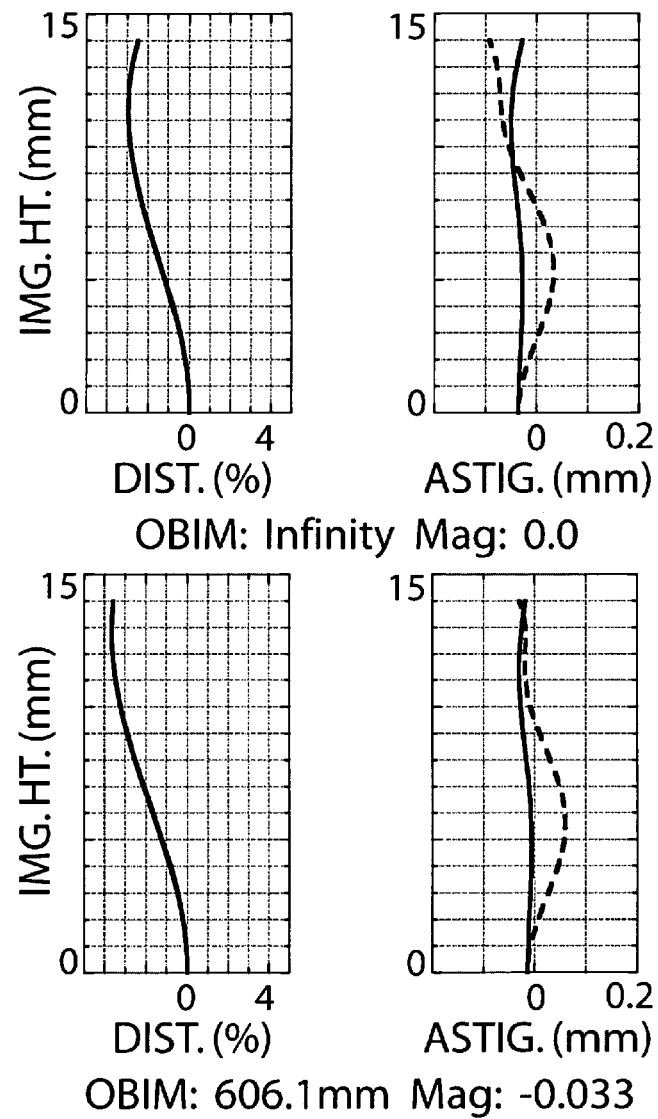
FIG. 5c are plots of Distortion and Astigmatism (S and T) vs. Image Height for magnification settings of 0.0× and −0.033× according to Example 5 of the present invention.
Figure 5D:
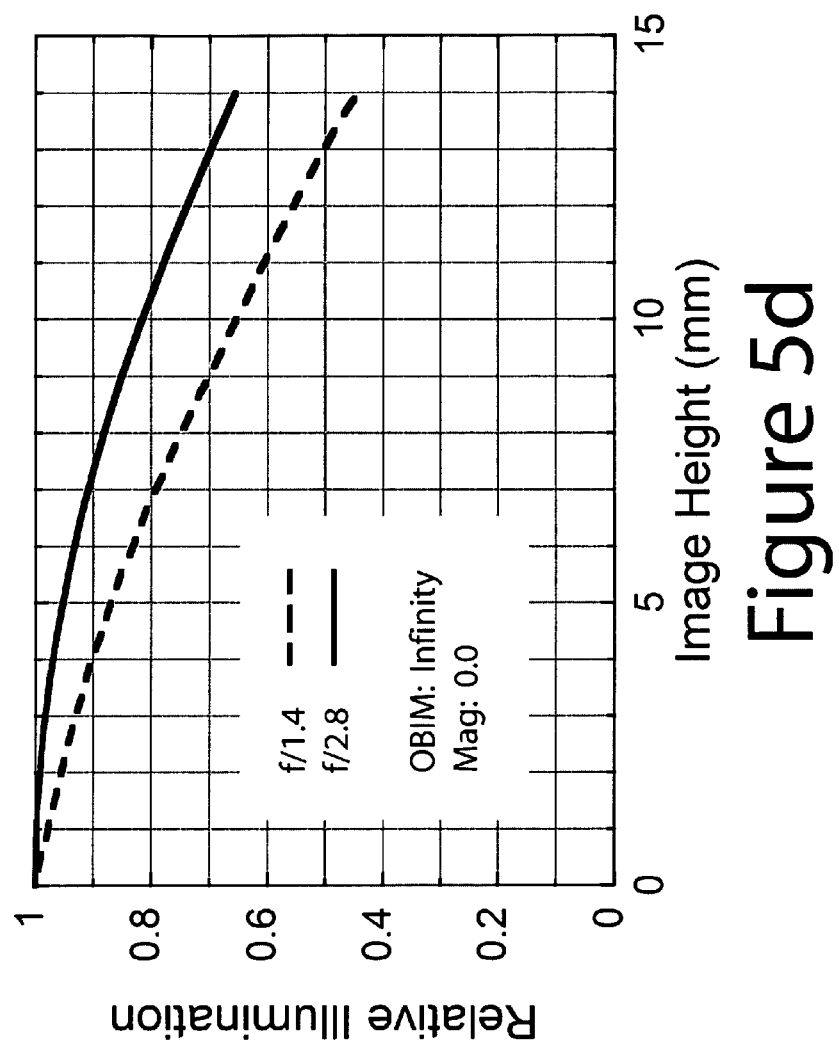
FIG. 5d is a plot of Relative Illumination vs. Image Height for apertures of f/1.4 and f/2.8 and a magnification of 0.0× according to Example 5 of the present invention.

MTF vs. Image Height at 10, 20 and 40 cycles/mm for four different object distances is illustrated in FIG. 5b. These curves indicate that Example 5 is well corrected at f/1.4, especially for such an extremely wide-angle objective. Performance falls off gradually to the corner of the field, and the S and T curves stay close together. FIG. 5c shows distortion and astigmatism (Coddington curves) for the same two object distances used in FIG. 5b. Distortion is very low for an ultra-wide angle lens, and astigmatism is also very well controlled. The shape of the distortion curve indicates that under corrected (barrel) third order distortion is partially balanced by overcorrected fifth order distortion. This provides excellent straight-line rendition that is significantly better than a pure under corrected distortion of the same magnitude would provide. FIG. 5d is a plot of relative illumination vs. image height at f/1.4 and f/2.8, and it indicates that the Example 5 design has low illumination falloff for a fast wide-angle lens.

The primary group PG comprises only the rear sub-group of Example 5. The front sub-group of the lens, comprising groups 528 and 529, functions approximately as a wide-angle afocal attachment that outputs nearly collimated light into primary group PG. Group 528 has negative power and includes an asphere on the outermost object-side surface. Group 529 has positive power to roughly collimate the light output from group 528. However, groups 528 and 529 together are not precisely afocal, and as a result the object magnification of primary group PG is −0.049×. As discussed above, primary PG comprises a negative powered front sub-group P1, followed by a positive powered sub-group P2, followed by a negative powered sub-group P3, followed by a sub-group P4 that can be either positively or negatively powered.

In Example 5, sub-group P1 comprises a single negative element 507. The concave image-facing surface of element 507 is aspherical, and 507 is made of S-NSL3 to ensure that manufacturing this aspherical surface will not be problematic. The surface of sub-group P1 closest to the object is a convex surface.

Sub-group P2 comprises three positive groups: a positive doublet 523, a positive triplet 524, and a positive doublet 525. The positive elements 510, 511, and 513 are all made of low-index anomalous dispersion material S-FPL53, and positive element 515 is made of anomalous dispersion material S-PHM52. The negative elements 509, 512, and 514 are all made of a matching anomalous dispersion material N-KZFS4. Since most of the positive optical power for Example 5 resides in sub-group P2, the system as a whole is very well corrected for chromatic aberrations, and is in fact apochromatic over a waveband extending from the deep violet end of the visible spectrum to the near infrared.

Sub-group P3 comprises a single negative powered doublet 526. Anomalous dispersion materials S-PHM52 and N-KZFS4 are used for the individual lens elements 516 and 517, respectively, which aids in the correction of secondary spectrum. The outer shape of doublet 526 is meniscus toward the image plane. The concave surface SC is strongly curved and therefore helps a great deal in correcting field curvature and astigmatism.

Sub-group P4 is a fairly weak positive group comprising a weak negative powered doublet 527 and a very weak positive powered meniscus singlet 520. Sub-group P4 serves mainly to correct distortion and astigmatism, and to make fine adjustments to the exit pupil location. The object-side surface of doublet 527 is aspherical in order to control higher order astigmatism.

Focusing from a distant to a close object is accomplished by moving groups 528 and 529 independently away from the image plane as illustrated by FIG. 5a. Primary group PG remains stationary with respect to the image plane, which substantially simplifies the mechanical design. This focusing motion ensures that performance remains very high throughout the focusing range, and simultaneously ensures that breathing is almost zero. Breathing reaches a maximum value of only −0.14% at closest focus, which is almost undetectable.

Because Example 5 has an extremely wide field of view any filter used in the conventional location on the object side of the front element would necessarily be very large. As an alternative, the filter can be placed inside the optical system closer to the aperture stop so that its size is reduced. Example 5 includes just such a filter: element 506, which is located just in front of primary group PG. This location is particularly advantageous in this case because it is a nearly collimated air space. This means that the tolerances on the thickness of the filter can be very loose if desired. The filter can be placed on a turret along with a wide range of other filters.

EXAMPLE 6

Figure 6A:
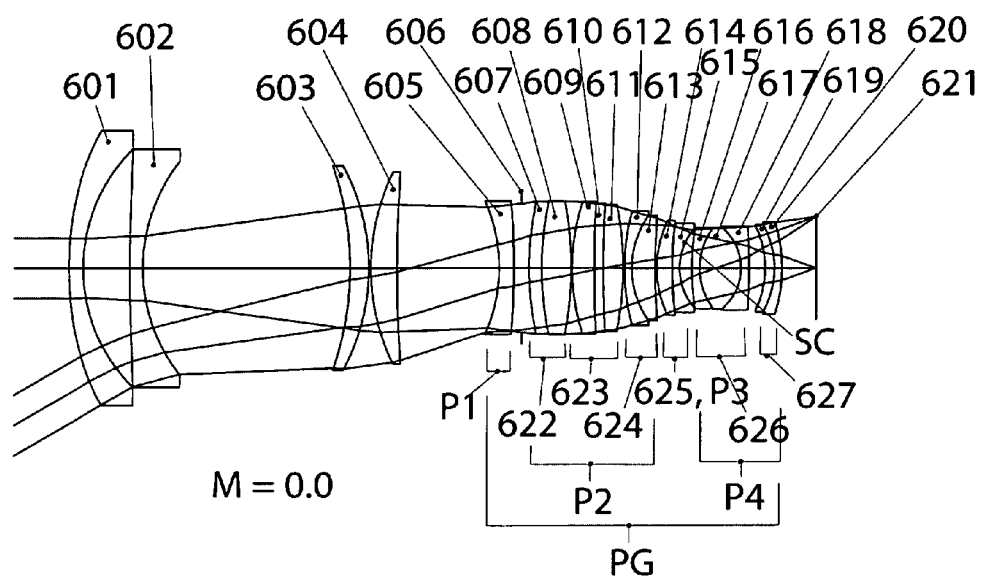
FIG. 6a is a layout drawing of an f/1.4 lens system showing magnification settings of 0.0× and −0.05× according to Example 6 of the present invention.
Figure 6A:
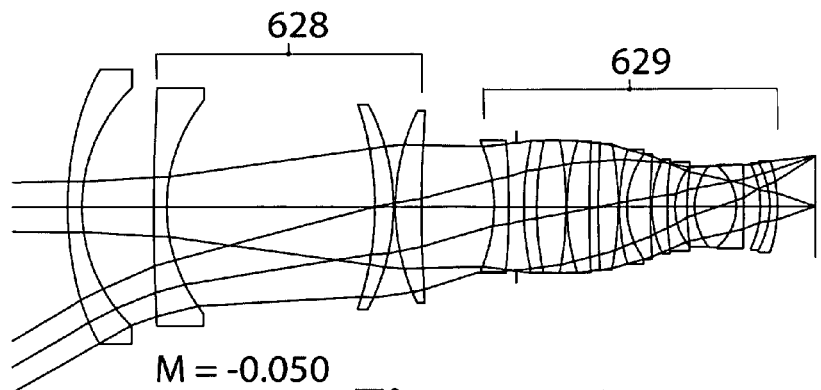

Example 6, which is a 24 mm focal length wide-angle objective for 35 mm format cinematography, is illustrated in FIG. 6a, which shows cross-sectional layouts at magnifications of 0 and −0.05×. All of the element and group designations mentioned below are shown in FIG. 6a. The relative aperture is f/1.4, the image diagonal is 28 mm, and the diagonal field of view (FOV) is 60.5 degrees.

Figure 6B:
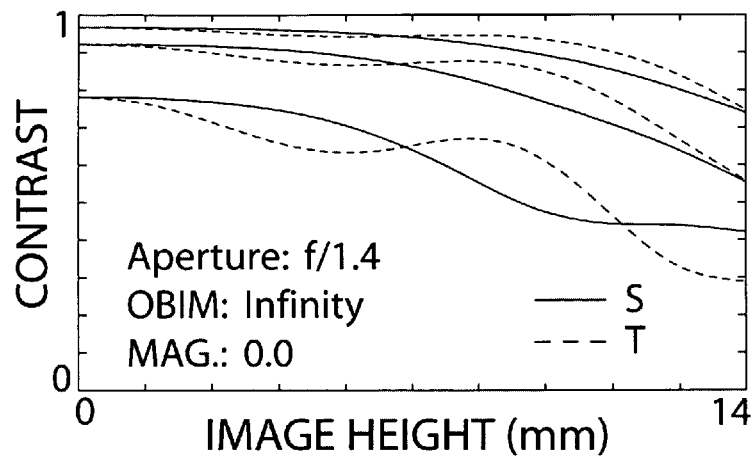
FIG. 6b are plots of MTF vs. Image Height at spatial frequencies of 10 cycles/mm, 20 cycles/mm and 40 cycles/mm for magnification settings of 0.0× and −0.05× over a waveband of 435 nm to 656 nm according to Example 6 of the present invention.
Figure 6B:
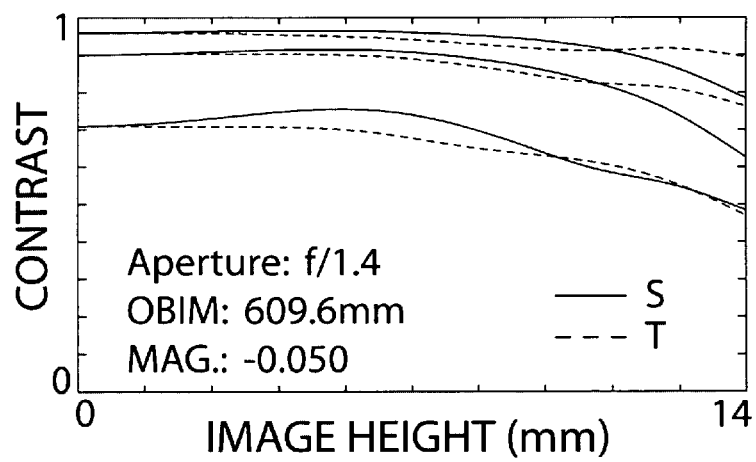
Figure 6C:
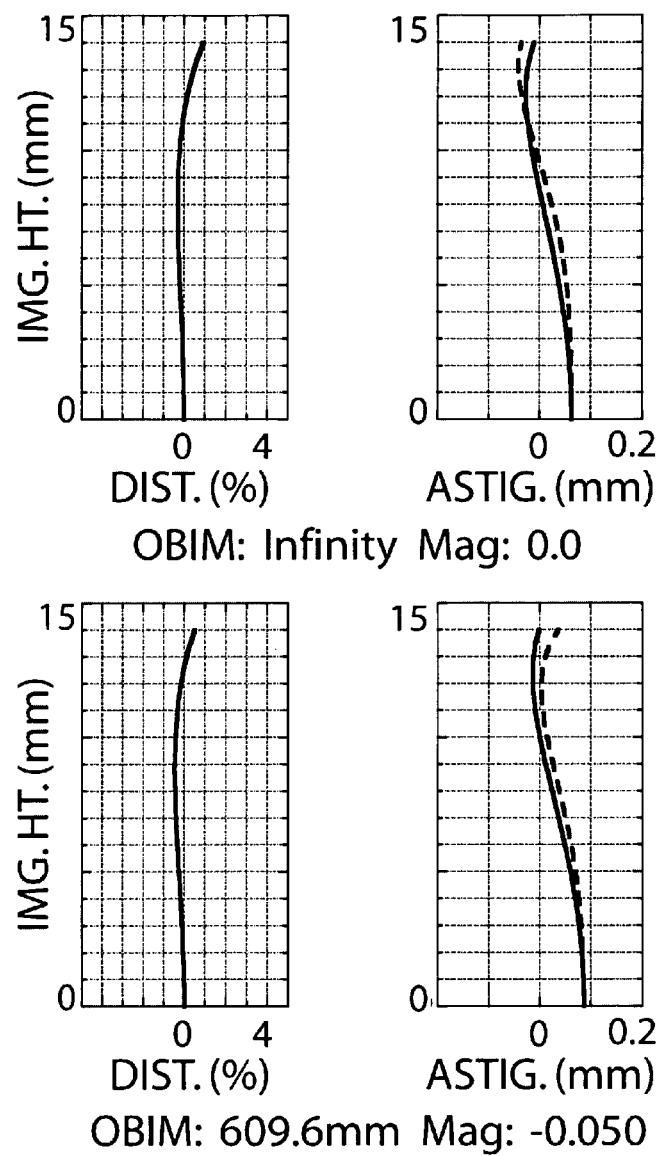
FIG. 6c are plots of Distortion and Astigmatism (S and T) vs. Image Height for magnification settings of 0.0×, and −0.05× according to Example 6 of the present invention.
Figure 6D:
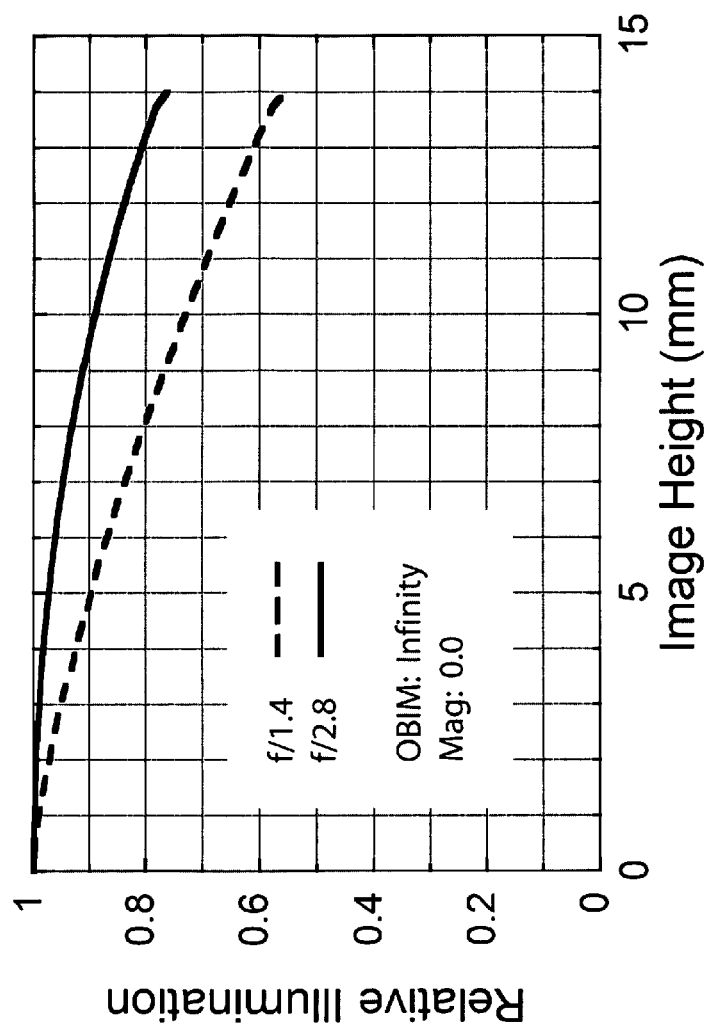
FIG. 6d is a plot of Relative Illumination vs. Image Height for apertures of f/1.4 and f/2.8 and a magnification of 0.0× according to Example 6 of the present invention.

MTF vs. Image Height at 10, 20 and 40 cycles/mm for four different object distances is illustrated in FIG. 1b. These curves indicate that Example 6 is well corrected at f/1.4, with MTF values at 40 cycles/mm approaching 80% near the optical axis for longer object distances. This excellent performance falls off gradually to the corner of the field, and the S and T curves stay close together. FIG. 6c shows distortion and astigmatism (Coddington curves) for the same two object distances used in FIG. 6b. Distortion is very low at all magnifications, and astigmatism is also very well controlled. FIG. 6d is a plot of relative illumination vs. image height at f/1.4 and f/2.8, and it indicates that the Example 6 design has very low illumination falloff.

The primary group PG comprises only the rear portion of Example 6. The front portion of the lens, comprising elements 601, 602, 603, and 604, functions approximately as a wide-angle afocal attachment that outputs nearly collimated light into primary group PG. Elements 601 and 602 both have negative power, and element 601 includes as asphere on its object side surface to correct distortion. Elements 603 and 604 both have positive power, and combine to roughly collimate the light output from group elements 601 and 602. However, the collimation is not perfect, and as a result the object magnification of PG is +0.088×. As discussed above, primary group PG comprises a negative powered front sub-group P1, followed by a positive powered sub-group P2, followed by a negative powered sub-group P3, followed by a sub-group P4 that can be either positively or negatively powered.

In Example 6, sub-group P1 comprises a single negative element 605 with a concave object-facing surface.

Sub-group P2 comprises three positive groups: a positive doublet 622, a positive triplet 623, and a positive doublet 624. The positive elements 608, 609, 611 and 613 are made of anomalous dispersion materials S-FPL53, S-FPL53, S-FPL51, and S-PHM52, respectively. The negative elements 610 and 612 are both made of a matching anomalous dispersion material N-KZFS4. Since most of the positive optical power for Example 6 resides in sub-group P2, the system as a whole is very well corrected for chromatic aberrations, and is in fact apochromatic over a waveband extending from the deep violet end of the visible spectrum to the near infrared.

Sub-group P3 comprises a single negative powered doublet 625. Anomalous dispersion materials S-PHM52 and N-KZFS4 are used for the individual lens elements 614 and 615, respectively, which aids in the correction of secondary spectrum. The outer shape of doublet 625 is meniscus toward the image plane. The concave surface SC is strongly curved and therefore helps a great deal in correcting field curvature and astigmatism.

Sub-group P4 is a fairly weak positive group comprising a positive triplet 626 and a negative doublet 627. Sub-group P4 serves mainly to correct distortion and astigmatism, and to make fine adjustments to the exit pupil location.

Focusing from a distant to a close object is accomplished by moving groups 628 and 629 independently toward and away from the image plane as illustrated by FIG. 6*a*. Element 601 is stationary with respect to the image plane, which means that the vertex length of the system as a whole remains constant during focusing. This focusing motion ensures that performance remains very high throughout the focusing range, and simultaneously ensures that breathing is well corrected. Breathing reaches a maximum value of 2.01% at closest focus.

EXAMPLE 7

Figure 7A:
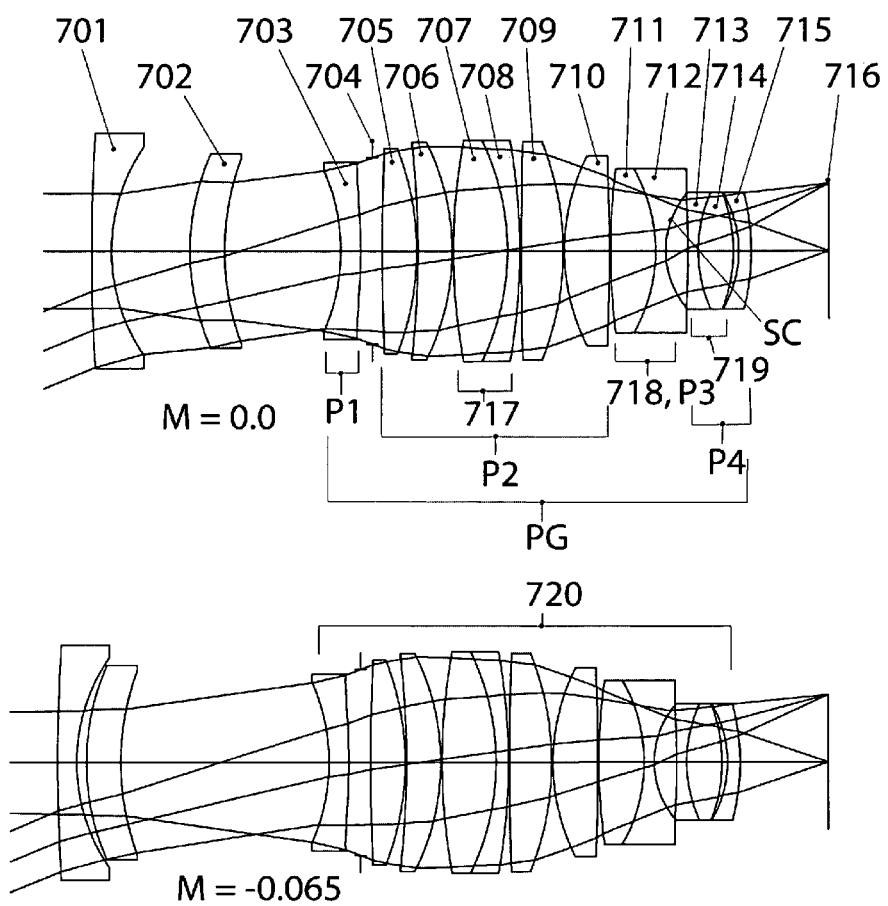
FIG. 7a is a layout drawing of an f/1.4 lens system showing magnification settings of 0.0× and −0.065× according to Example 7 of the present invention.

Example 7, which is a 35 mm focal length objective for 35 mm format cinematography, is illustrated in FIG. 7*a*, which shows cross-sectional layouts at magnifications of 0 and −0.065×. All of the element and group designations mentioned below are shown in FIG. 7*a*. The relative aperture is f/1.4, the image diagonal is 28 mm, and the diagonal field of view (FOV) is 44.5 degrees.

Figure 7B:
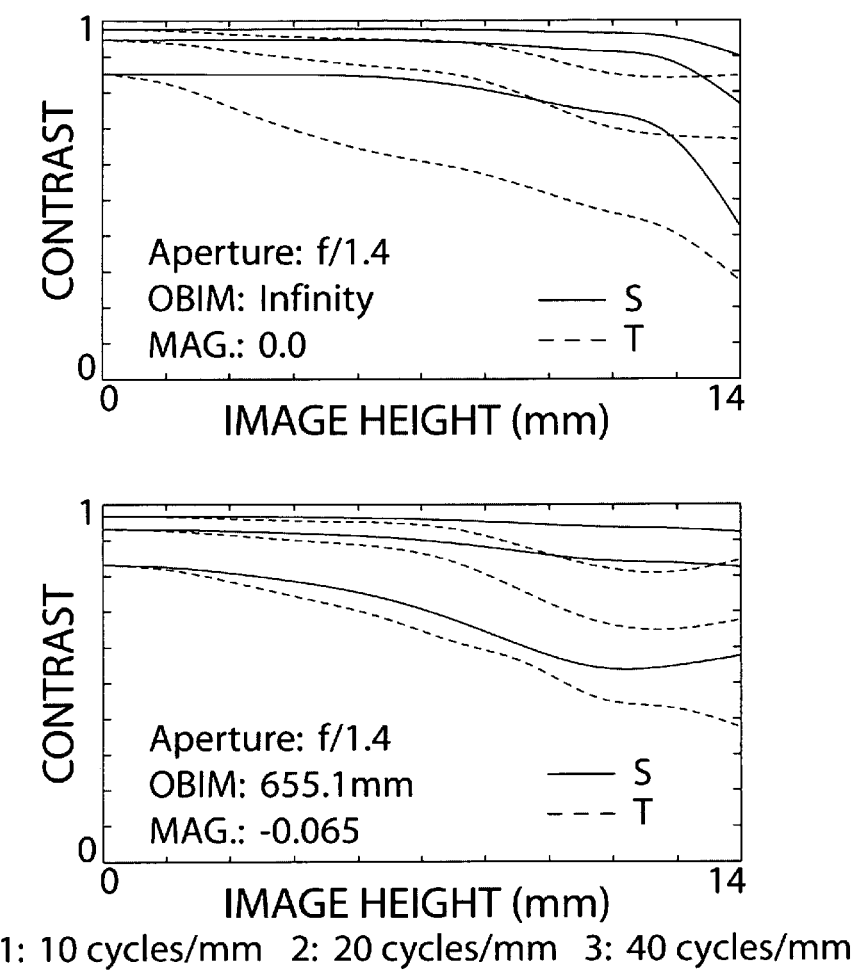
FIG. 7b are plots of MTF vs. Image Height at spatial frequencies of 10 cycles/mm, 20 cycles/mm and 40 cycles/mm for magnification settings of 0.0× and −0.065× over a waveband of 435 nm to 656 nm according to Example 7 of the present invention.
Figure 7C:
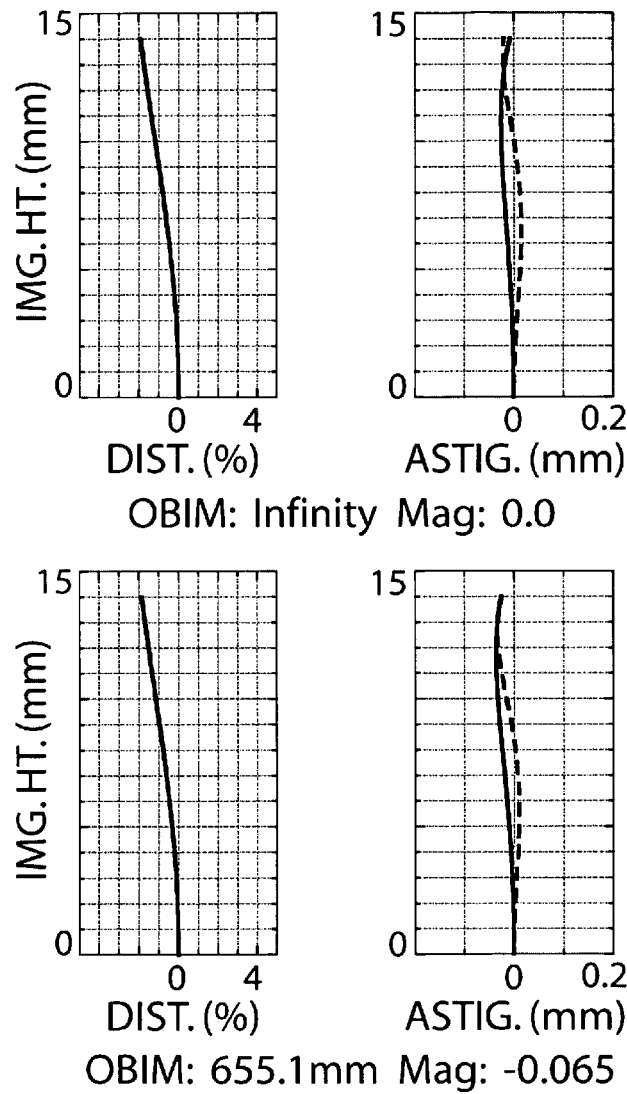
FIG. 7c are plots of Distortion and Astigmatism (S and T) vs. Image Height for magnification settings of 0.0× and −0.065× according to Example 7 of the present invention.

MTF vs. Image Height at 10, 20 and 40 cycles/mm for four different object distances is illustrated in FIG. 7*b*. These curves indicate that Example 7 is extremely well corrected at f/1.4, with MTF values at 40 cycles/mm greater than 80% near the optical axis for all object distances. This extraordinary performance falls off very gradually to the corner of the field. FIG. 7*c* shows distortion and astigmatism (Coddington curves) for the same two object distances used in FIG. 1*b*. Both distortion and astigmatism are well controlled. FIG. 7*d* is a plot of relative illumination vs. image height at f/1.4 and f/2.8, and it indicates that the Example 7 design has low illumination falloff.

The primary group PG comprises only the rear sub-group of Example 7. The front sub-group of the lens, comprising elements 701 and 702, functions roughly as a wide-angle afocal attachment for primary group PG. Elements 701 and 702 have negative and positive power, respectively, and element 701 includes as asphere on its convex object side surface to correct distortion. The object magnification of PG is −0.364× when the lens is focused on a distant object. As discussed above, primary group PG comprises a negative powered front sub-group P1, followed by a positive powered sub-group P2, followed by a negative powered sub-group P3, followed by a sub-group P4 that can be either positively or negatively powered.

In Example 7, sub-group P1 comprises a single negative element 703 with a concave object-facing surface. The convex image-facing surface of 703 is aspheric in order correct spherical aberration. Element 703 is made of S-BSL7 to enhance manufacturability.

Sub-group P2 comprises five positive groups: two positive singlets 705 and 706, followed by a positive doublet 717, followed by two more positive singlets 709 and 710. Elements 705, 706, 707, and 710 are all made from low-index anomalous dispersion material S-FPL51, and element 709 is made from low-index anomalous dispersion material S-FPL53. The single negative element 708 is made of a matching anomalous dispersion material N-KZFS4. Since most of the positive optical power for Example 7 resides in sub-group P2, the system as a whole is very well corrected for chromatic aberrations, and is in fact apochromatic over a waveband extending from the deep violet end of the visible spectrum to the near infrared.

Sub-group P3 comprises a single negative powered doublet 718. Anomalous dispersion materials S-PHM52 and N-KZFS4 are used for the individual lens elements 711 and 712, respectively, which aids in the correction of secondary spectrum. The outer shape of doublet 718 is meniscus toward the image plane. The concave surface SC is strongly curved and therefore helps a great deal in correcting field curvature and astigmatism.

Sub-group P4 is a fairly weak positive group comprising a positive doublet 719, a negative meniscus singlet 715. P4 serves mainly to correct distortion and astigmatism, and to make fine adjustments to the exit pupil location.

Focusing from a distant to a close object is accomplished by moving groups 701, 702 and PG independently away from the image plane as illustrated by FIG. 7*a*. This complex focusing motion ensures that performance remains very high throughout the focusing range, and simultaneously ensures that breathing is almost zero. Breathing reaches a maximum value of only −0.03% at closest focus, which is almost undetectable.

EXAMPLE 8

Figure 8A:
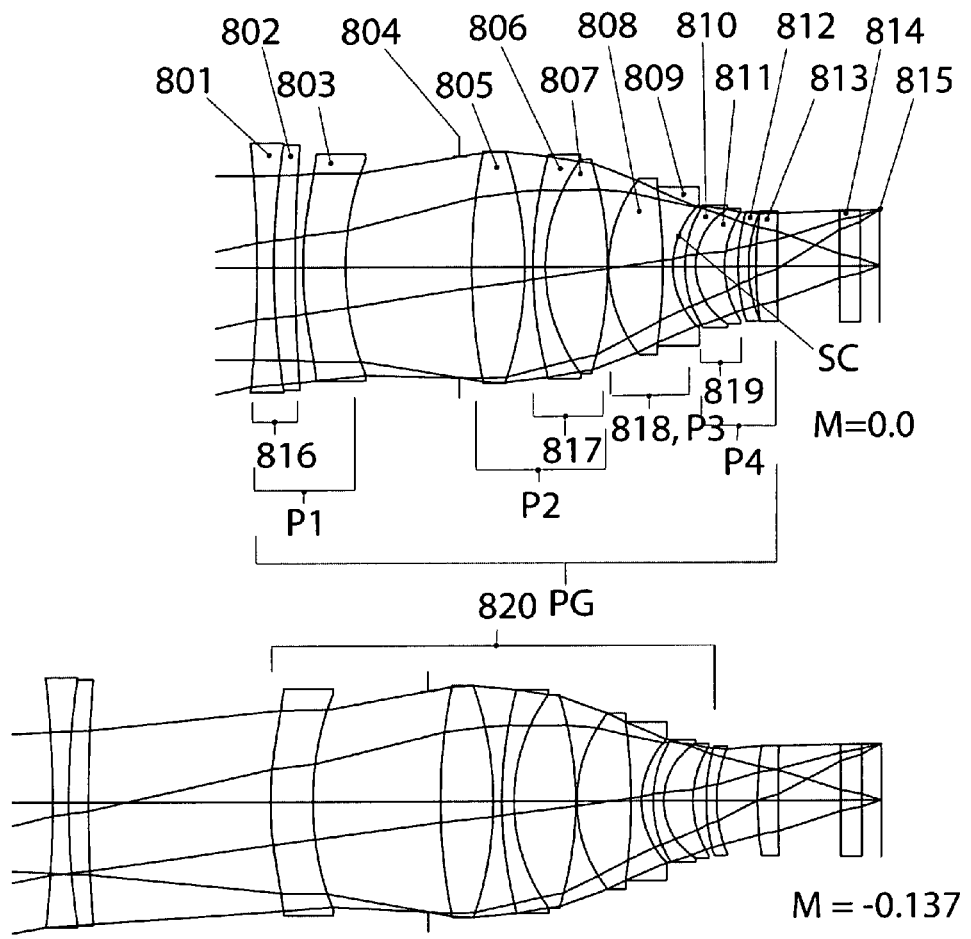
FIG. 8a is a layout drawing of an f/1.33 lens system showing magnification settings of 0.0× and −0.137× according to Example 8 of the present invention.

Example 8, which is a 65 mm focal length objective for 35 mm format cinematography, is illustrated in FIG. 8*a*, which shows cross-sectional layouts at magnifications of 0 and −0.137×. All of the element and group designations mentioned below are shown in FIG. 8*a*. The relative aperture is f/1.33, the image diagonal is 28 mm, and the diagonal field of view (FOV) is 24.3 degrees.

Example 8 is very similar to Example 1, with a key difference that it has been made athermal by the use of acrylic polymer for element 803. One of the reasons for the very high optical performance of all of the examples in the present invention is that they are either apochromatic or superachromatic. This is brought about by extensive use of anomalous dispersion materials such as CaF2, S-FPL53, S-FPL51, and S-PHM52. Unfortunately, all of these materials have a high thermal expansion coefficient coupled with a large negative value for dn/dt. As a result, the focal plane will drift significantly with temperature. Although this focus drift can be dealt with by various active and passive mechanical means, it is most desirable to eliminate it by passive optical means.

Since most of the thermal drift mentioned above is caused by positive lens elements made of materials with a negative dn/dt, it follows that the thermal drift can be corrected by introducing one or more negative elements with an even larger negative value for dn/dt. Fortunately, such materials do exist in the form of optically transparent polymers such as acrylic. In the case of acrylic, its change of refractive index with temperature (dn/dt) is about an order of magnitude greater than that of the anomalous dispersion glasses listed above, so all that is necessary is to incorporate a relatively weak negative powered acrylic element. In Example 1 the third element has weak negative power and is made from S-BSL7, which has a roughly similar refractive index to acrylic. So, for Example 8, this third element was replaced by a similar element made from acrylic, and optimized for athermal performance over a broad temperature range. FIG. 8*c* is a plot of MTF vs. Image Height at a spatial frequency of 20 cycles/mm for three different temperatures of 0 C, 20 C, and 40 C. No re-focusing is done for the different temperatures, and the mounting material is assumed to be aluminum. FIG. 8*c* clearly shows that Example 8 is athermal in the sense that it maintains excellent optical performance at a large aperture over a wide temperature range without re-focusing.

Figure 8B:
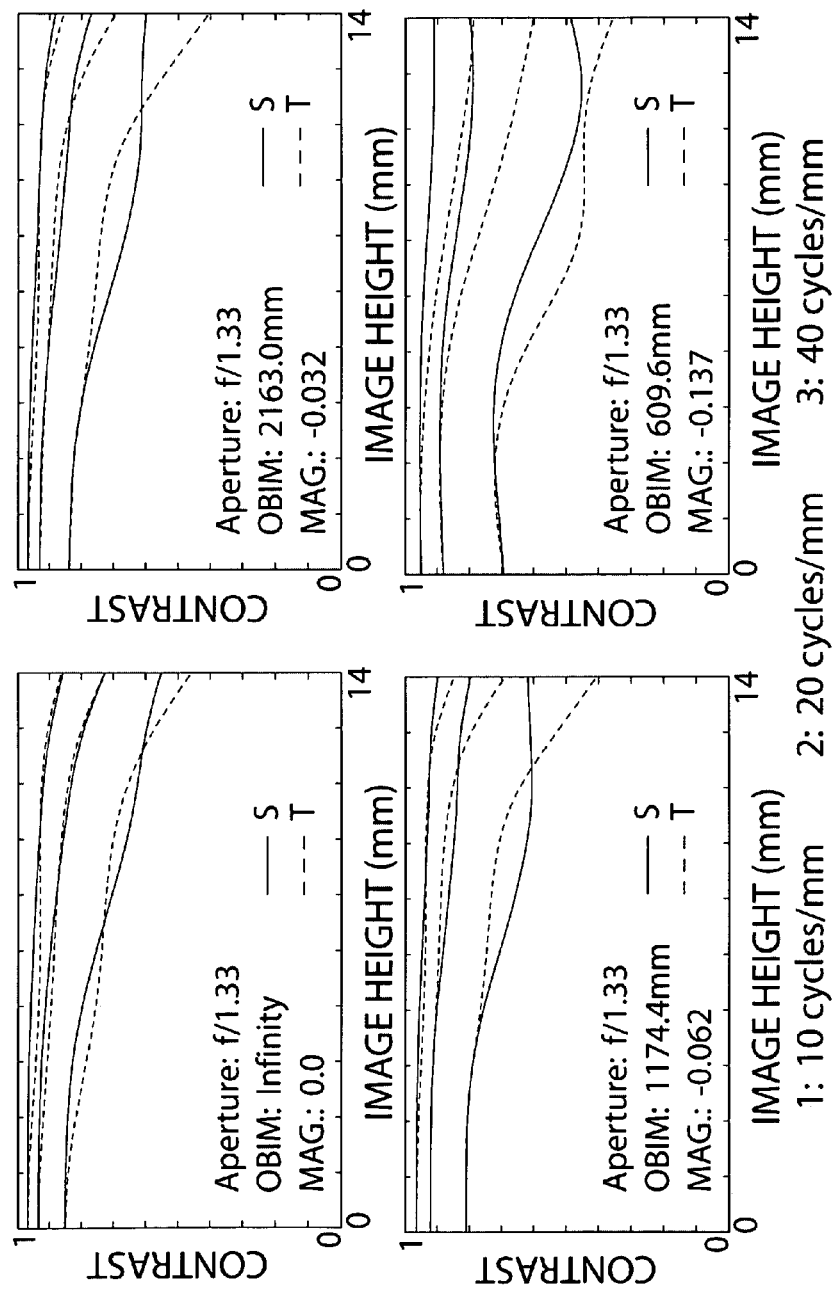
FIG. 8b are plots of MTF vs. Image Height at spatial frequencies of 10 cycles/mm, 20 cycles/mm and 40 cycles/mm for magnification settings of 0.0×, −0.032×, −0.064× and −0.137× over a waveband of 435 nm to 656 nm according to Example 8 of the present invention.
Figure 8C:
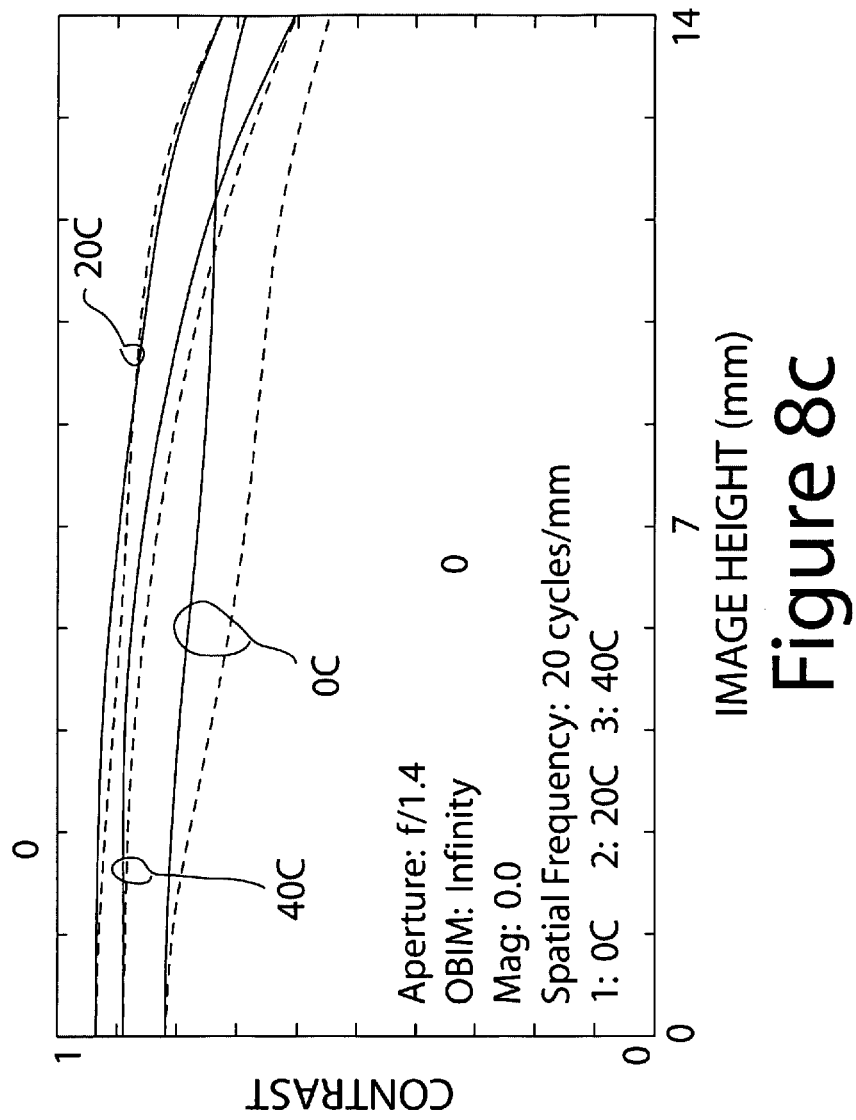
FIG. 8c is a plot of MTF vs. Image Height at a spatial frequency of 20 cycles/mm for temperatures of 0 C, 20 C and 40 C according to Example 8 of the present invention.
Figure 8D:
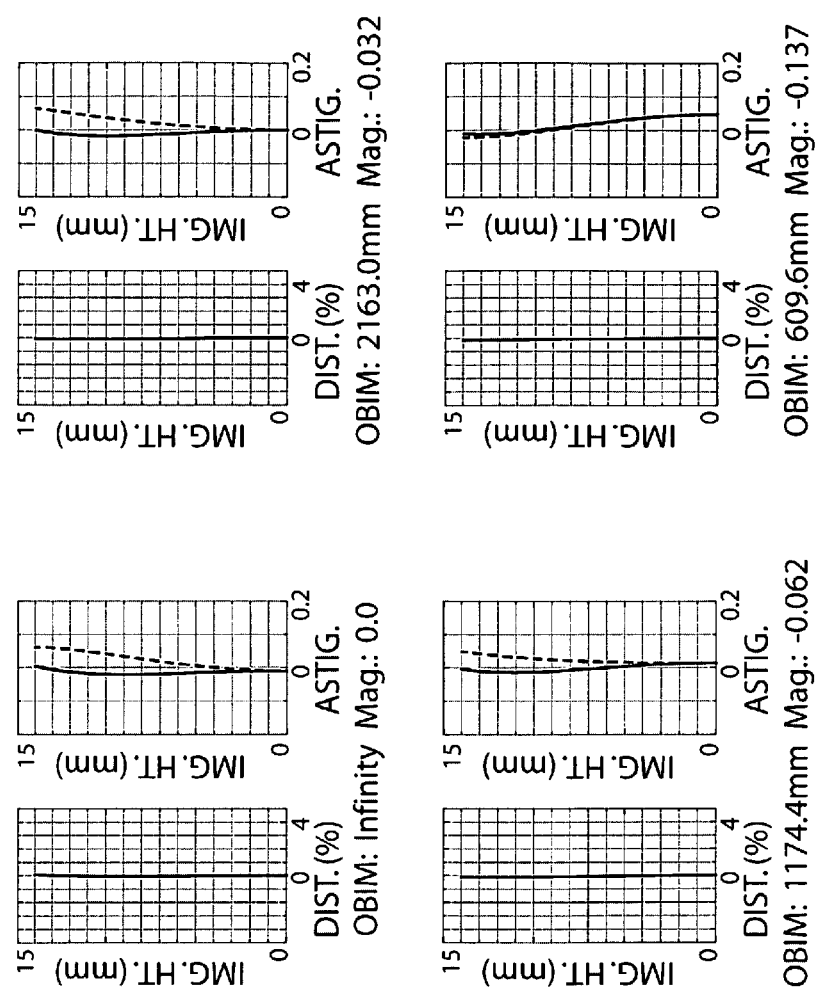
FIG. 8d are plots of Distortion and Astigmatism (S and T) vs. Image Height for magnification settings of 0.0×, −0.032×, −0.064× and −0.137× according to Example 8 of the present invention.

MTF vs. Image Height at 10, 20 and 40 cycles/mm for four different object distances is illustrated in FIG. 8*b*. These curves indicate that Example 8 is extremely well corrected at f/1.33, with MTF values at 40 cycles/mm greater than 80% near the optical axis except at closest focus. This excellent performance falls off very gradually to the corner of the field, and the S and T curves stay close together. FIG. 8d shows distortion and astigmatism (Coddington curves) for the same four object distances used in FIG. 8b. Distortion is virtually zero at all magnifications, and astigmatism is also very well controlled. FIG. 8e is a plot of relative illumination vs. image height at f/1.33 and f/2.8, and it indicates that the Example 8 design has extremely low illumination falloff.

The primary group, PG comprises the entire lens except for a plane parallel filter element 814. As discussed above, primary group PG comprises a negative powered front sub-group P1, followed by a positive powered sub-group P2, followed by a negative powered sub-group P3, followed by a sub-group P4 that can be either positively or negatively powered.

In Example 8, sub-group P1 comprises two negative groups: a negative doublet 816 and a negative singlet 803. The convex object-facing surface of element 803 is aspherical, and 803 is made of acrylic polymer to achieve athermalization and to ensure straightforward manufacturing. Acrylic optical elements can be made either by direct diamond machining or by molding. The doublet 816 uses high-index anomalous dispersion materials N-KZFS4 and S-NPH1 to advantage, and as a result aids in reducing secondary and tertiary chromatic aberrations. The surface of P1 closest to the object is a concave surface.

Sub-group P2 comprises two positive groups: a positive singlet 805 and a positive doublet 817. The positive elements in groups P2, 805 and 807 are both made of low-index anomalous dispersion material S-FPL51. The single negative element 806 is made of a matching anomalous dispersion material N-KZFS4. Since most of the positive optical power for Example 8 resides in sub-group P2, the system as a whole is very well corrected for chromatic aberrations, and is in fact apochromatic over a waveband extending from the deep violet end of the visible spectrum to about 1000 nm in the near infrared.

Sub-group P3 comprises a single negative powered doublet 818. Anomalous dispersion materials S-FPL51y and N-KZFS4 are used for the individual lens elements 808 and 809, respectively, which aids in the correction of secondary spectrum. The outer shape of doublet 818 is meniscus toward the image plane. The concave surface SC is strongly curved and therefore helps a great deal in correcting field curvature and astigmatism.

Sub-group P4 is a fairly weak positive group comprising a positive doublet 819, a negative singlet 812, and a positive singlet 813. Sub-group P4 serves mainly to correct distortion and astigmatism, and to make fine adjustments to the exit pupil location.

Element 814 is a plane parallel plate that serves to model the effect of the anti-aliasing filter, the IR/UV filter, and the sensor cover plate that are commonly found in digital cameras. As in the analogous Element 114 in Example 1, Element 814 is not intended as a precise model for any particular brand or model of camera, but rather is intended as a viable means for avoiding any filter-induced aberrations. In Example 8, element 814 has been made fairly thick, and in all likelihood would be too thick to accurately model a camera filter pack. However, in this case the thickness of element 814 could be reduced so that when a real filter pack is introduced the aberration balance is not disturbed. This is particularly important in digital photography and cinematography with extremely well corrected high-speed lenses because the filter pack thickness is likely to vary from camera to camera, and it will be a great advantage to be able to customize the lens for an individual camera simply by changing a filter in the rear.

Focusing from a distant to a close object is accomplished by independently moving groups P1 and 820 away from the image plane, as illustrated by FIG. 8a. Element 813 is stationary with respect to the image plane. This complex focusing motion ensures that performance remains very high throughout the focusing range, and simultaneously ensures that breathing is almost zero. Breathing reaches a maximum value of only 0.14% in the middle of the focusing range, which is almost undetectable. In Example 8, sub-group P1 moves a relatively great distance during focusing because it is a relatively weak group. Although this results in a good aberration balance and loose tolerances it does also result in greater bulk as the lens is focused up close.

EXAMPLE 9

Figure 9A:
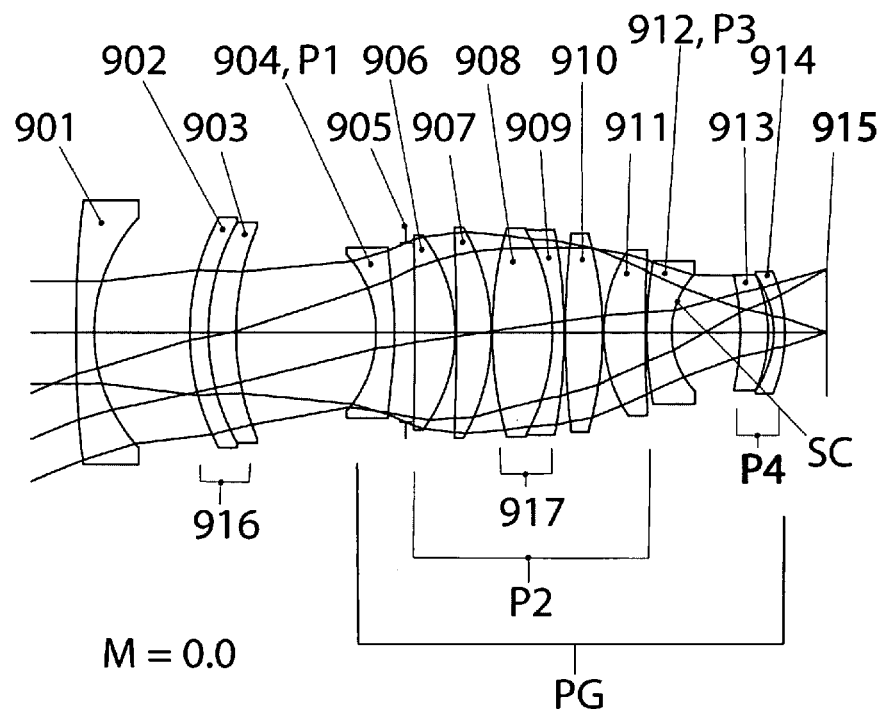
FIG. 9a is a layout drawing of an f/1.4 lens system showing magnification settings of 0.0× and −0.064× according to Example 9 of the present invention.
Figure 9A:
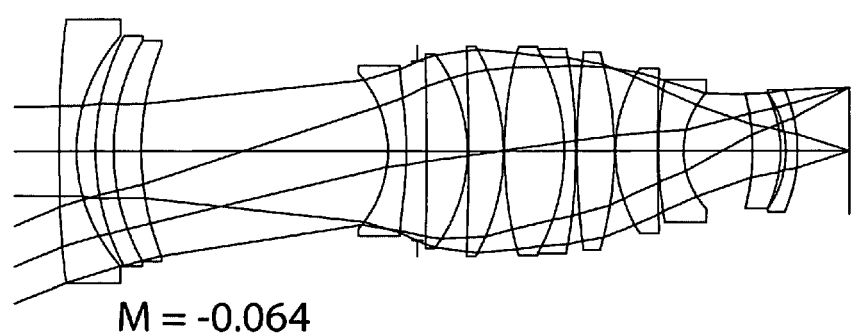

Example 9, which is a 35 mm focal length objective for 35 mm format cinematography, is illustrated in FIG. 9a, which shows cross-sectional layouts at magnifications of 0 and −0.037×. All of the element and group designations mentioned below are shown in FIG. 9a. The relative aperture is f/1.4, the image diagonal is 28 mm, and the diagonal field of view (FOV) is 43.6 degrees.

Figure 9B:
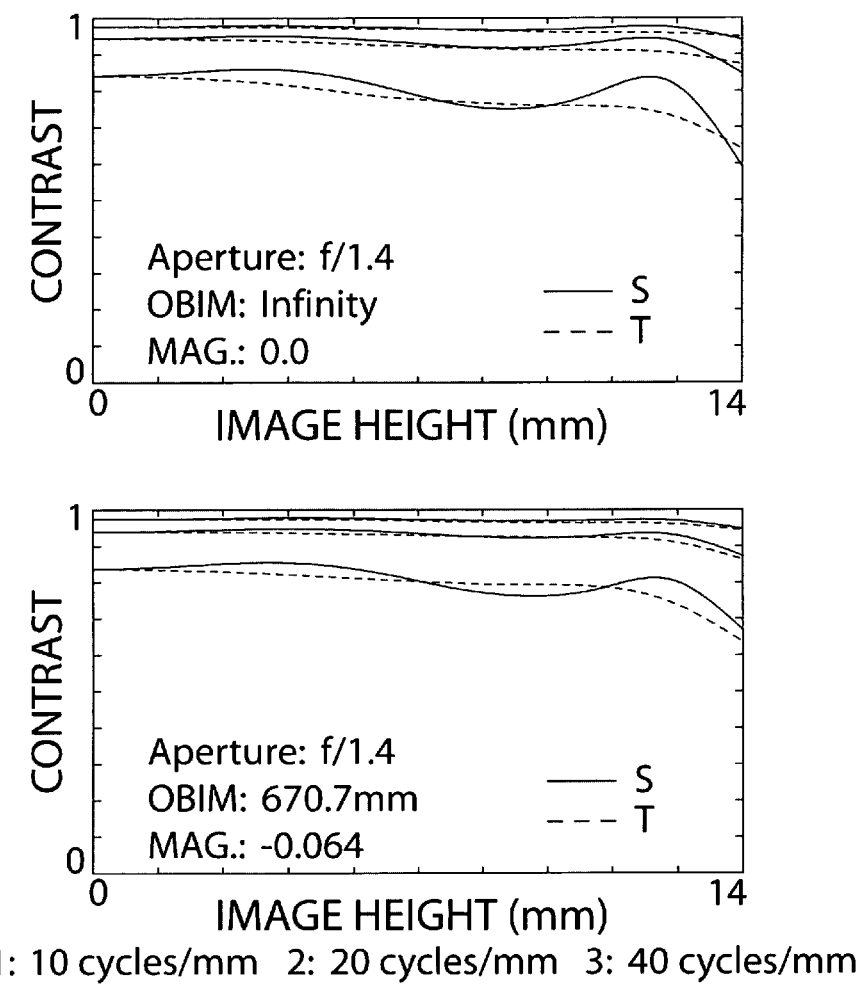
FIG. 9b are plots of MTF vs. Image Height at spatial frequencies of 10 cycles/mm, 20 cycles/mm and 40 cycles/mm for magnification settings of 0.0× and −0.064× over a waveband of 435 nm to 656 nm according to Example 9 of the present invention.
Figure 9C:
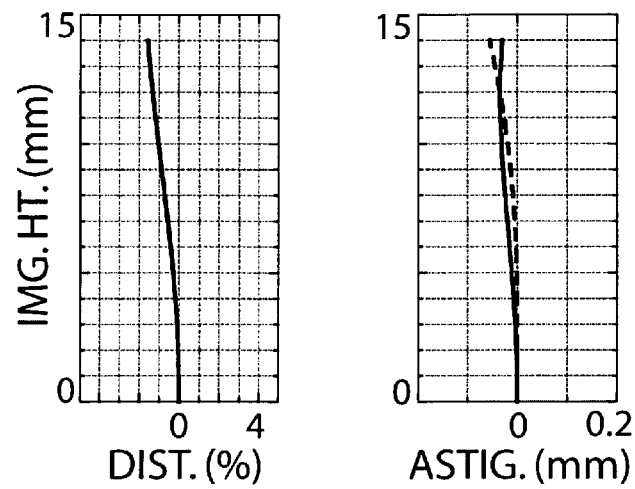
FIG. 9c are plots of Distortion and Astigmatism (S and T) vs. Image Height for magnification settings of 0.0× and −0.064× according to Example 9 of the present invention.
Figure 9C:
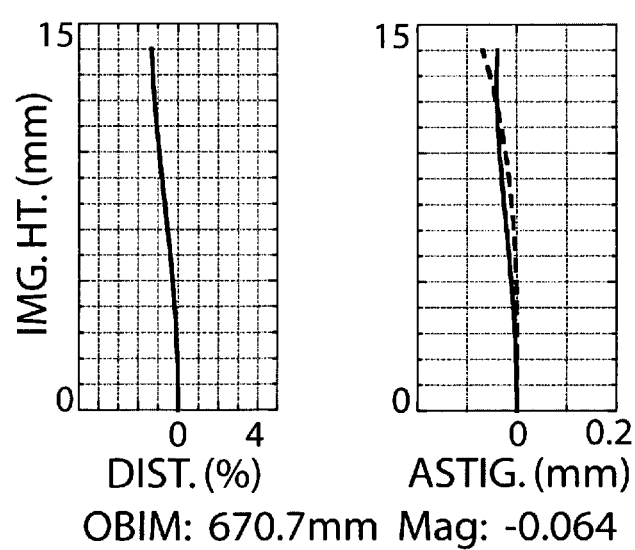
Figure 9D:
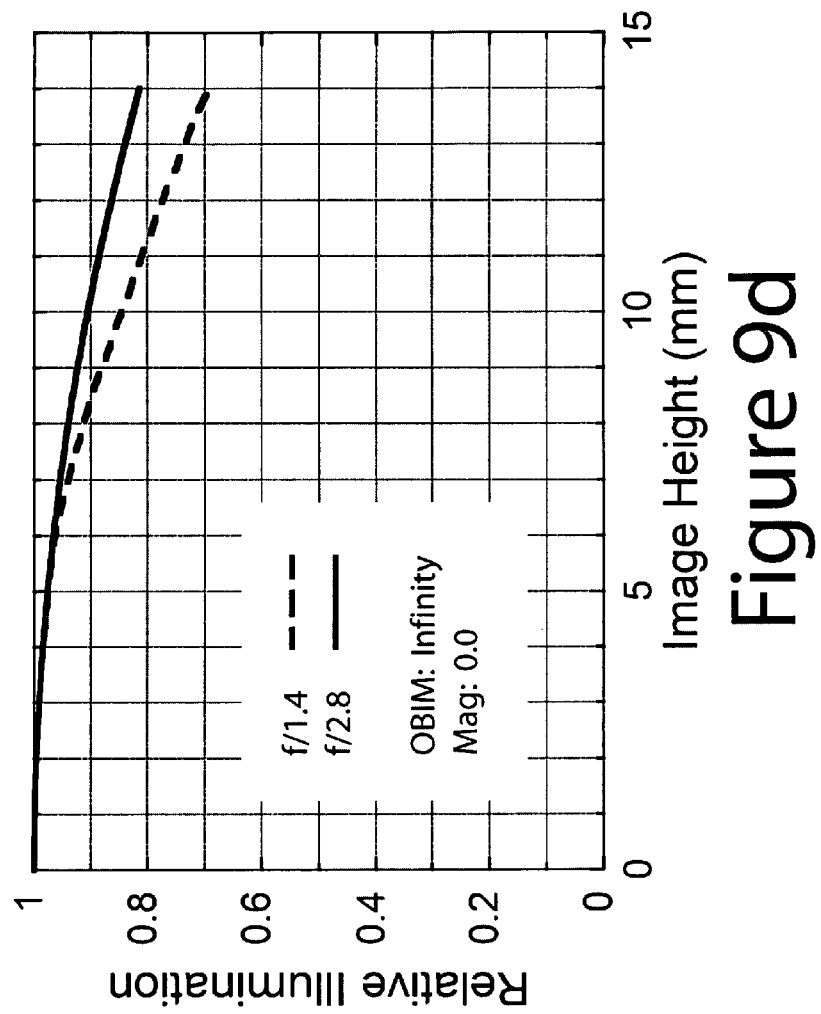
FIG. 9d is a plot of Relative Illumination vs. Image Height for apertures of f/1.4 and f/2.8 and a magnification of 0.0× according to Example 9 of the present invention.

MTF vs. Image Height at 10, 20 and 40 cycles/mm for four different object distances is illustrated in FIG. 9b. These curves indicate that Example 9 is extremely well corrected at f/1.4, with MTF at 20 cycles/mm exceeding 90% over nearly the entire field of view and MTF at 40 cycles/mm exceeding 80% over a large central portion of the field of view. Performance falls off very gradually from the center to the corner of the field, and the S and T curves stay close together. FIG. 9c shows distortion and astigmatism (Coddington curves) for the same two object distances used in FIG. 9b. Both distortion and astigmatism are very well corrected. FIG. 9d is a plot of relative illumination vs. image height at f/1.4 and f/2.8, and it indicates that the Example 9 design has low illumination falloff.

The primary group PG comprises only the rear sub-group of Example 5. The front sub-group of the lens, comprising groups 901 and 916, functions approximately as a wide-angle afocal attachment in front of primary group PG. Group 901 has negative power and includes an asphere on the outermost object-side surface. Group 916 has positive power to roughly collimate the light output from group 901. However, groups 901 and 916 together are not precisely afocal, and as a result the object magnification of primary group PG is −0.288×. As discussed above, primary PG comprises a negative powered front sub-group P1, followed by a positive powered sub-group P2, followed by a negative powered sub-group P3, followed by a sub-group P4 that can be either positively or negatively powered.

In Example 9, sub-group P1 comprises a single negative element 904. The convex image-facing surface of element 904 is aspherical, and 904 is made of S-BSL7 to ensure that manufacturing this aspherical surface will not be problematic. The surface of sub-group P1 closest to the object is a concave surface.

Sub-group P2 comprises five positive groups: two positive singlets 906 and 907, a positive doublet 917, and two positive singlets 910 and 911. The positive elements 906, 907, 908, 910, and 911 are all made of low-index anomalous dispersion material S-FPL53, and the negative element 909 is made of a matching anomalous dispersion material N-KZFS4. Since most of the positive optical power for Example 5 resides in sub-group P2, the system as a whole is very well corrected for chromatic aberrations, and is in fact apochromatic over a waveband extending from the deep violet end of the visible spectrum to the near infrared.

Sub-group P3 comprises a negative powered singlet 912 made of anomalous dispersion material N-KZFS4, which aids in the correction of secondary spectrum. Element 912 is meniscus toward the image plane. The concave surface SC is strongly curved and therefore helps a great deal in correcting field curvature and astigmatism.

Sub-group P4 is a fairly weak positive group comprising a positive powered singlet 913 and a negative powered singlet 914. Sub-group P4 serves mainly to correct distortion and astigmatism, and to make fine adjustments to the exit pupil location.

Focusing from a distant to a close object is accomplished by moving groups 901, 916, and PG independently away from the image plane as illustrated by FIG. 9a. This complex focusing motion ensures that performance remains very high throughout the focusing range, and simultaneously ensures that breathing is almost zero. Breathing reaches a maximum value of only −0.23% at closest focus, which is almost undetectable.

EXAMPLE 10

Figure 10A:
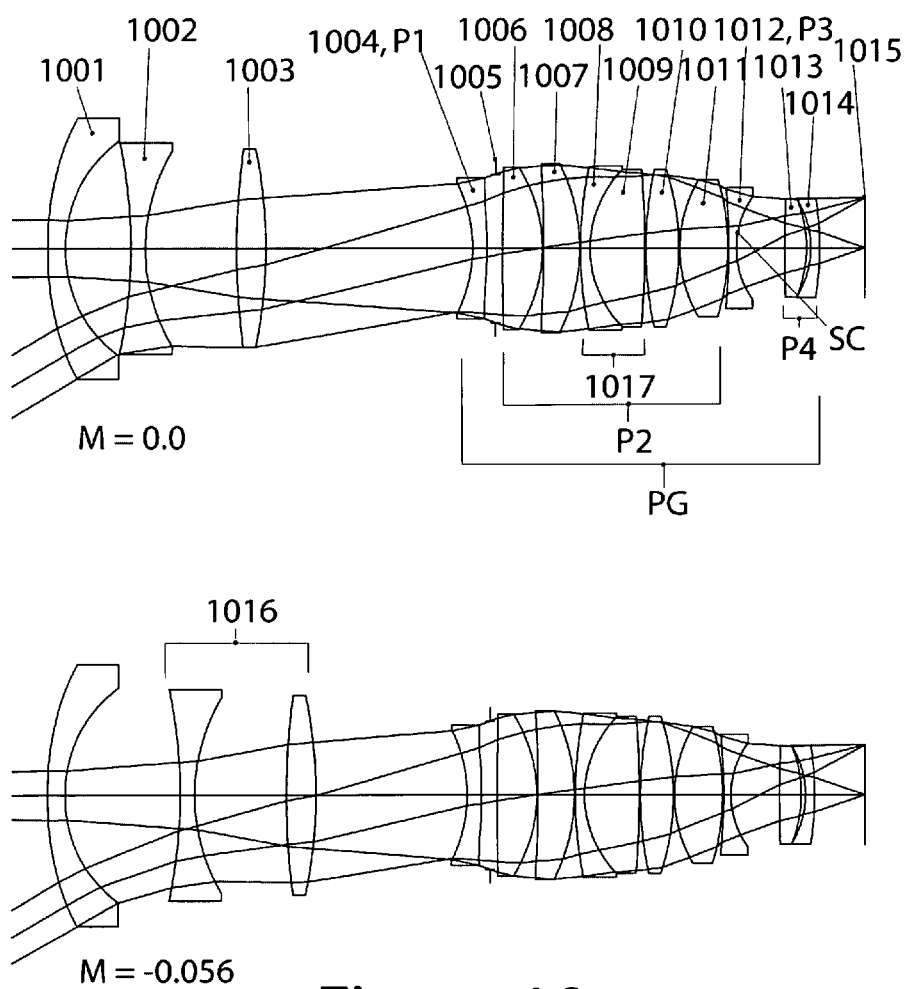
FIG. 10a is a layout drawing of an f/1.4 lens system showing magnification settings of 0.0× and −0.056× according to Example 10 of the present invention.

Example 10, which is a 24 mm focal length wide-angle objective for 35 mm format cinematography, is illustrated in FIG. 10a, which shows cross-sectional layouts at magnifications of 0 and −0.056×. All of the element and group designations mentioned below are shown in FIG. 10a. The relative aperture is f/1.4, the image diagonal is 28 mm, and the diagonal field of view (FOV) is 60.5 degrees.

Figure 10B:
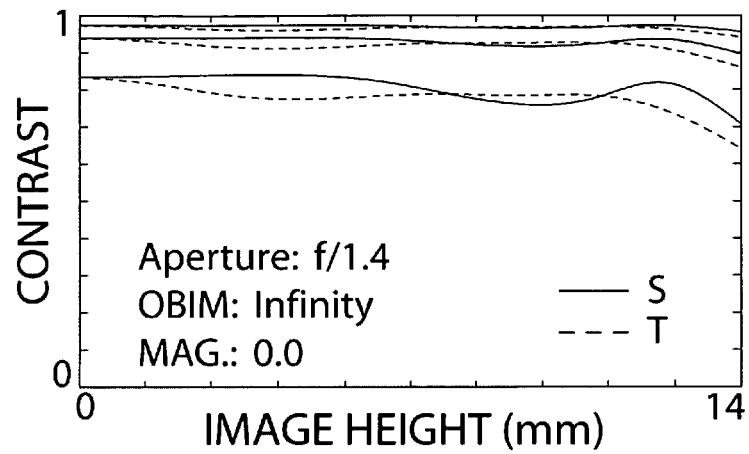
FIG. 10b are plots of MTF vs. Image Height at spatial frequencies of 10 cycles/mm, 20 cycles/mm and 40 cycles/mm for magnification settings of 0.0× and −0.056× over a waveband of 435 nm to 656 nm according to Example 10 of the present invention.
Figure 10B:
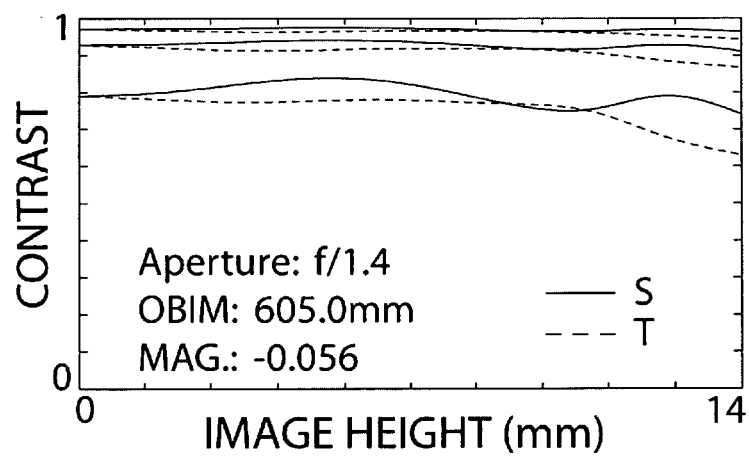
Figure 10C:
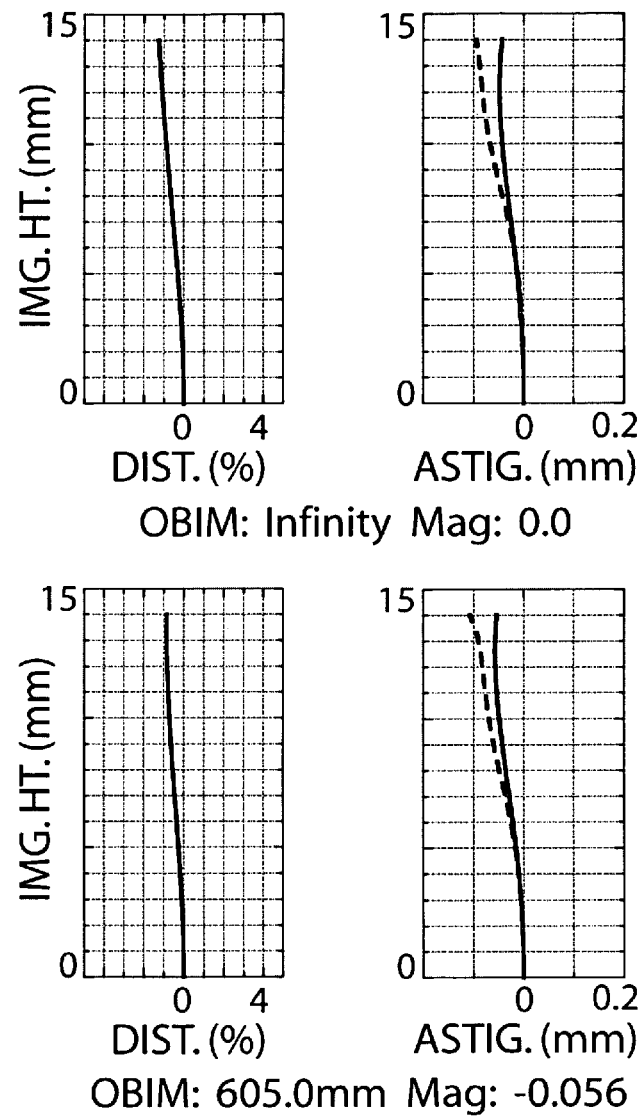
FIG. 10c are plots of Distortion and Astigmatism (S and T) vs. Image Height for magnification settings of 0.0× and −0.056× according to Example 10 of the present invention.

MTF vs. Image Height at 10, 20 and 40 cycles/mm for four different object distances is illustrated in FIG. 10b. These curves indicate that Example 10 is extremely well corrected at f/1.4, especially for a wide-angle objective. The MTF at 20 cycles exceeds 90% over nearly the entire field of view, and the MTF at 40 cycles/mm is approximately 80% over a large central region of the field of view. Performance falls off gradually to the corner of the field, and the S and T curves stay close together. FIG. 10c shows distortion and astigmatism (Coddington curves) for the same two object distances used in FIG. 10b. Distortion is very low for a wide-angle lens, and astigmatism is also very well controlled. FIG. 10d is a plot of relative illumination vs. image height at f/1.4 and f/2.8, and it indicates that the Example 10 design has low illumination falloff.

The primary group PG comprises only the rear sub-group of Example 10. The front sub-group of the lens, comprising groups 1001, 1002, and 1003, functions approximately as a wide-angle afocal attachment that outputs quasi-collimated light into primary group PG. Groups 1001 and 1002 have a combined negative power and include an asphere on the outermost object-side surface. Group 1003 has positive power to roughly collimate the light output from groups 1001 and 1002. However, groups 1001 and 1002 together are not precisely afocal, and as a result the object magnification of primary group PG is −0.210×. As discussed above, primary PG comprises a negative powered front sub-group P1, followed by a positive powered sub-group P2, followed by a negative powered sub-group P3, followed by a sub-group P4 that can be either positively or negatively powered.

In Example 10, sub-group P1 comprises a single negative element 1004. The convex image-facing surface of element 1004 is aspherical, and 1004 is made of S-BSL7 to ensure that manufacturing this aspherical surface will not be problematic. The surface of sub-group P1 closest to the object is a concave surface.

Sub-group P2 comprises five positive groups: two positive singlets 1006 and 1007, a positive doublet 1017, and two positive singlets 1010 and 1011. The positive elements 1006, 1007, 1009, 1010, and 1011 are all made of low-index anomalous dispersion material CaF2, also called Calcium Fluoride, and the negative element 1008 is made of a matching material S-BAL42. Since most of the positive optical power for Example 5 resides in sub-group P2, the system as a whole is very well corrected for chromatic aberrations, and is in fact apochromatic over a waveband extending from the deep violet end of the visible spectrum to the near infrared.

Sub-group P3 comprises a single negative powered singlet 1012 made of anomalous dispersion material N-KZFS4, which aids in the correction of secondary spectrum. The concave surface SC facing the image plane is strongly curved and therefore helps a great deal in correcting field curvature and astigmatism.

Sub-group P4 is a weak negative group comprising a positive powered singlet 1013 and a negative powered singlet 1014. Sub-group P4 serves mainly to correct distortion and astigmatism, and to make fine adjustments to the exit pupil location.

Focusing from a distant to a close object is accomplished by moving groups 1016 and PG independently toward and away from the image plane, respectively, as illustrated by FIG. 10a. The front group 1001 remains stationary with respect to the image plane. This focusing motion ensures that performance remains very high throughout the focusing range, and simultaneously ensures that breathing is well-corrected. Breathing reaches a maximum value of −2.42% at closest focus.

EXAMPLE 11

Figure 11A:
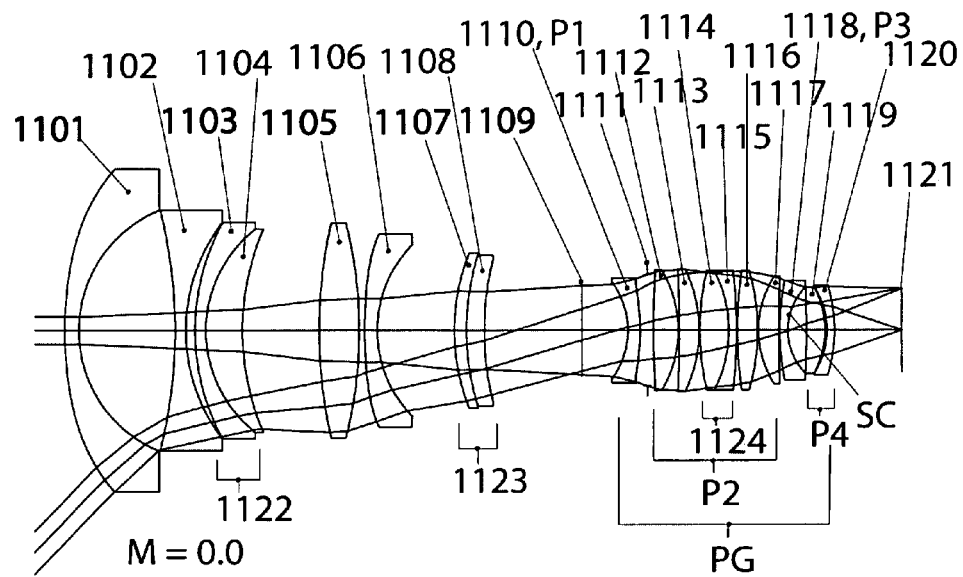
FIG. 11a is a layout drawing of an f/1.4 lens system showing magnification settings of 0.0× and −0.037× according to Example 11 of the present invention.
Figure 11A:
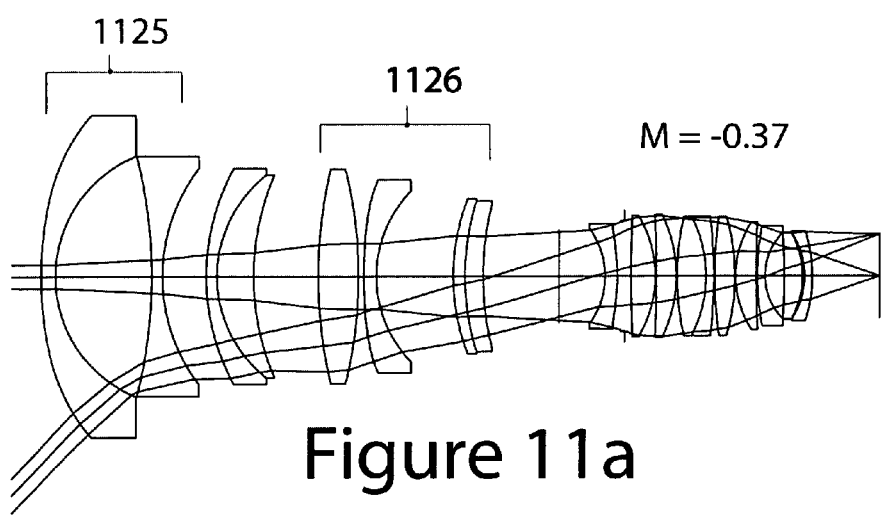

Example 11, which is a 14.4 mm focal length ultra wide-angle objective for 35 mm format cinematography, is illustrated in FIG. 11a, which shows cross-sectional layouts at magnifications of 0 and −0.037×. All of the element and group designations mentioned below are shown in FIG. 11a. The relative aperture is f/1.4, the image diagonal is 28 mm, and the diagonal field of view (FOV) is 91.3 degrees. Since this objective has a small amount of barrel distortion, it provides a somewhat larger field of view than its paraxial focal length of 14.4 mm would suggest. In this case the effective corrected focal length is equal to the image height of 14 mm divided by the tangent of the half angle of view (HFOV):

$$FC=IH/\tan(HFOV)=14/\tan(45.63)=13.7 \text{ mm}$$

Figure 11B:
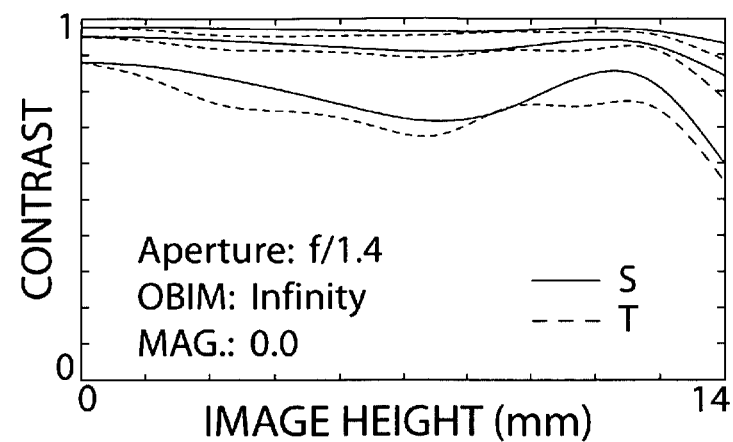
FIG. 11b are plots of MTF vs. Image Height at spatial frequencies of 10 cycles/mm, 20 cycles/mm and 40 cycles/mm for magnification settings of 0.0× and −0.037× over a waveband of 435 nm to 656 nm according to Example 11 of the present invention.
Figure 11B:
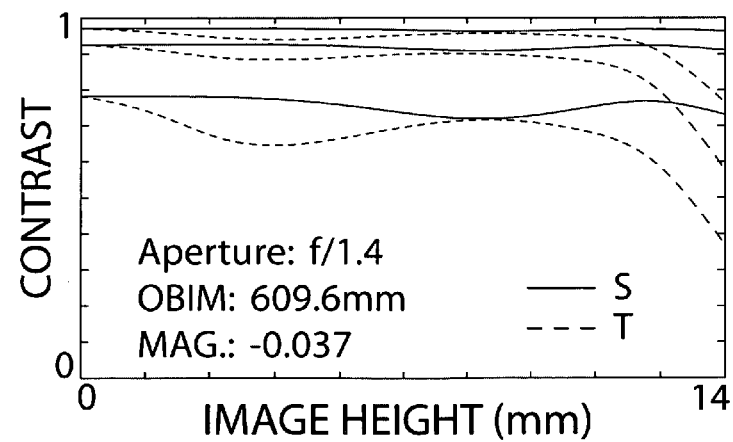
Figure 11C:
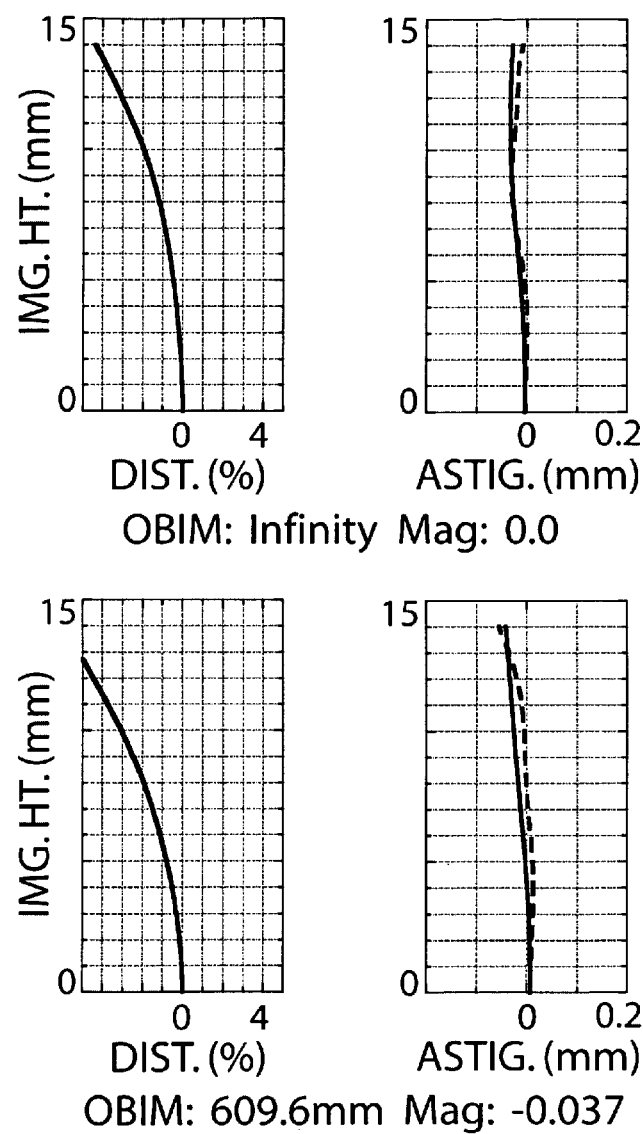
FIG. 11c are plots of Distortion and Astigmatism (S and T) vs. Image Height for magnification settings of 0.0× and −0.037× according to Example 11 of the present invention.
Figure 11D:
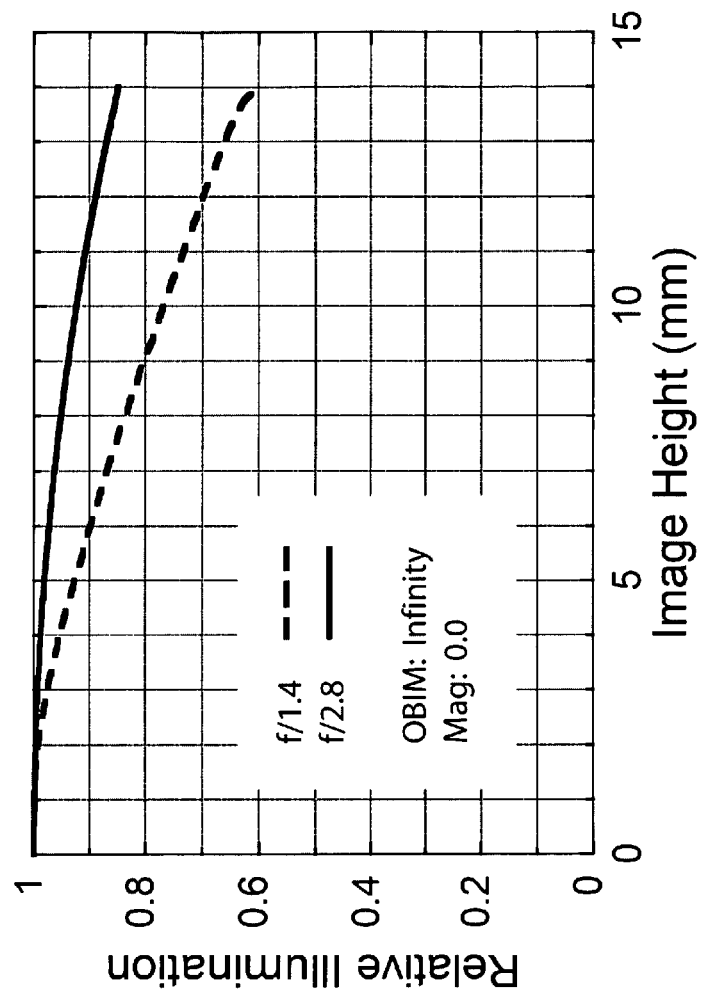
FIG. 11d is a plot of Relative Illumination vs. Image Height for apertures of f/1.4 and f/2.8 and a magnification of 0.0× according to Example 11 of the present invention.

MTF vs. Image Height at 10, 20 and 40 cycles/mm for four different object distances is illustrated in FIG. 11b. These curves indicate that Example 11 is extremely well corrected at f/1.4, especially for such an extremely wide-angle objective. Performance falls off gradually to the corner of the field, and the S and T curves stay close together. FIG. 11c shows distortion and astigmatism (Coddington curves) for the same two object distances used in FIG. 11b. Distortion is reasonably well corrected for an ultra-wide angle lens, and astigmatism is also very well controlled. FIG. 11d is a plot of relative illumination vs. image height at f/1.4 and f/2.8, and it indicates that the Example 11 design has extremely low illumination falloff for a fast wide-angle lens.

The primary group PG comprises only the rear sub-group of Example 11. The front sub-group of the lens, comprising groups 1125, 1122 and 1126, functions approximately as a wide-angle afocal attachment in front of the primary group PG. Group 1125 has negative power and includes an asphere on the outermost object-side surface. Groups 1122 and 1126 have a combined positive power to roughly collimate the light output from group 1125. However, groups 1125, 1122 and 1126 together are not precisely afocal, and as a result the object magnification of primary group PG is −0.175×. As discussed above, primary PG comprises a negative powered front sub-group P1, followed by a positive powered sub-group P2, followed by a negative powered sub-group P3, followed by a sub-group P4 that can be either positively or negatively powered.

In Example 11, sub-group P1 comprises a single negative element 1110. The convex image-facing surface of element 1110 is aspherical, and 1110 is made of S-BSL7 to ensure that manufacturing this aspherical surface will not be problematic. The surface of sub-group P1 closest to the object is a concave surface.

Sub-group P2 comprises five positive groups: two positive singlets 1112 and 1113, a positive doublet 1124, and two positive singlets 1116 and 1117. The positive elements 1112, 1113, 1114, 1116, and 1117 are all made of low-index anomalous dispersion material S-FPL53, and the negative element 1115 is made of a matching anomalous dispersion material N-KZFS4. Since most of the positive optical power for Example 5 resides in sub-group P2, the system as a whole is very well corrected for chromatic aberrations, and is in fact apochromatic over a waveband extending from the deep violet end of the visible spectrum to the near infrared.

Sub-group P3 comprises a single negative powered singlet 1118 made of anomalous dispersion material N-KZFS4, which aids in the correction of secondary spectrum. Element 1118 is meniscus toward the image plane. The concave surface SC is strongly curved and therefore helps a great deal in correcting field curvature and astigmatism.

Sub-group P4 is a fairly weak positive group comprising a positive powered singlet 1119 and a negative powered singlet 1120. Sub-group P4 serves mainly to correct distortion and astigmatism, and to make fine adjustments to the exit pupil location.

Focusing from a distant to a close object is accomplished by moving groups 1122 and 1126 independently toward the image plane as illustrated by FIG. 11a. Primary group PG and group 1125 remain stationary with respect to the image plane during focusing, which substantially simplifies the mechanical design. This focusing motion ensures that performance remains very high throughout the focusing range, and simultaneously ensures that breathing is almost zero. Breathing reaches a maximum value of only +0.16% at closest focus, which is almost undetectable.

1109 is a vignetting stop that restricts the lower rim rays in order to control both aberrations and illumination.

EXAMPLE 12

Figure 12A:
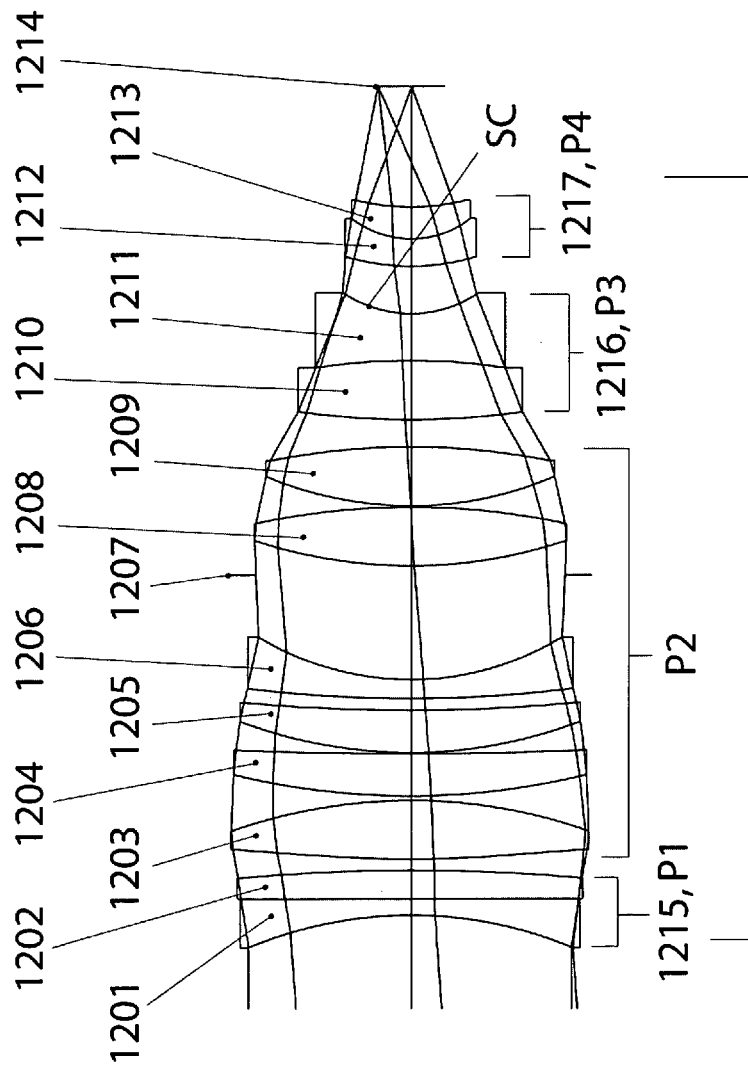
FIG. 12a is a layout drawing of an f/1.4 lens system according to Example 12 of the present invention.

Example 12, which is a 200 mm focal length objective optimized for aerial reconnaissance, is illustrated in FIG. 12a, which shows a cross-sectional layout. All of the element and group designations mentioned below are shown in FIG. 12a. The relative aperture is f/1.4, the image diagonal is 28 mm, and the diagonal field of view (FOV) is 8.0 degrees. Example 12 is corrected over a waveband ranging from about 435 nm to 1000 nm, which is an especially useful waveband for reconnaissance and night-vision applications.

Figure 12B:
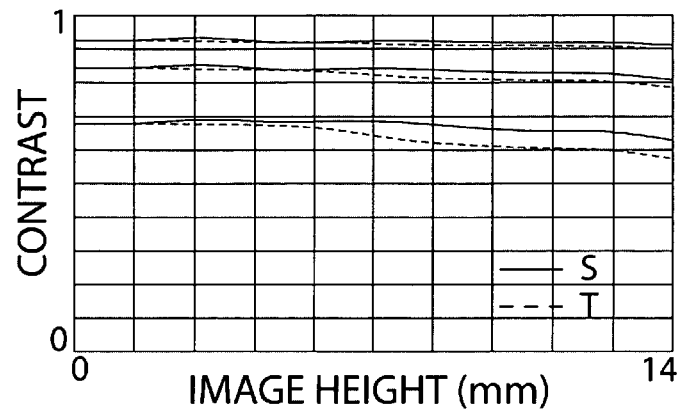
FIG. 12b are plots of MTF vs. Image Height at spatial frequencies of 50 cycles/mm, 100 cycles/mm and 200 cycles/mm for an object at infinity over a waveband of 435 nm to 1000 nm according to Example 12 of the present invention.
Figure 12C:
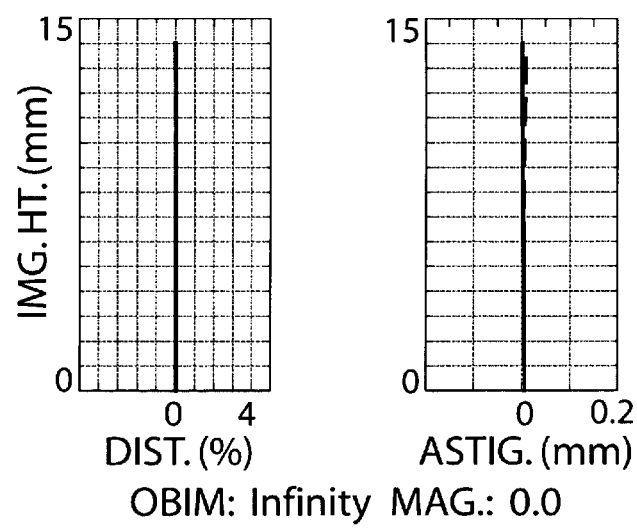
FIG. 12c are plots of Distortion and Astigmatism (S and T) vs. Image Height for an object at infinity according to Example 12 of the present invention.

MTF vs. Image Height at 50, 100 and 200 cycles/mm for an object at infinity is illustrated in FIG. 12b. These curves indicate that Example 12 is extraordinarily well corrected at f/1.4, with MTF values at 100 cycles/mm greater than 80% over the entire image field. Example 12 does in fact meet the Rayleigh criterion for diffraction-limited performance at f/1.4 over most of the image field. FIG. 1c shows distortion and astigmatism (Coddington curves) for an object at infinity. Both distortion and astigmatism are nearly zero. FIG. 12d is a plot of relative illumination vs. image height at f/1.4, and it indicates that the Example 12 design has extremely low illumination falloff for such a high-speed lens.

The primary group PG comprises the entire lens. As discussed above, primary group PG comprises a negative powered front sub-group P1, followed by a positive powered sub-group P2, followed by a negative powered sub-group P3, followed by sub-group P4 that can be either positively or negatively powered.

In Example 12, sub-group P1 comprises a negative doublet 1215. This doublet uses high-index anomalous dispersion materials N-KZFS4 and S-NPH1 to advantage, and as a result aids in reducing secondary chromatic aberrations. The surface of sub-group P1 closest to the object is a concave surface.

Sub-group P2 comprises six single-element lens groups: positive singlets 1203, 1204, 1205, 1208, and 1209; and negative singlet 1206. The convex object-facing surface of element 1203 is aspherical, and singlet 1203 is made of S-BSL7 to ensure that manufacturing this aspherical surface will not be problematic. The positive elements in sub-group P2 are elements 1203, 1204, 1205, 1208, and 1209. All of these except 1203 are made of low-index anomalous dispersion materials. The single negative element 1206 is made of a matching anomalous dispersion material N-KZFS4. Since most of the positive optical power for Example 12 resides in sub-group P2, the system as a whole is very well corrected for chromatic aberrations, and is in fact superachromatic (i.e., with four color crossings) over a waveband extending from 435 nm to 1000 nm.

Sub-group P3 comprises a single negative powered doublet 1216. Anomalous dispersion materials S-PHM52 and N-KZFS4 are used for the individual lens elements 1210 and 1211, respectively, which aids in the correction of secondary spectrum. The outer shape of doublet 1216 is meniscus toward the image plane. The concave surface SC is strongly curved and therefore helps a great deal in correcting field curvature and astigmatism.

Sub-group P4 is a fairly weak positive group comprising a positive doublet 1217. Sub-group P4 serves mainly to correct distortion and astigmatism.

Since Example 12 is intended for aerial reconnaissance applications, it has been optimized for an object located at infinity. However, small focus adjustments can be made by moving the entire lens without significantly degrading the lens performance.

Optical Prescription Data

Tables 1a, 2a, 3a, 4a, 5a, 6a, 7a, 8a, 9a, 10a, 11a and 12a below provide optical prescription data for Examples 1, 2, 3, 4, 5, 6, 7, 8, 9, 10, 11 and 12, respectively. The data provided includes surface number, radius of curvature, thickness, glass type, and the diameter of the clear aperture. OBJ refers to the object surface, IMA refers to the image surface, and STO refers to the aperture stop surface. Tables 1b, 2b, 4b, 5b, 6b, 7b, 8b, 9b, 10b, and 11b provide focusing data for Examples 1, 2, 4, 5, 6, 7, 8, 9, 10, and 11, respectively. In these Tables, OBMG refers to object magnification, and OBIM refers to the total distance from the object plane to the image plane.

Aspherical surfaces are expressed by the following equation:

$$Z(r) = r^2/R(R(1+SQRT(1-(1+k)r^2/R^2))) + C4r^4 + C6r^6 + C8r^8 + C10r^{10} + C12r^{12} + C14r^{14} + C16r^{16}$$

Where Z is the displacement in the direction of the optical axis measured from the polar tangent plane, r is the radial coordinate, R is the base radius of curvature, k is the conic constant, and $C_i$ is the i-th order aspherical deformation constant. Tables 1c, 2c, 3b, 4c, 5c, 6c, 7c, 8c, 9c, 10c, 11c and 12b provide aspheric surface data for examples 1, 2, 3, 4, 5, 6, 7, 8, 9, 10, 11 and 12, respectively.

Values for the defining conditions for each of the eight examples are given in Table 13. A listing of refractive index at various wavelengths for all of the glass types used in the Examples is provided in Table 14.

TABLE 1a

Prescription Data for Example 1

| Surf | Radius | Thickness | Glass | Diameter |
|---|---|---|---|---|
| OBJ | Infinity | Infinity | | |
| 1 | −243.9697 | 4 | N-KZFS4 | 61.76092 |
| 2 | 206.7449 | 5 | S-NPH1 | 60.82355 |
| 3 | 422.6313 | 1.949756 | | 60.3132 |
| 4 | 81.99985 | 10 | S-BSL7 | 56.56122 |
| 5 | 71.78633 | 28.64799 | | 53.75262 |
| STO | Infinity | 2.934045 | | 54.7 |
| 7 | 113.8222 | 13 | S-FPL51 | 57.16058 |
| 8 | −91.91932 | 1.918958 | | 57.46784 |
| 9 | 105.3766 | 3 | N-KZFS4 | 55.07957 |
| 10 | 41.14905 | 14.88799 | S-FPL51 | 52.07915 |
| 11 | −93.91761 | 0.25 | | 51.56341 |
| 12 | 34.49819 | 13 | S-FPL51Y | 43.1011 |
| 13 | −194.7093 | 2.5 | N-KZFS4 | 38.62962 |
| 14 | 21.47767 | 2.844639 | | 30.07902 |
| 15 | 30.81431 | 2.5 | N-KZFS4 | 29.87583 |
| 16 | 16.63395 | 7 | S-LAH53 | 28.05017 |
| 17 | 28.83075 | 2.756143 | | 26.85199 |
| 18 | 47.79796 | 2.5 | S-LAL14 | 26.84398 |
| 19 | 31.35968 | 4.043165 | | 26.02517 |
| 20 | 79.29547 | 5 | S-PHM52 | 28 |
| 21 | 377.9263 | 13.03858 | | 28 |
| 22 | Infinity | 5 | S-BSL7 | 32 |
| 23 | Infinity | 4.8 | | 32 |
| IMA | Infinity | | | 28.000 |

TABLE 1b

Focusing and Breathing Data for Example 1

| | | | | |
|---|---|---|---|---|
| OBMG | 0.0 | −0.032 | −0.062 | −0.137 |
| OBIM | Infinity | 2163.4 | 1174.8 | 609.6 |
| T0 | Infinity | 2000.0 | 1000.0 | 409.1 |
| T3 | 1.950 | 12.745 | 22.411 | 44.023 |
| T19 | 4.043 | 6.046 | 7.816 | 11.948 |
| Breathing | 0.00% | +0.03% | +0.08% | −0.09% |

TABLE 1c

Aspheric Surface Data for Example 1

| Surf. # | 4 |
|---|---|
| R | 82.000 |
| k | 0.0 |
| C4 | −1.727197e−6 |
| C6 | −1.667576e−10 |
| C8 | −7.766913e−13 |
| C10 | 5.730591e−16 |
| C12 | 4.667245e−19 |
| C14 | −1.252642e−21 |
| C16 | 6.603991e−25 |

TABLE 2a

Prescription Data for Example 2

| Surf | Radius | Thickness | Glass | Diameter |
|---|---|---|---|---|
| OBJ | Infinity | Infinity | | |
| 1 | −55.04161 | 3 | N-KZFS4 | 50.67136 |
| 2 | 950.3995 | 5 | S-NPH1 | 52.03579 |
| 3 | −528.7796 | 3 | | 52.52354 |
| 4 | 107.022 | 5 | S-LAH53 | 53.41207 |
| 5 | 153.2842 | 8 | S-FPL53 | 53.17786 |
| 6 | −133.139 | 10.68225 | | 53.25474 |
| STO | Infinity | 1.2 | | 51.34386 |
| 8 | 90.4377 | 12 | S-FPL53 | 52.14142 |
| 9 | −70.2512 | 0.25 | | 51.8957 |
| 10 | 325.283 | 2.5 | N-KZFS4 | 48.85419 |
| 11 | 40.1485 | 10.5 | S-PHM52 | 45.70621 |
| 12 | −310.7279 | 0.25 | | 44.77577 |
| 13 | 32.86969 | 11 | S-PHM52 | 39.3514 |
| 14 | −1017.895 | 2.5 | N-KZFS4 | 35.09814 |
| 15 | 17.80344 | 3.320912 | | 26.56843 |
| 16 | 31.75178 | 2.5 | N-KZFS4 | 26.46405 |
| 17 | 14.51134 | 6 | S-LAH53 | 23.59758 |
| 18 | 28.43016 | 15.93711 | | 22.35022 |
| 19 | −41.12113 | 7.458793 | S-PHM52 | 23.69697 |
| 20 | −22.20727 | 3 | N-LASF9 | 25.28074 |
| 21 | −33.70055 | 1 | | 27.03097 |
| 22 | Infinity | 5 | S-BSL7 | 27.27129 |
| 23 | Infinity | 4.8 | | 27.47853 |
| IMA | Infinity | | | 28.000 |

TABLE 2b

Focusing and Breathing Data for Example 2

| | | | | |
|---|---|---|---|---|
| OBMG | 0.0 | −0.032 | −0.064 | −0.124 |
| OBIM | Infinity | 2127.7 | 1131.3 | 636.6 |
| T0 | Infinity | 2000.0 | 1000.0 | 499.0 |
| T3 | 3.000 | 4.813 | 6.579 | 9.929 |
| T18 | 15.937 | 12.657 | 9.946 | 5.547 |
| T23 | 4.800 | 10.101 | 14.572 | 22.004 |
| Breathing | 0.00% | −0.01% | 0.00% | 0.00% |

TABLE 2c

Aspheric Surface Data for Example 2

| Surf. # | 4 |
|---|---|
| R | 107.022 |
| k | 0.0 |
| C4 | −1.239477e−6 |
| C6 | −1.464631e−10 |
| C8 | −1.068124e−13 |
| C10 | 1.130896e−17 |
| C12 | 0.0 |
| C14 | 0.0 |
| C16 | 0.0 |

TABLE 3a

Prescription Data for Example 3

| Surf | Radius | Thickness | Glass | Diameter |
|---|---|---|---|---|
| OBJ | Infinity | Infinity | | |
| 1 | −84.5919 | 5 | S-BSL7 | 49.85981 |
| 2 | −389.7759 | 15.79056 | | 49.35585 |
| STO | Infinity | 1.5 | | 50.8863 |
| 4 | 112.8608 | 13 | S-FPL53 | 52.70803 |
| 5 | −55.78134 | 15.72615 | | 53.07695 |
| 6 | 88.85746 | 11 | S-FPL53 | 44.88271 |
| 7 | −58.14963 | 2.5 | N-KZFS4 | 43.37819 |
| 8 | 705.2347 | 7 | S-PHM52 | 41.68126 |

TABLE 3a-continued

Prescription Data for Example 3

| Surf | Radius | Thickness | Glass | Diameter |
|---|---|---|---|---|
| 9 | −78.161 | 0.5 | | 40.71523 |
| 10 | 48.79291 | 10 | S-PHM52 | 35.37947 |
| 11 | −110.2849 | 1 | | 30.88737 |
| 12 | −81.14733 | 2.5 | N-KZFS4 | 30.03937 |
| 13 | 21.88237 | 2.398791 | | 26.28744 |
| 14 | 39.86111 | 2.5 | N-KZFS4 | 26.39182 |
| 15 | 17.11893 | 10.51624 | S-LAH53 | 26.1893 |
| 16 | 33.65242 | 24.31896 | | 24.40891 |
| IMA | Infinity | | | 28.000 |

TABLE 3b

Aspheric Surface Data for Example 3

| Surface # | 2 |
|---|---|
| R | −389.776 |
| k | 0.0 |
| C4 | 2.876369e−6 |
| C6 | 5.936459e−10 |
| C8 | 9.064682e−13 |
| C10 | −1.958467e−16 |
| C12 | 0.0 |
| C14 | 0.0 |
| C16 | 0.0 |

TABLE 4a

Prescription Data for Example 4

| Surf | Radius | Thickness | Glass | Diameter |
|---|---|---|---|---|
| OBJ | Infinity | Infinity | | |
| 1 | −243.9697 | 5 | N-KZFS4 | 90.9493 |
| 2 | 206.7449 | 8 | S-NPH1 | 95.17419 |
| 3 | 422.6313 | 2 | | 97.01629 |
| 4 | 81.99985 | 12 | S-PHM52 | 100.6275 |
| 5 | 71.78633 | 13 | S-FPL53 | 101.196 |
| 6 | Infinity | 24.8115 | | 101.747 |
| 7 | 113.8222 | 20.83024 | CaF2 | 100.7282 |
| 8 | −91.91932 | 0.5 | | 99.66903 |
| 9 | 105.3766 | 5 | N-KZFS4 | 91.88288 |
| 10 | 41.14905 | 18.72651 | S-FPL53 | 85.07208 |
| 11 | −93.91761 | 2 | | 83.05963 |
| STO | 34.49819 | 2 | | 78.9513 |
| 13 | −194.7093 | 22 | S-PHM52 | 69.69548 |
| 14 | 21.47767 | 5 | N-KZFS4 | 61.72373 |
| 15 | 30.81431 | 6.641824 | | 45.27939 |
| 16 | 16.63395 | 5 | N-KZFS4 | 45.20044 |
| 17 | 28.83075 | 10.78727 | S-LAH53 | 40.95277 |
| 18 | 47.79796 | 21.30254 | | 39.11442 |
| 19 | 31.35968 | 20.5 | S-BSM16 | 37.87622 |
| 20 | 79.29547 | 6 | S-TIH1 | 38.17191 |
| 21 | 377.9263 | 9 | | 38.54315 |
| IMA | Infinity | | | 28.000 |

TABLE 4b

Focusing and Breathing Data for Example 4

| OBMG | 0.0 | −0.030 | −0.060 | −0.094 |
|---|---|---|---|---|
| OBIM | Infinity | 4231.0 | 2239.5 | 1500.0 |
| T0 | Infinity | 4000.0 | 2000.0 | 1251.0 |
| T3 | 2.000 | 9.462 | 14.745 | 20.782 |
| T18 | 21.303 | 16.290 | 12.846 | 9.316 |
| T21 | 9.000 | 17.467 | 24.126 | 31.076 |
| Breathing | 0.00% | +0.41% | −0.19% | −0.78% |

TABLE 4c

Aspheric Surface Data for Example 4

| | Surface # | |
|---|---|---|
| | 4 | 21 |
| R | 185.301 | −70.903 |
| k | 0.0 | 0.0 |
| C4 | −1.910272e−7 | 4.626607e−7 |
| C6 | −7.138951e−12 | −2.368491e−9 |
| C8 | 2.519699e−16 | 5.512831e−12 |
| C10 | −1.906009e−19 | −5.494228e−15 |
| C12 | 0.0 | 0.0 |
| C14 | 0.0 | 0.0 |
| C16 | 0.0 | 0.0 |

TABLE 5a

Prescription Data for Example 5

| Surf | Radius | Thickness | Glass | Diameter |
|---|---|---|---|---|
| OBJ | Infinity | Infinity | | |
| 1 | 375.5463 | 5 | S-PHM52 | 91.92377 |
| 2 | 37.73174 | 25.83448 | | 65.79916 |
| 3 | −86.34626 | 3.5 | S-FPL51 | 65.73444 |
| 4 | 57.95547 | 2.008227 | | 61.80289 |
| 5 | 72.05063 | 3.5 | S-NPH1 | 61.81905 |
| 6 | 42.61828 | 12 | N-KZFS4 | 59.68593 |
| 7 | 101.2987 | 11.86961 | | 59.44564 |
| 8 | 82.44051 | 13 | S-LAH60 | 63.52585 |
| 9 | −182.3396 | 34.84959 | | 62.7011 |
| 10 | Infinity | 5 | S-BSL7 | 34.87959 |
| 11 | Infinity | 5 | | 32.85024 |
| 12 | 237.532 | 5 | S-NSL3 | 29.40529 |
| 13 | 50.6145 | 8.489515 | | 26.37966 |
| STO | Infinity | 3.071435 | | 26.78562 |
| 15 | 102.3559 | 3.5 | S-LAH63 | 28.24707 |
| 16 | 124.9423 | 8 | S-FPL53 | 28.47063 |
| 17 | −66.92142 | 0.25 | | 29.28444 |
| 18 | 94.94834 | 6 | S-FPL53 | 29.33022 |
| 19 | −68.09017 | 2.5 | N-KZFS4 | 29.05241 |
| 20 | 125.6468 | 6 | S-FPL53 | 28.91357 |
| 21 | −53.67274 | 0.25 | | 28.90076 |
| 22 | 46.87171 | 1.998782 | N-KZFS4 | 30.21724 |
| 23 | 22.65798 | 10.04979 | S-PHM52 | 29.8263 |
| 24 | −61.68191 | 0.25 | | 29.60787 |
| 25 | 54.7172 | 6.925449 | S-PHM52 | 27.83196 |
| 26 | −31.5037 | 1.998782 | N-KZFS4 | 26.79483 |
| 27 | 22.58101 | 3.469186 | | 22.81917 |
| 28 | 111.9798 | 2 | N-KZFS4 | 22.79616 |
| 29 | 22.78321 | 4.624977 | S-PHM52 | 23.29371 |
| 30 | 84.68205 | 2.394582 | | 23.49102 |
| 31 | −47.88134 | 2.649691 | S-BAL42 | 23.52596 |
| 32 | −47.94859 | 9 | | 24.50782 |
| IMA | Infinity | | | 28.000 |

TABLE 5b

Focusing and Breathing Data for Example 5

| OBMG | 0.0 | −0.033 |
|---|---|---|
| OBIM | Infinity | 606.1 |
| T0 | Infinity | 400.0 |
| T4 | 2.008 | 3.832 |
| T9 | 34.850 | 29.133 |
| Breathing | 0.00% | 0.14% |

TABLE 5c

Aspheric Surface Data for Example 5

| | Surface # | | |
|---|---|---|---|
| | 1 | 13 | 28 |
| R | 375.546 | 50.614 | 111.980 |
| k | 0.0 | 0.0 | 0.0 |
| C4 | 1.333707e-6 | 1.204138e-5 | -3.462446e-5 |
| C6 | -2.060015e-10 | -2.759991e-9 | 1.890542e-8 |
| C8 | 4.106414e-14 | 1.027888e-10 | -9.138490e-10 |
| C10 | 1.924041e-18 | -2.113544e-13 | 1.622290e-12 |
| C12 | 0.0 | 0.0 | 0.0 |
| C14 | 0.0 | 0.0 | 0.0 |
| C16 | 0.0 | 0.0 | 0.0 |

TABLE 6a

Prescription Data for Example 6

| Surf | Radius | Thickness | Glass | Diameter |
|---|---|---|---|---|
| OBJ | Infinity | Infinity | | |
| 1 | 92.60746 | 4 | S-BAL42 | 75.04797 |
| 2 | 45.74328 | 12.78556 | | 65.11839 |
| 3 | 581.3462 | 3.5 | S-FPL51 | 65.0555 |
| 4 | 47.48849 | 54.99829 | | 58.3797 |
| 5 | -89.49438 | 5 | S-FSL5 | 55.56219 |
| 6 | -60.55685 | 0.5 | | 55.98575 |
| 7 | 61.06037 | 7 | S-FPL51 | 52.43241 |
| 8 | 371.3011 | 27.48415 | | 51.47304 |
| 9 | -44.26416 | 4 | S-BSL7 | 36.28671 |
| 10 | -211.557 | 2 | | 35.68603 |
| STO | Infinity | 2 | | 35.09028 |
| 12 | 73.75098 | 3.5 | S-LAH53 | 36.12446 |
| 13 | 86.92011 | 8 | S-FPL53 | 35.99807 |
| 14 | -94.0894 | 0.2495871 | | 36.29503 |
| 15 | 58.71839 | 6 | S-FPL53 | 35.93812 |
| 16 | 326.8157 | 2.5 | N-KZFS4 | 35.0456 |
| 17 | 357.0363 | 5.331577 | S-FPL51 | 34.48392 |
| 18 | -87.41435 | 0.345288 | | 33.69834 |
| 19 | 58.2085 | 1.998782 | N-KZFS4 | 31.28165 |
| 20 | 24.90714 | 6.282571 | S-PHM52 | 28.73855 |
| 21 | 179.6464 | 0.4350781 | | 27.50653 |
| 22 | 30.76528 | 4.092707 | S-PHM52 | 25.80209 |
| 23 | 100.0604 | 1.998782 | N-KZFS4 | 24.33576 |
| 24 | 17.16774 | 3.277854 | | 21.73136 |
| 25 | 83.63094 | 2 | N-KZFS4 | 21.7505 |
| 26 | 18.66912 | 10.91264 | S-PHM52 | 22.01914 |
| 27 | -14.75671 | 2 | N-KZFS4 | 22.24207 |
| 28 | -250.6923 | 4.307977 | | 22.86026 |
| 29 | -27.73417 | 2.502858 | S-PHM52 | 23.04734 |
| 30 | -25.15099 | 2 | N-KZFS4 | 23.8395 |
| 31 | -41.74433 | 9 | | 25.0488 |
| IMA | Infinity | | | 28.000 |

TABLE 6b

Focusing and Breathing Data for Example 6

| OBMG | 0.0 | -0.050 |
|---|---|---|
| OBIM | Infinity | 609.6 |
| T0 | Infinity | 409.6 |
| T2 | 12.786 | 19.625 |
| T8 | 27.484 | 19.594 |
| T31 | 9.000 | 10.050 |
| Breathing | 0.00% | 2.01% |

TABLE 6c

Aspheric Surface Data for Example 6

| | Surface # | |
|---|---|---|
| | 1 | 12 |
| R | 92.607 | 73.751 |
| k | 0.0 | 0.0 |
| C4 | 3.457947e-7 | -2.202698e-6 |
| C6 | 1.407617e-10 | -6.299493e-10 |
| C8 | -2.136379e-14 | 2.204620e-12 |
| C10 | 1.804411e-17 | -2.816188e-15 |
| C12 | 0.0 | 0.0 |
| C14 | 0.0 | 0.0 |
| C16 | 0.0 | 0.0 |

TABLE 7a

Prescription Data for Example 7

| Surf | Radius | Thickness | Glass | Diameter |
|---|---|---|---|---|
| OBJ | Infinity | Infinity | | |
| 1 | 396.9664 | 4 | S-BSL7 | 48.4 |
| 2 | 38.47405 | 15.86035 | | 43 |
| 3 | 49.92867 | 7 | S-TIM2 | 40 |
| 4 | 56.06739 | 23.0195 | | 38 |
| 5 | -42.09343 | 4 | S-BSL7 | 33.2 |
| 6 | -103.028 | 2.372342 | | 36.4 |
| STO | Infinity | 2 | | 38.34528 |
| 8 | 474.2342 | 7 | S-FPL51 | 40.71931 |
| 9 | -58.61468 | 0.25 | | 42.23332 |
| 10 | -198.4969 | 7 | S-FPL51 | 43.66711 |
| 11 | -49.81846 | 0.25 | | 44.79874 |
| 12 | 126.6418 | 11 | S-FPL51 | 45.55004 |
| 13 | -52.1216 | 2.5 | N-KZFS4 | 45.35187 |
| 14 | -129.611 | 0.25 | | 45.4687 |
| 15 | 721.1586 | 8.5 | S-FPL53 | 44.98233 |
| 16 | -61.33901 | 0.25 | | 44.38943 |
| 17 | 44.12771 | 9 | S-FPL51 | 38.94397 |
| 18 | -486.2903 | 0.25 | | 35.92704 |
| 19 | 130.5751 | 9 | S-PHM52 | 33.81175 |
| 20 | -35.0691 | 2 | N-KZFS4 | 33.81175 |
| 21 | 18.9107 | 4.417785 | | 23.48 |
| 22 | -207.8419 | 2 | N-KZFS4 | 23.48 |
| 23 | 30.18606 | 7 | S-PHM52 | 24 |
| 24 | -33.99464 | 1.105499 | | 24 |
| 25 | -24.05843 | 2.5 | S-BSM4 | 23 |
| 26 | -48.65227 | 15.72706 | | 24 |
| IMA | Infinity | | | 28.000 |

TABLE 7b

Focusing and Breathing Data for Example 7

| OBMG | 0.0 | -0.065 |
|---|---|---|
| OBIM | Infinity | 655.1 |
| T0 | Infinity | 500.0 |
| T2 | 15.860 | 1.990 |
| T4 | 23.020 | 41.598 |
| T26 | 15.727 | 17.899 |
| Breathing | 0.00% | -0.03% |

TABLE 7c

Aspheric Surface Data for Example 7

| | Surface # | |
|---|---|---|
| | 1 | 6 |
| R | 396.966 | −103.028 |
| k | 0.0 | 0.0 |
| C4 | −3.585839e−7 | 7.833468e−6 |
| C6 | 9.755781e−10 | 2.834875e−9 |
| C8 | −1.576946e−12 | −3.428422e−12 |
| C10 | 1.165119e−15 | 9.842607e−16 |
| C12 | 0.0 | 0.0 |
| C14 | 0.0 | 0.0 |
| C16 | 0.0 | 0.0 |

TABLE 8a

Prescription Data for Example 8

| Surf | Radius | Thickness | Glass | Diameter |
|---|---|---|---|---|
| OBJ | Infinity | Infinity | | |
| 1 | −283.9121 | 4 | N-KZFS4 | 61.6184 |
| 2 | 204.1113 | 5 | S-NPH1 | 60.59697 |
| 3 | 366.4659 | 2 | | 60.01507 |
| 4 | 87.86912 | 10 | ACRYLIC | 55.98527 |
| 5 | 76.18259 | 27.65287 | | 53.48406 |
| STO | Infinity | 2.997092 | | 54.48122 |
| 7 | 140.7083 | 13 | S-FPL51 | 56.69821 |
| 8 | −87.01917 | 2.082923 | | 57.24739 |
| 9 | 105.2124 | 3 | N-KZFS4 | 55.19328 |
| 10 | 45.35061 | 14.9561 | S-FPL51 | 52.6903 |
| 11 | −88.21712 | 0.25 | | 52.05543 |
| 12 | 35.79661 | 13 | S-FPL51Y | 43.42701 |
| 13 | −150.139 | 2.5 | N-KZFS4 | 39.11433 |
| 14 | 22.08163 | 2.832599 | | 30.50124 |
| 15 | 28.92564 | 2.5 | N-KZFS4 | 30.16155 |
| 16 | 16.95775 | 7 | S-LAH53 | 28.38056 |
| 17 | 25.87959 | 3.153191 | | 26.86656 |
| 18 | 47.66877 | 2.5 | S-LAL14 | 26.93462 |
| 19 | 34.94616 | 1.75774 | | 26.2819 |
| 20 | 96.94503 | 5 | S-PHM52 | 27.11023 |
| 21 | 770.8764 | 15.16361 | | 27.11922 |
| 22 | Infinity | 5 | S-BSL7 | 28.000 |
| 23 | Infinity | 4.8 | | 27.62637 |
| IMA | Infinity | | | 28.000 |

TABLE 8b

Focusing and Breathing Data for Example 8

| OBMG | 0.0 | −0.032 | −0.062 | −0.137 |
|---|---|---|---|---|
| OBIM | Infinity | 2163.0 | 1174.4 | 609.6 |
| T0 | Infinity | 2000.0 | 1000.0 | 409.5 |
| T3 | 2.000 | 12.880 | 22.446 | 44.067 |
| T19 | 1.758 | 3.753 | 5.539 | 9.688 |
| Breathing | 0.00% | 0.14% | −0.09% | 0.02% |

TABLE 8c

Aspheric Surface Data for Example 8

| | Surface # |
|---|---|
| | 5 |
| R | 87.869 |
| k | 0.0 |
| C4 | −1.961709e−6 |
| C6 | −1.791880e−10 |
| C8 | −1.068037e−12 |
| C10 | 1.896598e−15 |
| C12 | −2.83718e−18 |
| C14 | 2.457603e−21 |
| C16 | −8.748159e−25 |

TABLE 9a

Prescription Data for Example 9

| Surf | Radius | Thickness | Glass | Diameter |
|---|---|---|---|---|
| OBJ | Infinity | Infinity | | |
| 1 | 333.9197 | 4 | S-FPL53 | 58.22967 |
| 2 | 38.30447 | 20.67997 | | 50.95781 |
| 3 | 54.68269 | 4 | S-TIH53 | 50.85248 |
| 4 | 50.56709 | 6 | N-KZFS4 | 48.6793 |
| 5 | 63.96197 | 29.92107 | | 46.69942 |
| 6 | −26.59337 | 4 | S-BSL7 | 34.48456 |
| 7 | −73.84637 | 2.413273 | | 37.60764 |
| STO | Infinity | 2 | | 39.51109 |
| 9 | −1054.178 | 8.946326 | S-FPL53 | 41.47097 |
| 10 | −35.74606 | 0.25 | | 42.90604 |
| 11 | −614.98 | 7.676709 | S-FPL53 | 45.80089 |
| 12 | −47.17851 | 0.25 | | 46.41689 |
| 13 | 87.01859 | 13 | S-FPL53 | 46.00835 |
| 14 | −47.23339 | 2.5 | N-KZFS4 | 45.21423 |
| 15 | −127.2815 | 0.25 | | 44.90176 |
| 16 | 173.0087 | 8.026098 | S-FPL53 | 43.78873 |
| 17 | −78.90241 | 0.25 | | 42.71688 |
| 18 | 34.08032 | 9 | S-FPL53 | 36.5209 |
| 19 | 381.1721 | 0.25 | | 32.94332 |
| 20 | 91.59234 | 5.338591 | N-KZFS4 | 31.6 |
| 21 | 19.37844 | 14.57205 | | 25.8 |
| 22 | −56.03064 | 6 | S-FPL53 | 25.4 |
| 23 | −31.00777 | 1.193065 | | 25.52397 |
| 24 | −22.63342 | 2.5 | N-KZFS4 | 25.52397 |
| 25 | −34.92177 | 9.0806 | | 27 |
| IMA | Infinity | | | 28.000 |

TABLE 9b

Focusing and Breathing Data for Example 9

| OBMG | 0.0 | −0.064 |
|---|---|---|
| OBIM | Infinity | 670.7 |
| T0 | Infinity | 500.0 |
| T2 | 20.680 | 4.107 |
| T5 | 29.921 | 52.876 |
| T25 | 9.081 | 11.345 |
| Breathing | 0.00% | −0.23% |

TABLE 9c

Aspheric Surface Data for Example 9

| | Surface # | |
|---|---|---|
| | 1 | 7 |
| R | 333.920 | −73.846 |
| k | 0.0 | 0.0 |
| C4 | 3.394842e−7 | 8.11606e−6 |
| C6 | 3.05377e−10 | 1.990386e−9 |
| C8 | −1.402218e−13 | −4.780505e−12 |
| C10 | 6.990304e−17 | −3.430611e−16 |
| C12 | 0.0 | 0.0 |
| C14 | 0.0 | 0.0 |
| C16 | 0.0 | 0.0 |

TABLE 10a

Prescription Data for Example 10

| Surf | Radius | Thickness | Glass | Diameter |
|---|---|---|---|---|
| OBJ | Infinity | Infinity | | |
| 1 | 100.4234 | 5 | S-FPL51 | 73.48584 |
| 2 | 37.38913 | 18.51934 | | 60.32297 |
| 3 | −147.4289 | 4 | CaF2 | 59.25265 |
| 4 | 55.04329 | 25.08171 | | 54.91074 |

TABLE 10a-continued

Prescription Data for Example 10

| Surf | Radius | Thickness | Glass | Diameter |
|---|---|---|---|---|
| 5 | 216.8735 | 8 | S-BAL42 | 55.90533 |
| 6 | −139.4082 | 56.78947 | | 55.69153 |
| 7 | −40.97067 | 4 | S-BSL7 | 36.80999 |
| 8 | −110.0568 | 2.413273 | | 39.47896 |
| STO | Infinity | 2 | | 41.62642 |
| 10 | 1349.394 | 11 | CaF2 | 45.6 |
| 11 | −43.21708 | 0.25 | | 45.6 |
| 12 | −473.4083 | 10 | CaF2 | 47.1 |
| 13 | −53.85559 | 0.25 | | 47.32 |
| 14 | 119.5412 | 2.5 | S-BAL42 | 46 |
| 15 | 31.90913 | 15 | CaF2 | 44 |
| 16 | −272.1249 | 0.25 | | 44 |
| 17 | 106.3444 | 9 | CaF2 | 44 |
| 18 | −71.05028 | 0.25 | | 44 |
| 19 | 39.68814 | 13 | CaF2 | 38.4 |
| 20 | −69.05873 | 0.25 | | 38.4 |
| 21 | −185.5592 | 2 | N-KZFS4 | 34 |
| 22 | 25.56384 | 13.18843 | | 29 |
| 23 | 500.099 | 6 | CaF2 | 27.6 |
| 24 | −37.13322 | 1.193065 | | 27.6 |
| 25 | −26.3389 | 2.5 | S-BAL42 | 27.10797 |
| 26 | −89.46392 | 12.58599 | | 27.8 |
| IMA | Infinity | | | 28.000 |

TABLE 10b

Focusing and Breathing Data for Example 10

| OBMG | 0.0 | −0.056 |
|---|---|---|
| OBIM | Infinity | 605.0 |
| T0 | Infinity | 380.0 |
| T2 | 18.519 | 32.141 |
| T6 | 56.789 | 41.689 |
| T26 | 12.586 | 14.081 |
| Breathing | 0.00% | −2.42% |

TABLE 10c

Aspheric Surface Data for Example 10

| | Surface # | |
|---|---|---|
| | 1 | 8 |
| R | 100.423 | −110.057 |
| k | 0.0 | 0.0 |
| C4 | 7.760058e−7 | 7.048276e−6 |
| C6 | 1.290256e−10 | 4.832011e−10 |
| C8 | −5.36044e−14 | 1.525344e−12 |
| C10 | 3.874459e−17 | −4.411433e−15 |
| C12 | 0.0 | 0.0 |
| C14 | 0.0 | 0.0 |
| C16 | 0.0 | 0.0 |

TABLE 11a

Prescription Data for Example 11

| Surf | Radius | Thickness | Glass | Diameter |
|---|---|---|---|---|
| OBJ | Infinity | Infinity | | |
| 1 | 127.4965 | 5 | S-PHM52 | 108.0221 |
| 2 | 43.87358 | 31.87358 | | 80.72893 |
| 3 | −167.2721 | 3.5 | S-FPL51 | 80.45617 |
| 4 | 60.97883 | 3 | | 72.33558 |
| 5 | 77.11638 | 3.5 | S-NPH1 | 72.34854 |
| 6 | 43.80593 | 12 | N-KZFS4 | 68.04119 |
| 7 | 87.73247 | 25.05135 | | 67.54355 |
| 8 | 163.6522 | 13 | S-LAH60 | 71.87265 |

TABLE 11a-continued

Prescription Data for Example 11

| Surf | Radius | Thickness | Glass | Diameter |
|---|---|---|---|---|
| 9 | −154.9931 | 1.804394 | | 71.39477 |
| 10 | 177.1917 | 4 | S-FPL53 | 64.80238 |
| 11 | 41.56382 | 25.38503 | | 57.16877 |
| 12 | 70.88989 | 4 | S-TIH53 | 51.9796 |
| 13 | 85.19841 | 6 | N-KZFS4 | 50.51155 |
| 14 | 97.69889 | 32.10155 | | 47.98542 |
| 15 | Infinity | 15 | | 31 |
| 16 | −28.37547 | 4 | S-BSL7 | 32.24222 |
| 17 | −67.85317 | 2.413273 | | 35.2074 |
| STO | Infinity | 2 | | 37.23384 |
| 19 | 351.0629 | 8.043594 | S-FPL53 | 39.4388 |
| 20 | −40.03792 | 0.25 | | 40.49308 |
| 21 | −565.0694 | 6.591541 | S-FPL53 | 41 |
| 22 | −47.81657 | 0.25 | | 41 |
| 23 | 90.31838 | 9.455159 | S-FPL53 | 40 |
| 24 | −44.1493 | 2.5 | N-KZFS4 | 40 |
| 25 | −173.1045 | 0.25 | | 40 |
| 26 | 143.7942 | 6.476801 | S-FPL53 | 39.8997 |
| 27 | −75.13476 | 0.25 | | 39.39415 |
| 28 | 34.15295 | 6.727187 | S-FPL53 | 36 |
| 29 | 505.9532 | 0.25 | | 34.8 |
| 30 | 90.79729 | 2.516471 | N-KZFS4 | 33.4 |
| 31 | 20.62152 | 6.357717 | | 28.8 |
| 32 | −222.4085 | 6 | S-FPL53 | 28.8 |
| 33 | −30.19114 | 0.648371 | | 29 |
| 34 | −26.87561 | 2.5 | N-KZFS4 | 29 |
| 35 | −51.55495 | 22.29939 | | 30 |
| IMA | Infinity | | | 28.000 |

TABLE 11b

Focusing and Breathing Data for Example 11

| OBMG | 0.0 | −0.037 |
|---|---|---|
| OBIM | Infinity | 609.6 |
| T0 | Infinity | 334.6 |
| T4 | 3.000 | 14.306 |
| T7 | 25.051 | 21.027 |
| T14 | 32.102 | 24.827 |
| Breathing | 0.00% | 0.16% |

TABLE 11c

Aspheric Surface Data for Example 11

| | Surface # | | |
|---|---|---|---|
| | 1 | 10 | 17 |
| R | 127.496 | 177.192 | −67.853 |
| k | 0.0 | 0.0 | 0.0 |
| C4 | 6.386489e−7 | 6.302277e−7 | 8.104566e−6 |
| C6 | −5.204384e−11 | 9.365987e−10 | 2.137244e−9 |
| C8 | 7.139764e−15 | −3.328055e−13 | −2.210840e−12 |
| C10 | 1.397088e−18 | 2.363550e−16 | −2.049639e−15 |
| C12 | 0.0 | 0.0 | 0.0 |
| C14 | 0.0 | 0.0 | 0.0 |
| C16 | 0.0 | 0.0 | 0.0 |

TABLE 12a

Prescription Data for Example 12

| Surf | Radius | Thickness | Glass | Diameter |
|---|---|---|---|---|
| OBJ | Infinity | Infinity | | |
| 1 | −172.16 | 7 | N-KZFS4 | 135.6177 |
| 2 | Infinity | 12 | S-NPH1 | 141.6501 |
| 3 | −766.15 | 4.8 | | 143.8727 |

TABLE 12a-continued

Prescription Data for Example 12

| Surf | Radius | Thickness | Glass | Diameter |
|---|---|---|---|---|
| 4 | 451.74 | 25 | S-BSL7 | 147.7423 |
| 5 | −218.85 | 1.9 | | 149.1813 |
| 6 | 300.00 | 18 | CaF2 | 147.2112 |
| 7 | 1676.30 | 0.5 | | 145.0360 |
| 8 | 196.12 | 18 | CaF2 | 141.8413 |
| 9 | 726.80 | 5 | | 138.5623 |
| 10 | 541.42 | 8 | N-KZFS4 | 135.5623 |
| 11 | 118.64 | 44.7 | | 126.5730 |
| STO | Infinity | 4 | | 128.6329 |
| 13 | 201.50 | 25 | S-FPL53 | 129.8978 |
| 14 | −301.88 | 0.5 | | 128.8176 |
| 15 | 150.80 | 25 | S-FPL53 | 120.3746 |
| 16 | −291.55 | 11.6 | | 116.7305 |
| 17 | 328.00 | 25 | S-PHM52 | 93.4670 |
| 18 | −255.20 | 20 | N-KZFS4 | 79.2993 |
| 19 | 49.97 | 20.2 | | 57.0197 |
| 20 | 95.00 | 11.6 | N-KZFS4 | 54.7523 |
| 21 | 39.66 | 13.6 | S-LAH53 | 49.6368 |
| 22 | 93.31 | 51.118 | | 46.2380 |
| IMA | Infinity | | | 28.0000 |

TABLE 12b

Aspheric Surface Data for Example 12

| | Surf. # 4 |
|---|---|
| R | 451.74 |
| k | 0.0 |
| C4 | −7.071869e−08 |
| C6 | 5.824021e−13 |
| C8 | −1.045519e−17 |
| C10 | 2.748538e−22 |
| C12 | 0.0 |
| C14 | 0.0 |
| C16 | 0.0 |

TABLE 13

Values for the Conditions for Each Example

| | F1/FG | F2/FG | F3/FG | F4/FG | $y_{MAX}/y_{SC}$ | $Z_{SC}$/FG | $R_{SC}$/FG | $OBMG_{PG}$ |
|---|---|---|---|---|---|---|---|---|
| Ex. 1 | −3.576 | 0.919 | −1.431 | 2.256 | 1.972 | 0.761 | 0.340 | 0.000 |
| Ex. 2 | −1.646 | 0.774 | −1.471 | 1.815 | 2.010 | 0.754 | 0.274 | 0.000 |
| Ex. 3 | −3.202 | 0.851 | −1.088 | 2.241 | 2.228 | 0.611 | 0.337 | 0.000 |
| Ex. 4 | −2.109 | 0.812 | −1.442 | 1.587 | 2.280 | 0.634 | 0.245 | 0.000 |
| Ex. 5 | −3.611 | 0.816 | −2.027 | −20.31 | 1.990 | 0.704 | 0.659 | −0.049 |
| Ex. 6 | −2.121 | 0.676 | −1.481 | 5.308 | 1.889 | 0.727 | 0.337 | 0.088 |
| Ex. 7 | −3.568 | 0.731 | −0.945 | 8.747 | 2.379 | 0.893 | 0.484 | −0.364 |
| Ex. 8 | −3.558 | 0.914 | −1.408 | 2.290 | 1.938 | 0.765 | 0.340 | 0.000 |
| Ex. 9 | −2.000 | 0.671 | −0.990 | −8.742 | 2.220 | 0.868 | 0.473 | −0.288 |
| Ex. 10 | −2.723 | 0.648 | −0.767 | −7.586 | 2.102 | 0.789 | 0.546 | −0.210 |
| Ex. 11 | −2.243 | 0.618 | −1.006 | 12.399 | 1.883 | 0.876 | 0.478 | −0.175 |
| Ex. 12 | −2.029 | 0.677 | −0.515 | 1.402 | 2.712 | 0.483 | 0.250 | 0.000 |

TABLE 14

Refractive Indices for Glasses Used in the Examples

| Glass Type | Maker | $N_F$ $\lambda = 480$ nm | $N_e$ $\lambda = 546$ nm | $N_C$ $\lambda = 644$ nm |
|---|---|---|---|---|
| N-KZFS4 | Schott | 1.623802 | 1.616638 | 1.609873 |
| S-NPH1 | Ohara | 1.835745 | 1.816432 | 1.799572 |
| S-BSL7 | Ohara | 1.522357 | 1.518250 | 1.514251 |
| S-FPL51 | Ohara | 1.501575 | 1.498454 | 1.495433 |
| S-FPL51Y | Ohara | 1.501604 | 1.498465 | 1.495430 |
| S-LAH53 | Ohara | 1.821104 | 1.810774 | 1.801169 |
| S-LAL14 | Ohara | 1.706235 | 1.699788 | 1.693583 |
| N-LASF9 | Schott | 1.870583 | 1.856501 | 1.843756 |
| ACRYLIC | Ohara | 1.498324 | 1.493801 | 1.489370 |
| S-FPL53 | Ohara | 1.442214 | 1.439854 | 1.437559 |
| CaF2 | Schott | 1.437268 | 1.434929 | 1.432673 |
| S-PHM52 | Ohara | 1.625350 | 1.620327 | 1.615507 |
| S-BSM16 | Ohara | 1.628151 | 1.622864 | 1.617775 |
| S-TIH1 | Ohara | 1.736122 | 1.723096 | 1.711428 |
| S-LAH63 | Ohara | 1.819895 | 1.809220 | 1.799323 |
| S-LAH60 | Ohara | 1.851152 | 1.839322 | 1.828416 |
| S-NSL3 | Ohara | 1.524856 | 1.520325 | 1.515981 |
| S-BAL42 | Ohara | 1.590519 | 1.585467 | 1.580614 |
| S-FSL5 | Ohara | 1.492672 | 1.489147 | 1.485688 |
| S-TIM2 | Ohara | 1.633149 | 1.624087 | 1.615811 |
| S-BSM4 | Ohara | 1.620577 | 1.615203 | 1.610050 |
| S-TIH53 | Ohara | 1.874313 | 1.855040 | 1.838067 |

Applications and Examples with Larger and Smaller Apertures

Although examples of the present invention are very well suited for optical objectives having a relative aperture of f/1.5 or faster, the invention is also suited for somewhat slower optical systems that must have an extraordinarily high level of optical correction and/or cover a very large image format. Such optical systems are typically required in applications such as aerial reconnaissance, where the image circle may range up to about 70 mm in diameter or even larger and the desired aperture may range from f/1.8 up to about f/4.

The present invention is also well suited for extremely fast optical objectives having a relative aperture of f/1.2 or faster. Here it is convenient to use numerical aperture, or NA, which is defined as NA=1/(2(f/number)). Thus, an f/1.2 lens would have NA=1/(2×1.2)=0.417. Such high speed systems are particularly useful for low light imaging, night vision systems, and other specialized photographic and cinematographic applications. In some cases it is desirable to have sharp imagery with a numerical aperture (NA) larger than 0.5 (f/1.0), and in extreme cases the numerical aperture may reach 0.7 to 0.85 (f/0.71 to f/0.59).

Thus, the optical systems of the present invention can generally have an f/number in the range from f/0.6 to f/4. However, certain designs may fall into sub-ranges of this larger range, such as f/1.8 to f/4 and f/1.8 down to f/0.7, or even f/1.5 down to f/0.7 or f/1.5 down to f/0.6.

Altering a given optical system design to have a reduced numerical aperture is fairly straightforward. This typically involves stopping down the lens, reducing the vignetting to some extent, and re-optimizing for the new aperture. Generally, the image quality is improved when this is done unless the starting point is already diffraction limited. The lens size will also generally decrease, especially if the lens center thicknesses are reduced as much as possible after stopping down to avoid unnecessarily thick edge thicknesses. So, for example, a person with ordinary skill in the art of lens design would be able to successfully transform an f/2 or f/2.5 design into an f/2.8 or f/4 design.

Altering a given design to have an increased numerical aperture is more difficult, but is generally possible with proper technique. Lens center thicknesses must often be increased to avoid having edge thicknesses that are too thin. Vignetting must sometimes be increased to avoid overly large lens elements and/or to deal with increased aberration. The alteration must often be done in small steps to avoid the situation that rays can't be traced through the system during the early phases of optimization. Thus, in transforming an f/0.71 design into an f/0.6 design, it may be necessary to perform intermediate optimizations at f/0.67 and f/0.63, for example. These techniques will be well understood by a person with ordinary skill in the art of lens design.

EXAMPLE 13

Figure 13A:
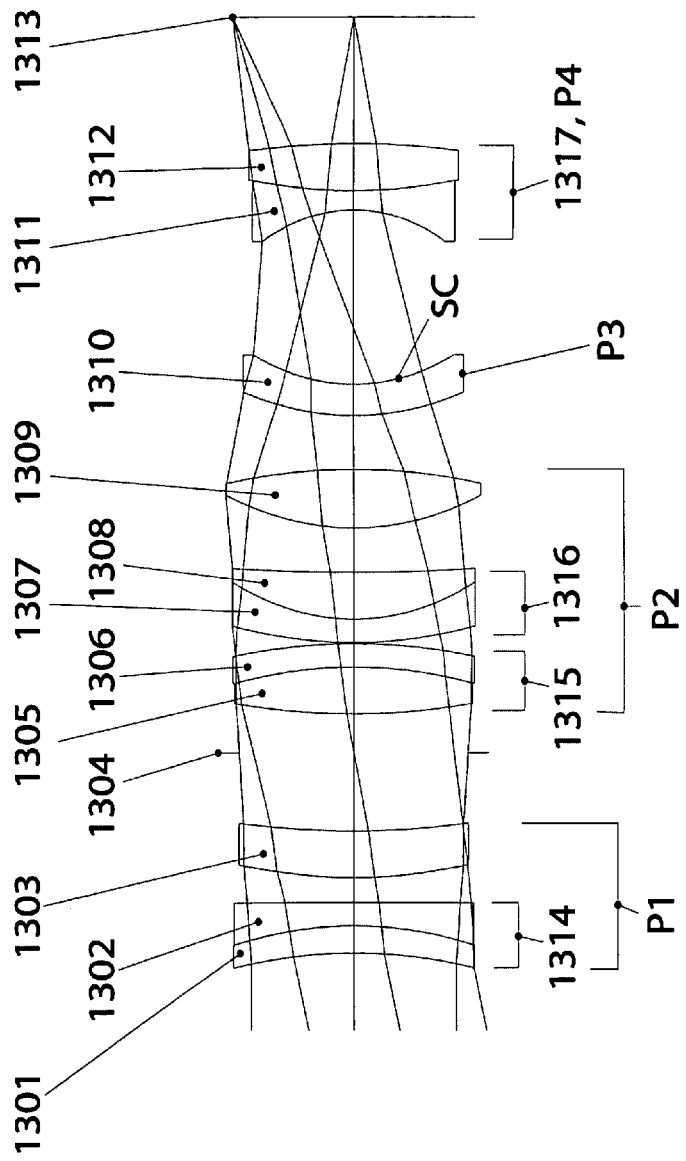
FIG. 13a illustrates a cross-sectional layout of an example 150 mm focal length objective optimized for aerial reconnaissance.

FIG. 13a illustrates a cross-sectional layout of an example 150 mm focal length objective optimized for aerial reconnaissance. All of the element and group designations mentioned below are shown in FIG. 13a. The relative aperture is f/2.5, the image diagonal is 70 mm, and the diagonal field of view (FOV) is 26.3 degrees. Example 13 is corrected over a waveband ranging from about 450 nm to 900 nm, which is an especially useful waveband for reconnaissance and night-vision applications.

Figure 13B:
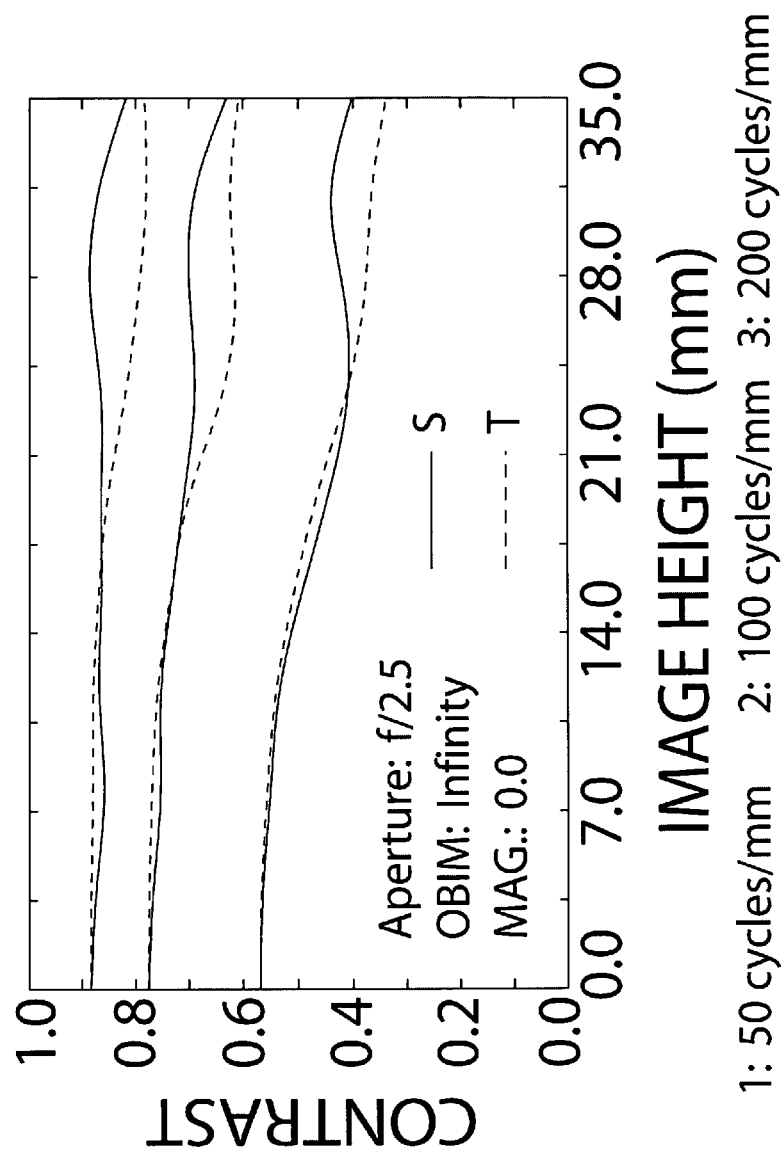

FIG. 13b plots the MTF vs. Image Height at 50, 100 and 200 cycles/mm for an object at infinity for example 13. The MTF curves indicate that Example 13 is extraordinarily well corrected at f/2.5, with MTF values at 100 cycles/mm greater than 60% over the entire image field. Example 13 does in fact meet the Rayleigh criterion for diffraction-limited performance at f/2.5 over a large central portion of the image field. This lens is well suited to sensors having a pixel size of 2 microns or less, and in an example has a total image resolution of about 1 gigapixel (i.e., about 1000 megapixels) or more.

In Example 13, the primary group PG comprises the entire lens. As discussed above, primary group PG comprises a negative powered front sub-group P1, followed by a positive powered sub-group P2, followed by a negative powered sub-group P3, followed by sub-group P4 that can be either positively or negatively powered.

Also in Example 13, sub-group P1 comprises a negative doublet 1314 and singlet 1303. Doublet 1314 uses high-index anomalous dispersion materials N-KZFS4 and S-NPH1 to advantage, and as a result aids in reducing secondary and tertiary chromatic aberrations. The surface of sub-group P1 closest to the object is a concave surface. The object-facing surface of singlet 1303 is aspherical, and this element is made of S-BSL7 to ensure that manufacturing this aspherical surface will not be problematic. The function of the aspherical surface is primarily to correct spherical aberration.

Sub-group P2 comprises two positive cemented doublets 1315 and 1316, together with a positive singlet 1309. The positive elements in sub-group P2 (1305, 1308, and 1309) are all made of the low-index anomalous dispersion glass S-FPL53. The two negative elements are made of a matching anomalous dispersion material N-KZFS4. Since most of the positive optical power for Example 13 resides in sub-group P2, the system as a whole is very well corrected for chromatic aberrations, and is in fact superachromatic (i.e., with four color crossings) over a waveband extending from 450 nm to 900 nm.

Sub-group P3 comprises a negative powered singlet 1310. The outer shape of 1310 is meniscus toward the image plane. The concave surface SC is strongly curved and therefore helps a great deal in correcting field curvature and astigmatism.

Sub-group P4 is a negative group comprising a negative cemented doublet 1317. Sub-group P4 serves mainly to correct distortion and astigmatism. This group has a fairly high power compared to other examples disclosed in this invention having four sub-groups. This is due in part to the fact that the aperture requirements have been relaxed, so that the outer negative groups can have greater optical power, and hence a greater field-flattening contribution without harming the overall correction.

Since Example 13 is intended for aerial reconnaissance applications, it has been optimized for an object located at infinity. However, small focus adjustments can be made by moving the entire lens without significantly degrading the lens performance.

Most of the optical materials used in Example 13 are listed in Table 14 above. However, there are two materials used in this example that are not listed in Table 14. S-LAH59, manufactured by Ohara, has indices of refraction of 1.829266, 1.820166, and 1.811579 at wavelengths of 480 nm, 546 nm, and 644 nm, respectively. N-KZFS2, manufactured by Schott, has indices of refraction of 1.566119, 1.560823, and 1.555701 at wavelengths of 480 nm, 546 nm, and 644 nm, respectively.

The values for the defining conditions of Example 13 are as follows: $F1/FG=-3.869$; $F2/FG=+0.600$; $F3/FG=-1.734$; $F4/FG=-0.974$; $y_{max}/y_{sc}=1.734$; $Z_{SC}/FG=0.626$; $R_{SC}/FG=0.398$; and $OBMG_{PG}=0.000$.

The optical prescription for Example 13 is given in Table 15a, below. Aspheric coefficients for surface #4 are given in Table 15b.

TABLE 15a

Prescription Data for Example 13

| Surf | Radius | Thickness | Glass | Diameter |
|---|---|---|---|---|
| OBJ | Infinity | Infinity | | |
| 1 | −159.7966 | 7 | S-NPH1 | 69.64 |
| 2 | −123.6288 | 6 | N-KZFS4 | 69.33 |
| 3 | −3697.4493 | 6.349026 | | 67.98 |
| 4 | 154.0810 | 12 | S-BSL7 | 66.37 |
| 5 | 275.8622 | 20.062832 | | 64.84 |
| STO | Infinity | 10 | | 66.241 |
| 7 | 221.4204 | 12 | S-FPL53 | 68.51 |
| 8 | −144.1959 | 6 | N-KZFS4 | 68.92 |
| 9 | −187.7078 | 0.298864 | | 69.77 |
| 10 | 149.2193 | 6 | N-KZFS4 | 70.22 |
| 11 | 69.2649 | 12 | S-FPL53 | 69.82 |
| 12 | 616.6508 | 11.473882 | | 70.17 |
| 13 | 85.0340 | 15 | S-FPL53 | 73.78 |
| 14 | −189.0097 | 13.779707 | | 73.30 |
| 15 | 88.0624 | 8 | S-LAH59 | 63.62 |
| 16 | 59.7944 | 44.695137 | | 58.13 |
| 17 | −47.4458 | 5 | N-KZFS2 | 53.14 |
| 18 | 166.8544 | 12 | S-LAH63 | 58.75 |
| 19 | −260.1443 | 32.355036 | | 60.70 |
| IMA | Infinity | | | 70.00 |

TABLE 15b

Aspheric Surface Data for Example 13

| | Surf. # 4 |
|---|---|
| R | 107.022 |
| k | 0.0 |
| C4 | −2.981230e−7 |
| C6 | −1.733792e−11 |
| C8 | −6.953303e−15 |
| C10 | 2.407175e−18 |

EXAMPLE 14

Figure 14A:
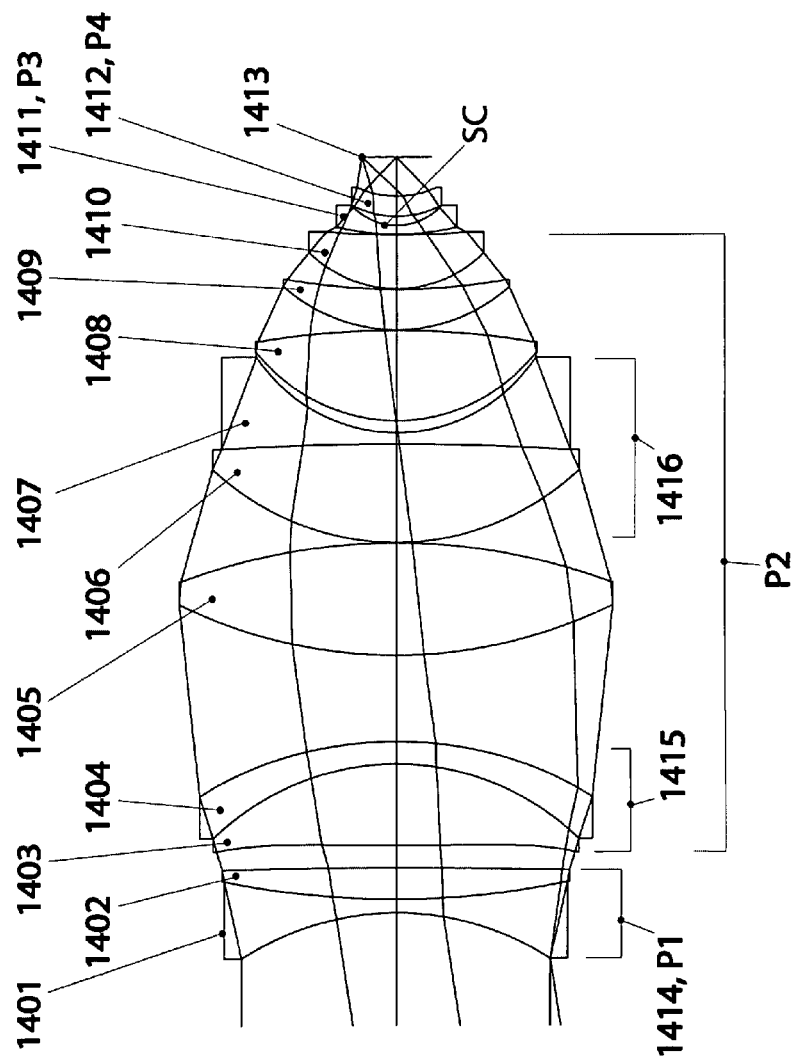
FIG. 14a shows a cross-sectional layout of an example of a very fast 50 mm focal length objective optimized for low light applications.

FIG. 14a shows a cross-sectional layout of an example of a very fast 50 mm focal length objective optimized for low light applications. All of the element and group designations mentioned below are shown in FIG. 14a. The relative aperture is f/0.71, the image diagonal is 16 mm, and the diagonal field of view (FOV) is 18.2 degrees. Example 14 is superachromatically corrected over a large waveband ranging from about 435 nm to 1000 nm, which is an especially useful waveband for reconnaissance and night-vision applications.

Figure 14B:
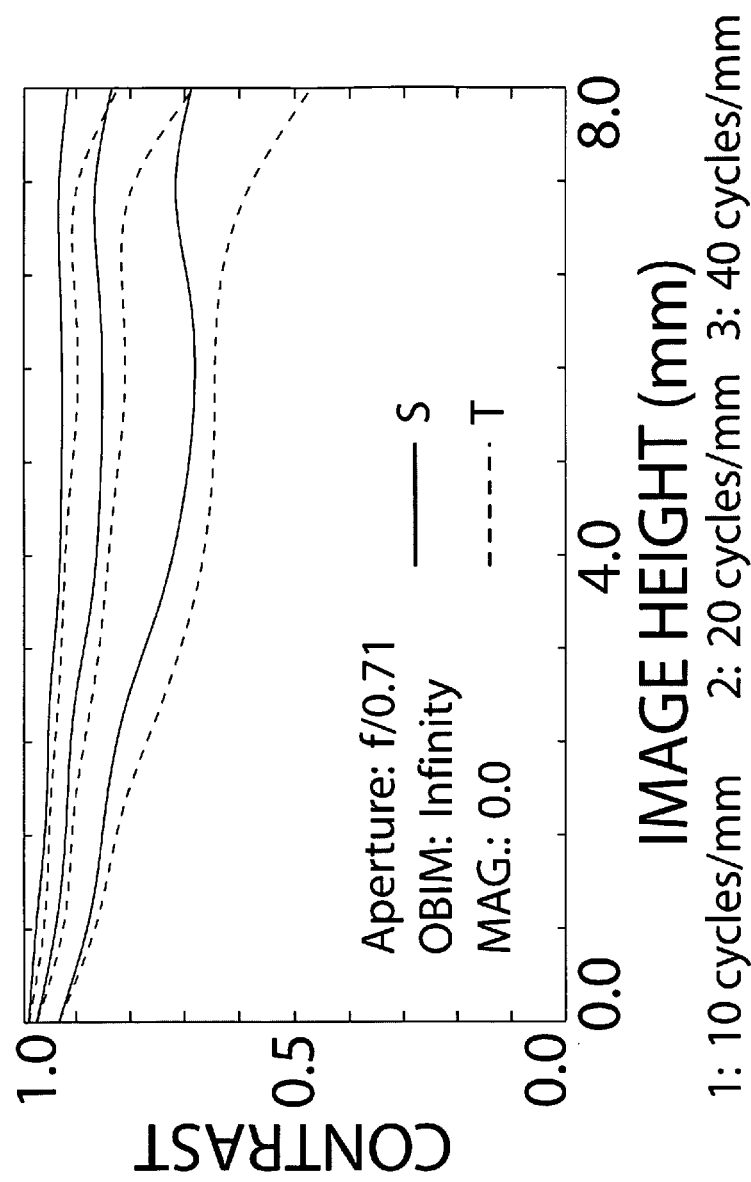

FIG. 14b plots the MTF vs. Image Height at 10, 20 and 40 cycles/mm for an object at infinity. These curves indicate that Example 14 is extraordinarily well corrected at f/0.71, with particularly good correction near the optical axis.

The primary group PG comprises the entire lens. As discussed above, primary group PG comprises a negative powered front sub-group P1, followed by a positive powered sub-group P2, followed by a negative powered sub-group P3, followed by sub-group P4 that can be either positively or negatively powered.

In Example 14, sub-group P1 comprises a negative doublet 1414. This doublet uses high-index anomalous dispersion materials N-KZFS4 and S-NPH1 to advantage, and as a result aids in reducing secondary and tertiary chromatic aberrations. The surface of sub-group P1 closest to the object is a concave surface.

Sub-group P2 comprises two positive cemented doublets 1415 and 1416, together with positive singlets 1405, 1408, 1409 and 1410. Most of the positive elements in sub-group P2 are made of the low-index anomalous dispersion glass S-FPL53. The two negative elements 1404 and 1407 are made of anomalous dispersion materials S-NBH51 and N-KZFS4, respectively. Since most of the positive optical power for Example 13 resides in sub-group P2, the system as a whole is very well corrected for chromatic aberrations, and is in fact superachromatic (i.e., with four color crossings) over a waveband extending from 435 nm to 1000 nm. The doublet 1415 incorporates aspheric surfaces on both of its outer faces. This serves to correct both spherical aberration and spherochromatism.

Sub-group P3 comprises a negative powered singlet 1411. The outer shape of 1411 is meniscus toward the image plane. The concave surface SC is strongly curved and therefore helps a great deal in correcting field curvature and astigmatism. 1411 also includes an aspheric surface, which helps to correct coma and astigmatism.

Sub-group P4 is a negative group comprising a very weak positive singlet 1412. Sub-group P4 serves mainly to correct distortion and astigmatism, and includes an aspheric surface to assist in this correction.

Most of the optical materials used in Example 14 are listed in Table 14 above. However, there are two materials used in Example 14 that are not listed in Table 14. S-NBH51, manufactured by Ohara, has indices of refraction of 1.765738, 1.754531 and 1.744240 at wavelengths of 480 nm, 546 nm, and 644 nm, respectively. S-TIH11, also manufactured by Ohara, has indices of refraction of 1.808412, 1.791919 and 1.777326 at wavelengths of 480 nm, 546 nm, and 644 nm, respectively.

The values for the defining conditions of Example 14 are as follows: F1/FG=−2.578; F2/FG=+1.125; F3/FG=−0.635; F4/FG=7.839; $y_{max}/y_{sc}$=4.985; $Z_{SC}$/FG=0.303; $R_{SC}$/FG=0.289; and $OBMG_{PG}$=0.000.

The optical prescription for Example 14 is given in Table 16a. Aspheric coefficients for surfaces #4, 6, 18 and 20 are given in Table 16b.

TABLE 16a

Prescription Data for Example 14

| Surf | Radius | Thickness | Glass | Diameter |
|---|---|---|---|---|
| OBJ | Infinity | Infinity | | |
| 1, STO | −66.1622 | 3 | N-KZFS4 | 70.45 |
| 2 | 197.3219 | 7 | S-NPH1 | 78.27 |
| 3 | −1609.8865 | 5 | | 79.19 |
| 4 | 756.7839 | 18 | S-PHM52 | 81.69 |
| 5 | −60.8839 | 5 | S-NBH51 | 83.40 |
| 6 | −92.7276 | 19.231450 | | 89.46 |
| 7 | 114.3918 | 25 | S-FPL53 | 98.78 |
| 8 | −142.6890 | 0.1 | | 98.78 |
| 9 | 61.8502 | 22 | S-FPL53 | 83.65 |
| 10 | −623.5548 | 2.5 | N-KZFS4 | 79.61 |
| 11 | 38.7974 | 2.669583 | | 63.75 |
| 12 | 41.3346 | 20 | S-FPL53 | 64.16 |
| 13 | −194.2278 | 0.1 | | 63.11 |
| 14 | 39.5412 | 9 | S-FPL53 | 51.62 |
| 15 | 147.8627 | 0.1 | | 49.86 |
| 16 | 28.9170 | 12 | S-FPL53 | 39.96 |
| 17 | 212.3527 | 0.1 | | 32.03 |
| 18 | 58.2811 | 2 | N-KZFS4 | 27.68 |
| 19 | 14.4684 | 1.983785 | | 21.20 |
| 20 | 22.5127 | 4.465207 | S-TIH11 | 21.20 |
| 21 | 22.1455 | 8.684122 | | 18.24 |
| IMA | Infinity | | | 16.00 |

TABLE 16b

Aspheric Surface Data for Example 14

| | Surf. # | | | |
|---|---|---|---|---|
| | 4 | 6 | 18 | 20 |
| R | 107.022 | | | |
| k | 0.0 | 0.0 | 0.0 | 0.0 |
| C4 | −6.274019e−7 | −3.711145e−8 | −7.534748e−6 | −6.022078e−7 |
| C6 | −3.511426e−10 | −1.676246e−10 | 5.880522e−8 | −7.811193e−8 |
| C8 | 2.209673e−13 | 9.128595e−14 | −2.905395e−10 | 6.400339e−10 |
| C10 | −6.980152e−17 | −2.430516e−17 | 7.553780e−13 | −6.496343e−12 |
| C12 | −8.751703e−22 | 0.0 | 0.0 | 0.0 |

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A large-aperture imaging optical system for forming an image of an object and having an f/number, comprising:
   a) a primary lens group PG having a focal length FG comprising in order from the object to the image:
      i) a front negative-powered lens sub-group P1 having a focal length F1;
      ii) a positive-powered lens sub-group P2 having a focal length F2;

iii) a negative-powered lens sub-group P3 having a focal length F3;

b) wherein the primary lens group PG contains a surface SC that is concave toward the image, the marginal ray height at surface SC being less than 0.8 times the maximum marginal ray height at any lens surface within PG; and wherein the f/number is in the range from f/0.6 to f/4.

2. The optical system of claim 1, wherein the optical system has a total image resolution of about 1 gigapixel or greater.

3. The optical system of claim 1, wherein at least one of the lens sub-groups P1, P2 and P3 is movable to effectuate focusing.

4. The optical system of claim 1, wherein the optical system is well-corrected for breathing.

5. The optical system of claim 1, wherein the optical system has a full field of view greater than 30 degrees.

6. The optical system of claim 1, wherein the optical system is corrected over a waveband from 450 nm to 900 nm.

7. The optical system of claim 2, wherein the optical system is superachromatic over the wave band.

8. The optical system of claim 1, wherein the optical system is corrected over a waveband from 435 nm to 1000 nm.

9. The optical system of claim 8, wherein the optical system is superachromatic over the wave band.

10. A large-aperture imaging optical system having an f/number and that forms an image of an object, comprising:
   a) a primary lens group PG having a focal length FG comprising in order from the object to the image:
      i) a front negative-powered lens sub-group P1 having a focal length F1;
      ii) a positive-powered lens sub-group P2 having a focal length F2;
      iii) a negative-powered lens sub-group P3 having a focal length F3; and
      iv) a lens sub-group P4 having a focal length F4 that can be either negatively or positively powered;

b) wherein the primary lens group PG contains a surface SC that is concave toward the image, the marginal ray height at surface SC being less than 0.85 times the maximum marginal ray height at any lens surface within PG; and wherein the f/number is in the range from f/0.6 to f/4.

11. The optical system of claim 10, wherein the optical system has a total image resolution of about 1 gigapixel or greater.

12. The optical system of claim 10, wherein the optical system has a full field of view greater than 30 degrees.

13. The optical system of claim 10, having at least one positive-powered lens element with an Abbe number greater than 60.

14. The optical system of claim 10, further including an aspherical surface configured to contribute to correcting spherical aberration.

15. The optical system of claim 10, further including an aspherical surface configured to contribute to correcting distortion.

16. The optical system of claim 10, wherein at least one of the lens sub-groups P1 through P3 is movable to effectuate focusing.

17. The optical system of claim 10, wherein the optical system is corrected over a waveband from 450 nm to 900 nm.

18. The optical system of claim 17, wherein the optical system is superachromatic over the wave band.

19. The optical system of claim 10, wherein the optical system is corrected over a waveband from 435 nm to 1000 nm.

20. The optical system of claim 19, wherein the optical system is superachromatic over the wave band.

* * * * *